(12) United States Patent
Goto et al.

(10) Patent No.: US 6,566,862 B1
(45) Date of Patent: May 20, 2003

(54) SELF-INDUCTION-TYPE POSITION DETECTOR DEVICE FOR DETECTING OBJECT POSITION

(75) Inventors: Atsutoshi Goto, Shinmachi 1-77-2, Fuchu-shi, Tokyo (JP); Kazuya Sakamoto, Hamura (JP); Hiroshi Sakamoto, Kawagoe (JP)

(73) Assignee: Atsutoshi Goto, Tokyo (JP)

( * ) Notice: Subject to any disclaimer, the term of this patent is extended or adjusted under 35 U.S.C. 154(b) by 0 days.

(21) Appl. No.: 09/525,281

(22) Filed: Mar. 14, 2000

(30) Foreign Application Priority Data

| Mar. 15, 1999 | (JP) | ............................................ 11-069229 |
| Sep. 3, 1999 | (JP) | ............................................ 11-249755 |
| Dec. 17, 1999 | (JP) | ............................................ 11-359431 |

(51) Int. Cl.⁷ .............................. G01B 7/14; G01B 7/30
(52) U.S. Cl. ........................... 324/207.16; 324/207.17; 324/207.25; 324/207.18
(58) Field of Search ....................... 324/207.16, 207.18, 324/207.25, 207.24, 207.17; 340/870.32, 870.31, 870.34; 318/656, 661; 331/65

(56) References Cited

U.S. PATENT DOCUMENTS

| 4,112,365 A | * | 9/1978 | Larson et al. ................ 324/173 |
| 4,754,220 A | | 6/1988 | Shimizu et al. |
| 5,109,193 A | * | 4/1992 | Pike ....................... 324/207.17 |
| 5,710,509 A | * | 1/1998 | Goto et al. ............. 324/207.25 |

FOREIGN PATENT DOCUMENTS

| EP | 0 759 539 A1 | 2/1997 |
| EP | 0 795 738 A1 | 9/1997 |
| JP | 10126241 | 5/1998 |
| JP | 10170210 | 6/1998 |

* cited by examiner

Primary Examiner—Edward Lefkowitz
Assistant Examiner—Subhash Zaveri
(74) Attorney, Agent, or Firm—Morrison & Foerster LLP

(57) ABSTRACT

Single coil to be excited by a predetermined A.C. signal is provided, with no secondary coil being provided. Magnetism-responsive member is movable relative to the coil so that a self-inductance of the coil progressively increases or decreases in response to displacement of an object to be detected within a predetermined range and a voltage of the coil corresponding to the self-inductance is produced. Predetermined reference voltage is generated and subjected to analog operations with the coil output voltage, to thereby generate first and second A.C. outputs having, as amplitude coefficients, first and second cyclic amplitude functions correlated to the position to be detected. The position is detected on the basis of the phase component of the amplitude coefficient functions. Combination of two coils and one reference voltage may be employed. Further, a plurality of coil segments excitable by a same-phase signal are placed in series along the direction of displacement of the object so that a progressive increase or decrease occurs sequentially in the self-inductance of the coil segments as the magnetism-responsive member moves relative to the coil segments, and the voltage corresponding to the self-inductance is taken out from each of the coil segments. Performing analog arithmetic operations on combinations of the coil voltages produces first and second A.C. outputs having, as amplitude coefficients, first and second cyclic amplitude functions correlated to the position to be detected.

8 Claims, 27 Drawing Sheets

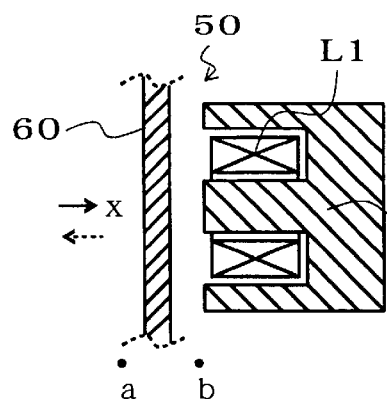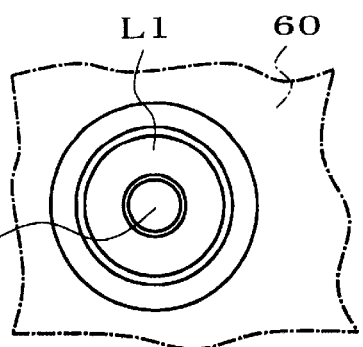
FIG. 1A  FIG. 1B
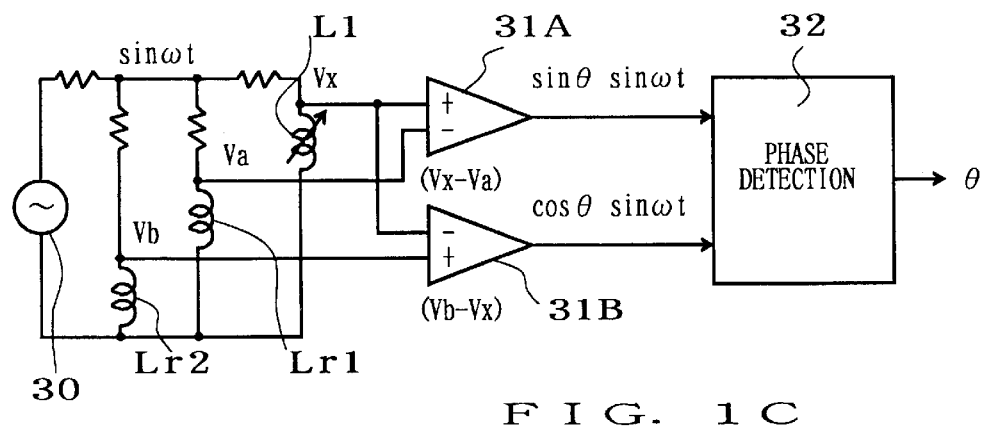
FIG. 1C
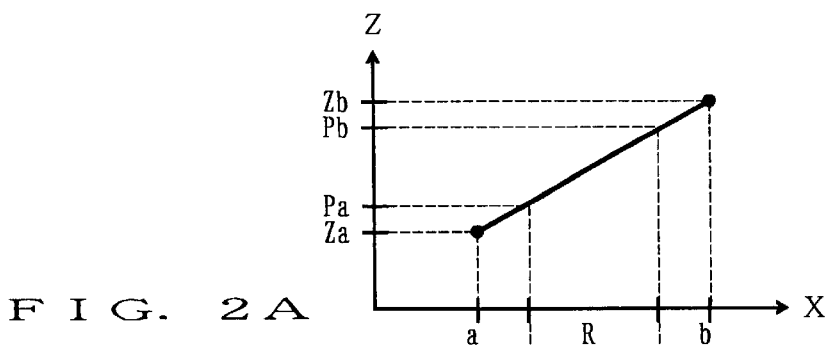
FIG. 2A
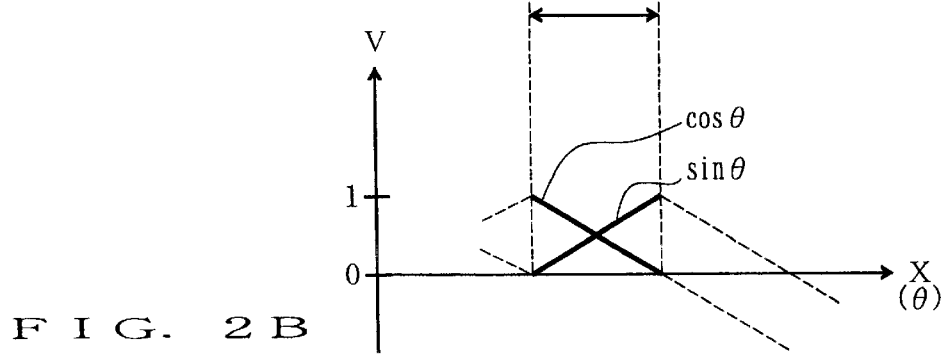
FIG. 2B

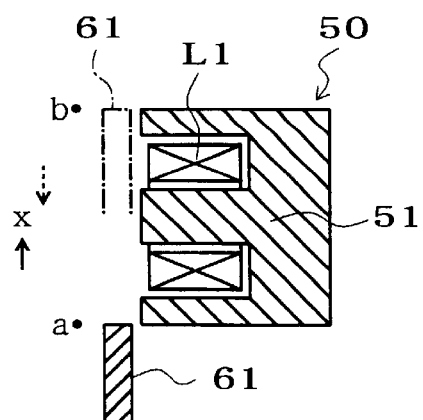
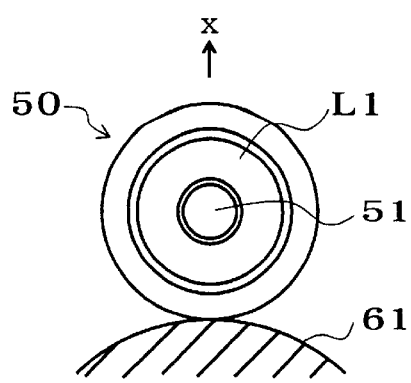
FIG. 3A    FIG. 3B
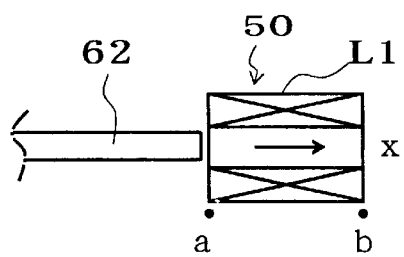
FIG. 4
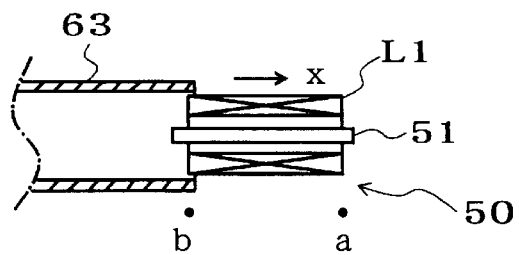
FIG. 5
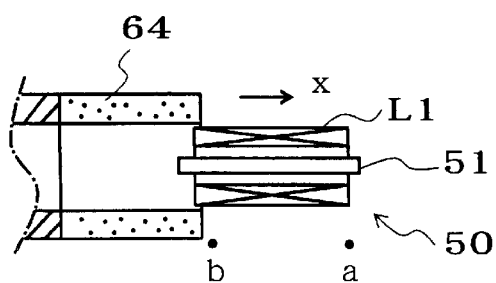
FIG. 6

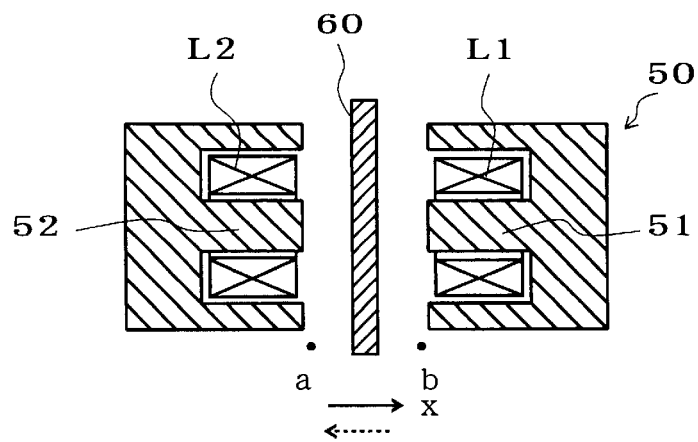
FIG. 7A
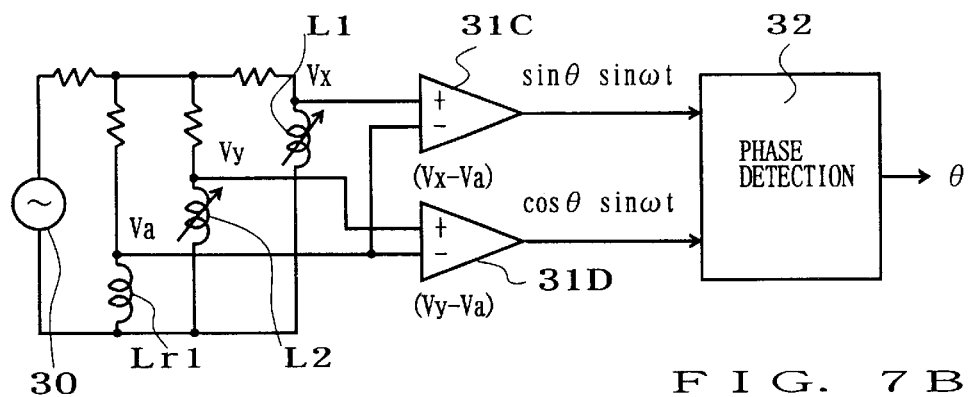
FIG. 7B
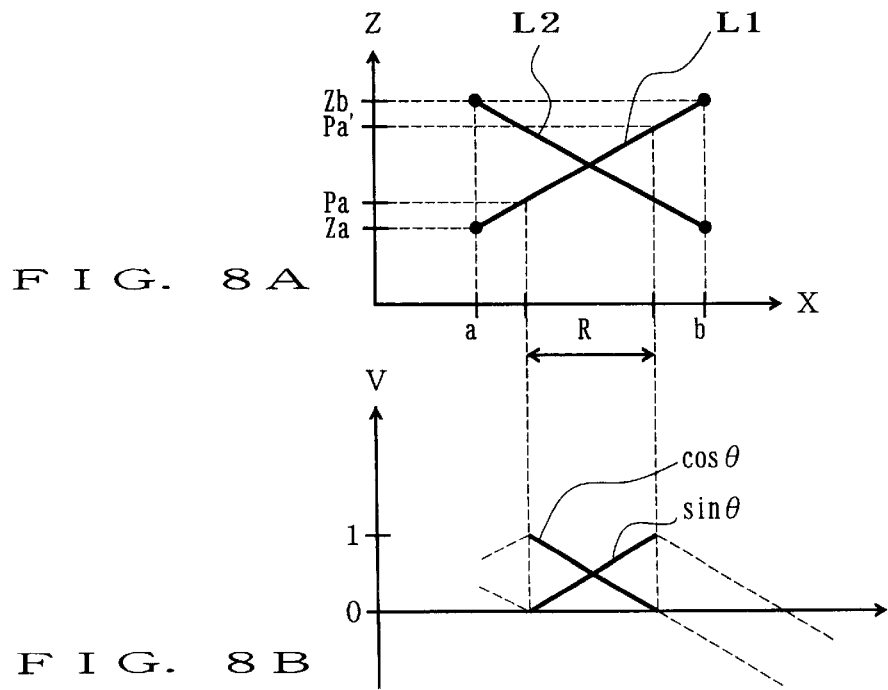
FIG. 8A
FIG. 8B

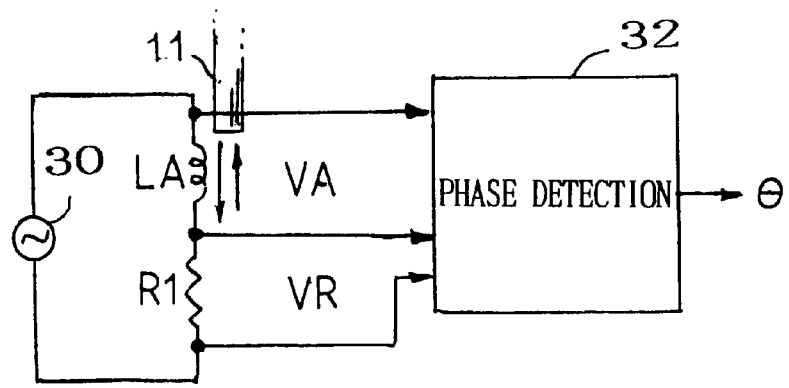
F I G. 2 2 A
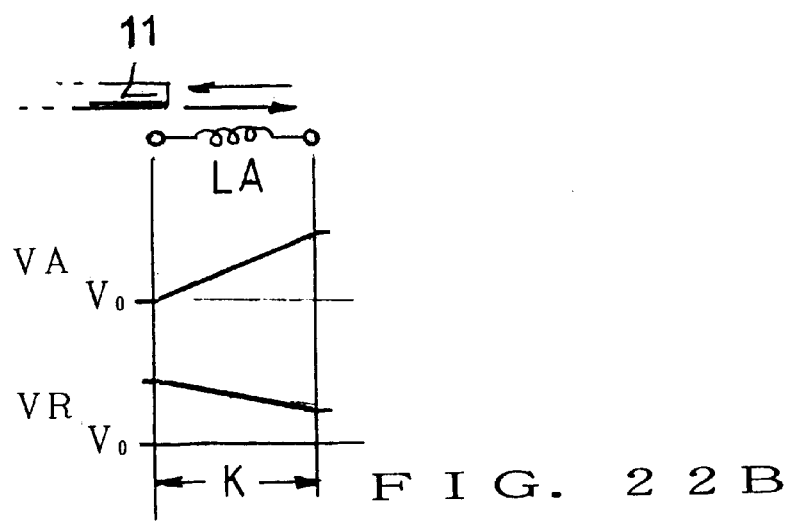
F I G. 2 2 B
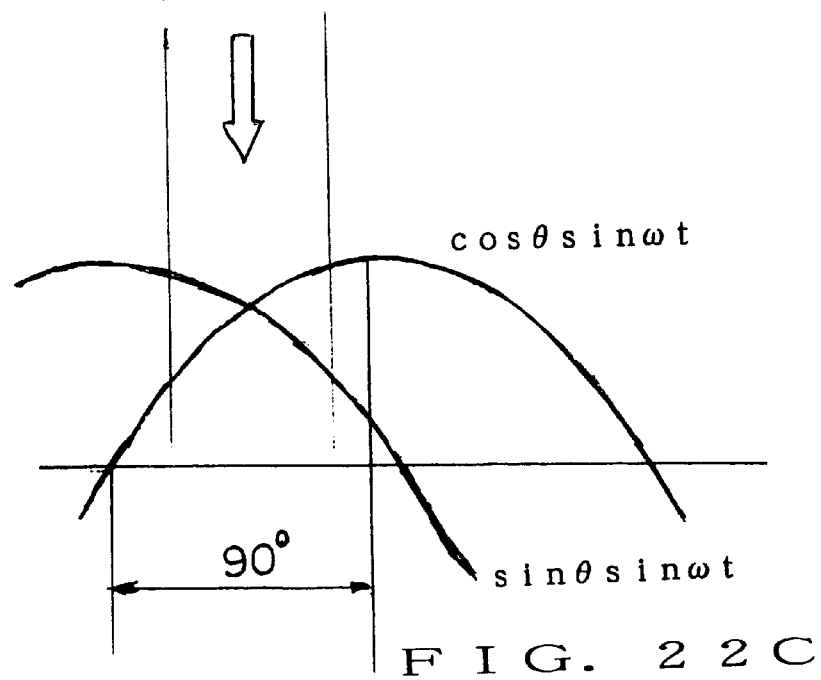
F I G. 2 2 C

SELF-INDUCTION-TYPE POSITION DETECTOR DEVICE FOR DETECTING OBJECT POSITION

BACKGROUND OF THE INVENTION

The present invention relates to self-induction-type position detector devices which include a coil to be excited by an A.C. signal and a magnetic or electrically-conductive member movable relative to the coil and which are suitable for detection of a linear or rotational position. More particularly, the present invention relates to an improved self-induction-type position detector device which, in response to a position of an object of detection (i.e., an object to be detected), can generate A.C. output signals presenting amplitude function characteristics of a plurality of phases using only a primary coil to be excited by a single-phase A.C. output signal.

There have ben known induction-type linear position detector devices which are commonly called "LVDTs". In two-wire-type LDVTs including one primary coil and one secondary coil, an induction coupling between the primary coil and the secondary coils varies in accordance with an amount of entry, into a coil section, of a movable section made of a magnetic substance, so that an inductive output signal of a voltage level corresponding to the induction coupling variation is produced in the secondary coil. Further, three-wire-type LDVTs are constructed as a differential transformer including one primary coil and two secondary coils connected in series in opposite phases, where an induction coupling between the primary coil and the secondary coils varies in a balanced manner in accordance with an amount of entry, into one of the two coils of the opposite phases, of a movable section made of a magnetic substance having a predetermined length, so that inductive output signals of voltage levels corresponding to the induction coupling variation are produced in the secondary coils. In such three-wire-type LDVTS, output signals of sine and cosine characteristics corresponding to a position of the movable section are generated by performing analog addition or subtraction on the output signals from the secondary coils, and these output signals of sine and cosine characteristics are then processed via an R-D converter to thereby generate digital data indicative of a detected current position of the movable section. Other type of position detector device have also been known (e.g., from Japanese Patent Laid-open Publication No. SHO-53-102070 and U.S. Pat. No. 4,112,365 corresponding thereto), which include only an exciting coil and where a variation in the self-inductance of the exciting coil responding to a movement of a movable magnetic core is detected by measuring an amount of phase shift through an R-L circuit.

However, because the conventionally-known LVDTs require both of the primary and secondary coils, the necessary number of component parts would increase, which unavoidably results in significant limits to reduction in the manufacturing cost and size of the devices. In addition, an available phase angle range in the output signals of sine and cosine characteristics corresponding to a current position of the movable section is relatively narrow, such as about 45° in the two-wire-type LVDTs or about 90° in the three-wire-type LVDTs, so that the detectable phase angle range can not be expanded satisfactorily in the conventionally-known LVDTs. Further, because the conventional three-wire-type LVDTs can only detect such positions displaced leftward and rightward from a predetermined reference point where the movable section is located centrally along the length the coil section, they provide a very poor convenience of use.

With the conventionally-known position detector devices of the type which measures the self-inductance of the exciting coil, on the other hand, it is possible to reduce the necessary number of coils, but the phase shift amount responding to the displacement of the object to be detected can be detected only within an extremely narrow range, which, in effect, would make it very difficult to measure the phase shift amount. Also, these known position detector devices provide a very poor detecting resolution and thus are not suitable for practical use. In addition, because the phase shift amount varies as the impedance of the coil changes in response to a change in ambient temperature, the position detector devices could not properly compensate or adjust their temperature characteristics.

Induction-type rotational position detector devices of the type which produces two-phase outputs (i.e., outputs of sine and cosine phases) in response to a single-phase exciting input are commonly known as "resolvers", and induction-type rotational position detector devices of the type which produces three-phase outputs (i.e., outputs of three phases shifted from each other by 120°) in response to a single-phase exciting input are commonly known as "synchros". In the resolvers in the most traditional form, a stator includes two-pole (sine and cosine poles) secondary windings that intersect each other at a 90° mechanical angle, and a rotor includes a primary winding. The resolvers of this type are not satisfactory in that they need a brush to electrically contact the primary winding of the rotor. There have also been known brush-less resolvers that require no such brush; that is, these brush-less resolvers include, in the rotor, a rotary transformer in place of the brush. However, because of the provision of the rotary transformer in the rotor, it is difficult to reduce the overall size of the devices and thus there are limitations to the downsizing of the brush-less resolvers. Further, the provision of the rotary transformer increases the number of the component parts, which also leads to an unavoidable increase in the manufacturing cost.

Also known in the art are rotational position detector devices of the non-contact/variable-reluctance type (known in the past by the tradename "microsyn"), where a stator includes primary and secondary windings disposed on a plurality of projecting poles and a rotor is formed of a magnetic body having a predetermined shape (such as an eccentric circular shape, an oval shape or a shape having a projection). In these rotational position detector devices (rotary-type position detector devices), a reluctance variation responding to a rotational position of the object to be detected is produced on the basis of variations in gaps between the stator's projecting poles and the rotor's magnetic body that occur in response to a changing rotational position of the object to be detected, so that an output signal corresponding to the reluctance variation is provided. Further, similar reluctance-based rotational position detector devices are also disclosed, for example, in U.S. Pat. No. 4,754,220, Japanese Patent Laid-open Publication Nos. SHO-55-46862, SHO-55-70406 and SHO-59-28603. As position detection techniques based on the detector output signal, there have been known both a phase-based scheme in which position detecting data corresponds to an electrical phase angle of the output signal and a voltage-based scheme in which position detecting data corresponds to a voltage level of the output signal. In the case where the phase-based scheme is employed, the individual primary windings disposed at different mechanical angles are excited by phase-shifted inputs, such as two-phase or three-phase exciting inputs, so as to generate a single-phase output signal having a different electrical angle corresponding to a current rotational position. Further, in the case where the voltage-based scheme is employed, the relationship between the primary and secondary windings is reversed from that in the phase-based scheme, and plural-phase outputs are produced in response to a single-phase exciting input in the same manner as in the resolvers.

Typically, the rotational position detector devices, such as the resolvers, which produce plural-phase outputs in response to a single-phase, are arranged to produce two-phase outputs, namely, sine-phase and cosine-phase outputs. To this end, in the conventional resolver-style rotational position detector devices of the non-contact/variable-reluctance type, the stator has at least four poles that are spaced apart from each other by a mechanical angle of 90°; specifically, if the first pole is set to a sine phase, the second pole 90° apart from the first pole is set to a cosine phase, the third pole 90° apart from the second pole is set to a minus sine phase and the fourth pole 90° apart from the third pole is set to a minus cosine phase. In such a case, to bring about a reluctance variation, corresponding to a rotation of the object to be detected, in each of the stator poles, the rotor is formed of a magnetic or electrically-conductive substance into an eccentric circular shape, oval shape or cyclic shape such as a gear shape. Primary and secondary windings are disposed on each of the stator poles so that a reluctance in a magnetic circuit passing through the stator pole is changed in response to a variation in a gap between the stator pole and the rotator. The reluctance change causes a degree of magnetic coupling between the primary and secondary coils on each of the stator poles to vary in correspondence with a rotational position of the object to be detected, and thus an output signal corresponding to the rotational position is induced in each of the secondary winding, with the result that a peak amplitude characteristic in the output signal from each of the stator poles presents a cyclic function characteristic.

However, because the above-discussed resolver-style rotational position detector devices of the non-contact/variable-reluctance type are based on primary-secondary induction by the provision of the primary and secondary coils, a great number of coils are required, which would unavoidably result in limits to reduction in the manufacturing cost and overall size of the devices. Further, with the arrangement that the plurality of stator poles are disposed at equal intervals along the entire range of one full rotation, the conventional rotational position detector devices would present the problem that places and space to which the devices are applicable are limited to a considerable degree. Besides, even where two-phase (sine-phase and cosine-phase) outputs are to be produced from the conventional rotational position detector devices, the stator can not be constructed as a simple two-pole structure and always has to be constructed as a more complicated four-pole structure, which would also impose limitations to reduction in the overall size of the stator.

SUMMARY OF THE INVENTION

It is therefore an object of the present invention to provide an improved position detector device which is very compact in size and very simple in structure. It is another object of the present invention to provide an improved position detector device which achieves a significant increase in its available phase angle range, can accurately detect even microscopic displacement of an object to be detected with high resolution and also can readily compensate its temperature characteristics in an appropriate manner.

In order to accomplish the above-mentioned object, the present invention provides a position detector device which comprises: a coil section including at least one coil to be excited by an A.C. signal; a magnetism-responsive member movable relative to said coil section, wherein relative positions between said magnetism-responsive member and said coil section vary in response to displacement of an object to be detected and impedance of said coil is caused to vary in response to a variation in the relative positions in such a manner that a voltage produced in said coil is caused to vary in response to a variation in the impedance of said coil during the variation in the relative positions within a predetermined range; a reference-voltage generation circuit adapted to generate at least one predetermined reference voltage in the form of an A.C. signal; and an arithmetic operation circuit coupled to said coil and reference-voltage generation circuit, said arithmetic operation circuit adapted to perform an arithmetic operation between said voltage produced in said coil and said predetermined reference voltage, so as to generate at least two A.C. output signals having predetermined cyclic amplitude functions as amplitude coefficients, the cyclic amplitude functions of the two A.C. output signals being different, in their cyclic characteristics, from each other by a predetermined phase.

Typically, the magnetism-responsive member includes at least one of a magnetic substance and an electrically-conductive substance. In the case where the magnetism-responsive member is made of a magnetic substance, the inductance and electrical impedance of the coil increases and the voltage produced in the coil, i.e., a voltage between two terminals (i.e., "between-terminal voltage") of the coil, increases as the magnetism-responsive member moves closer to the coil, i.e., as the degree of proximity of the magnetism-responsive member to the coil increases. Conversely, as the magnetism-responsive member moves away from the coil, i.e., as the degree of proximity of the magnetism-responsive member to the coil decreases, the inductance and electrical impedance of the coil decreases and the voltage produced in the coil, i.e., "between-terminal voltage" of the coil, decreases. Thus, in response to displacement (changing position) of the object to be detected, the between-terminal voltage of the coil increases or decreases as the relative position of the magnetism-responsive member to the coil varies within a predetermined range.

Typically, a progressive variation curve of the between-terminal voltage of the coil, presented during the movement of the magnetism-responsive member relative to the coil, can be likened to a functional value variation within a 0°–90° range of a sine function. If an A.C. signal component is represented by "sin ωt" and an amplitude coefficient level of the output voltage Vx of the coil obtained in correspondence with the start point of an appropriate detection section in the progressive variation curve presented by the between-terminal voltage of the coil is represented by "Pa", the output voltage Vx from the coil corresponding to the start point of the detection section can be represented by "Pa sin ωt". Similarly, if an amplitude coefficient level of the output voltage Vx of the coil obtained in correspondence with the end point of the above-mentioned detection section in the progressive variation curve is represented by "Pb", then the coil output voltage corresponding to the end point of the detection section can be represented by "Pb sin ωt". Further, if an A.C. voltage having the same value as the value Pa sin ωt of the coil output voltage Vx corresponding to the start point of the detection section is set as a reference value Va and the amplitude coefficient of the coil output voltage Vx is represented by A(x), subtracting the first reference voltage Va from the coil output voltage Vx gives the following mathematical expression:

$$Vx-Va=A(x)\sin \omega t - Pa \sin \omega t = \{A(x)-Pa\}\sin \omega t \quad \text{Expression(1)}$$

Because A(x) equals Pa at the start point of the detection section, the amplitude coefficient "A(x)–Pa", which is the result of these arithmetic operations, becomes "0". On the other hand, at the end point of the detection section, A(x) equals Pb, so that the amplitude coefficient "A(x)–Pa", which is the result of these arithmetic operations, equals "Pb–Pa". Thus, the "A(x)–Pa", the result of these arithmetic operations, presents a function characteristic increasing progressively from "0" to "Pb–Pa". If the maximum value "Pb–Pa" is regarded equivalently as "1", then the amplitude coefficient "A(x)–Pa" of the A.C. signal based on Expression (1) above varies from "0" to "1" within the detection section, and the function characteristic of the amplitude coefficient can be likened to a characteristic of a first quadrant (i.e., a 0°–90° range) in a sine function. Therefore, the amplitude coefficient "A(x)–Pa" of the A.C. signal based on the above mathematical expression can be expressed equivalently as $\sin \theta$ (approximately, $0° \leq \theta \leq 90°$).

In a preferred implementation of the position detector device, the coil section includes a single coil, and the reference-voltage generation circuit generates first and second reference voltages. The arithmetic operation circuit performs predetermined first and second arithmetic operations using a voltage taken out from the single coil and the first and second reference voltages, to thereby generate a first A.C. output signal having a first amplitude function as an amplitude coefficient and a second A.C. output signal having a second amplitude function as an amplitude coefficient. In this case, the position detector device requires only one coil and thus can be as simple as possible in structure. Further, using the voltage Va as the above-mentioned first reference voltage, the above-mentioned first amplitude function can have a characteristic corresponding generally to the first quadrant (i.e., the 0°–90° range) in the sine function.

If an A.C. voltage having the same value as the value Pb sin ωt of the coil output voltage Vx corresponding to the end point of the detection section is set as a second reference value Vb, subtracting the second reference voltage Vb from the coil output voltage Vx gives the following mathematical expression:

$$Vb-Vx=Pb \sin \omega t - A(x)\sin \omega t = \{Pb-A(x)\}\sin \omega t \quad \text{Expression (2)}$$

Because A(x) equals Pa at the start point of the detection section, the amplitude coefficient "Pb–A(x)", which is the result of these arithmetic operations, equals "Pb–Pa". On the other hand, at the end point of the detection section, A(x) equals Pb, so that the amplitude coefficient "Pb–A(x)", which is the result of these arithmetic operations, becomes "0". Thus, the "Pb–A(x)", the result of these arithmetic operations, presents a function characteristic decreasing progressively from "Pb–Pa" to "0". If the maximum value "Pb–Pa" is regarded equivalently as "1", then the amplitude coefficient "Pb–A(x)" of the A.C. signal based on Expression (2) above varies from "1" to "0" within the detection section, and the function characteristic of the amplitude coefficient can be likened to a characteristic of a first quadrant (i.e., a 0°–90° range) in a cosine function. Therefore, the amplitude coefficient "Pb–A(x)" of the A.C. signal based on Expression (2) can be expressed equivalently as $\cos \theta$ (approximately, $0° \leq \theta \leq 90°$). The subtraction in Expression (2) may be replaced by "Vx–Vb".

In the above-mentioned manner, by only using a combination of one coil and two reference voltages, the present invention can readily produce two A.C. output signals presenting amplitudes of sine and cosine function characteristics, in response to a current position of the object to be detected. For example, if the position of the object to be detected is represented by an angle θ, then the A.C. output signal presenting an amplitude of a sine function characteristic can be expressed by sin θ sin ωt while the A.C. output signal presenting an amplitude of a cosine function characteristic can be expressed by cos θ sin ωt. These output signals are just similar in form to the outputs from the known position detector devices commonly called "resolvers", which are therefore extremely useful in various applications. In some application, the inventive position detector device may further comprise an amplitude-to-phase converter section that receives the plurality of A.C. output signals generated via the above-mentioned arithmetic operation circuit, then detects, from a correlation between the amplitude values of the A.C. output signals, a specific phase value in the sine and cosine functions defining the amplitude values, and then generates position detecting data indicative of a current position of the object to be detected. Note that because the sine and cosine functions each present a characteristic within a range of substantially one quadrant (90°), every position over a detectable position range can be detected in terms of a phase angle within the substantially-90° range.

In this case, variably setting the levels Pa and Pb of the reference voltages Va and Vb would result in variably setting the detectable position range of the device. If the levels Pa and Pb of the reference voltages Va and Vb are set to be greatly different from each other, then the detectable position range will be widened accordingly, while if the levels Pa and Pb of the reference voltages Va and Vb are set to be only slightly different from each other, then the detectable position range will be narrowed. Because any position within the detectable position range can always be detected in terms of a phase angle θ within the substantially-90° range irrespective of a change in the detectable position range, the detecting resolution of the inventive position detection can be variably set by just variably setting the levels of the reference voltages Va and Vb. This means that the position detection can be made with a super-high resolution even where very minute or microscopic displacement of the object is to be detected.

In another preferred embodiment, the coil section includes two coils, relative positions of the two coils relative to the magnetism-responsive member being caused to vary with opposite characteristics in response to the displacement of the object to be detected, in response to which respective impedance of the coils varies with opposite characteristics. In this case, the reference-voltage generation circuit generates a single reference voltage, and the arithmetic operation circuit performs predetermined first and second arithmetic operations using voltages taken out from the coils and the reference voltage, to thereby generate a first A.C. output signal having a first amplitude function as an amplitude coefficient and a second A.C. output signal having a second amplitude function as an amplitude coefficient.

Similarly to the above-mentioned, a progressively increasing variation curve of the between-terminal voltage of the first coil, presented during a variation of the relative position of the magnetism-responsive member within a predetermined range, can be likened to a functional value variation in a 0°–90° range of a sine function. Namely, the output voltage Vx from the coil corresponding to the start point of an appropriate detection section can be represented by Pa sin ωt, which corresponds to a minimum voltage value. The start point of the detection section can be set by the reference voltage Va. Performing arithmetic operations similar to Equation (1) above using the reference voltage Va (=Pa sin ωt) gives $$Vx-Va=\{A(x)-Pa\}\sin \omega t$$

As in the above-mentioned case, the function characteristic of the amplitude coefficient "A(x)–Pa" can be likened to a characteristic of the first quadrant (i.e., the 0°–90° range) in a sine function, namely, it can be expressed equivalently as sin θ (approximately, 0°≦θ≦90°).

On the other hand, the second coil in the coil section presents a progressively decreasing variation curve opposite to the curve of the first coil. The output voltage Vy from the second coil corresponding to the start point of the detection section can be represented provisionally by "Pa' sin ωt", which corresponds to a maximum voltage value. Subtracting the reference voltage Va from the second coil output voltage Vy gives the following mathematical expression where the amplitude coefficient of the output voltage Vy is represented by A(y):

$$Vy-Va=A(y)\sin \omega t-Pa \sin \omega t=\{A(y)-Pa\}\sin \omega t \quad \text{Expression (3)}$$

Because A(y) equals Pa' at the start point of the detection section, the amplitude coefficient "A(y)–Pa", which is the result of the arithmetic operations, equals "Pa'–Pa" representing "maximum value–minimum value", which therefore becomes a maximum value that can be regarded equivalently as "1". At the end point of the detection section, on the other hand, A(y) equals Pa, so that the amplitude coefficient "A(y)–Pa", the result of the above arithmetic operations, becomes "0". Thus, the amplitude coefficient "A(y)–Pa" presents a function characteristic progressively decreasing from the maximum value "Pa'–Pa" (namely, "1") to "0" within the range of the detection section. This function characteristic of the amplitude coefficient can be likened to a characteristic of the first quadrant (i.e., the 0°–90° region) in the cosine function. Therefore, the amplitude coefficient "A(y)–Pa" of the A.C. output signal based on Expression (3) above can be expressed equivalently as cos θ (approximately, 0°≦θ≦90°).

Thus, in the case where a combination of two coils and a single reference voltages is employed as above, the present invention can readily produce two A.C. output signals presenting amplitudes of sine and cosine function characteristics (sin θ sin ωt and cos θ sin ωt), in response to a current position of the object to be detected. In this case too, the sine and cosine functions each present a characteristic within a range of substantially one quadrant (90°), so that every position over a detectable position range can be detected in terms of a phase angle within the substantially-90° range. Further, by just variably setting the level of the reference voltage Va, the detectable position range can be variably set and the detecting resolution of the device can be adjusted as desired, similarly to the above-mentioned.

Thus, according to the present invention, there can provide an improved position detector device which is very compact in size and very simple in structure, because it requires only a primary coil (or coils) with no need for a secondary coil. Further, using a combination of one coil and two reference voltages or a combination of two coils and one reference voltage, the present invention can readily produce a plurality of A.C. output signals presenting amplitudes of predetermined cyclic function characteristics (e.g., two A.C. output signals presenting amplitudes of sine and cosine function characteristics), in response to a current linear position of the object to be detected, and also can provide at least about one quadrant (90°) as an available phase angle range. Thus, even with a reduced number of coils, the present invention is capable of effective position detection over a relatively wide phase angle range and also achieves a highly enhanced detecting resolution. Besides, even for very minute or microscopic displacement of the object to be detected, the present invention allows a position of the object to be detected with a high resolution. Furthermore, by employing a circuit (e.g., a coil) presenting temperature characteristics similar to those of the detecting coils as the reference-voltage generation circuit, predetermined subtractive arithmetic operations in arithmetic operation circuitry can automatically compensate the temperature drift characteristics in an appropriate manner, thereby providing for high-accuracy position detection without influences of a temperature change. Further, to construct the reference-voltage generation circuit, a resistor or other suitable element may be used in place of the coils. Furthermore, the numbers of the coil and reference voltage may be greater than one or two, in which case the available phase angle range may be expanded to be greater than about one quadrant (90°).

The position detector device of the present invention can also be constructed as a rotary-type position detector device. If the amplitude coefficient component produced by an incremental (increasing) or decremental (decreasing) variation in the between-terminal voltage of a coil, corresponding to a rotational displacement of the object to be detected is represented by a function A(θ) with a rotational angle e as a variable, the between-terminal voltage of the coil can be expressed by A(θ)sin ωt. In this case, the amplitude coefficient component A(θ) takes only a positive value although it increases or decreases in accordance with the rotational displacement of the object to be detected. Assuming that the incremental/decremental variation curve of the amplitude coefficient component A(θ) presents a characteristic approximate to that of a sine curve and if its peak value is denoted by P, the amplitude coefficient component A(θ) can be expressed typically by an equation of "A(θ)=Po+P sin θ", where Po≧P. Namely, the amplitude coefficient component A(θ) presents such a characteristic that is obtainable by offsetting the value of P sin θ with the offset value Po.

The rotary-type position detector device of the present invention is characterized by: generating a predetermined reference voltage; taking out a voltage between terminals of a coil; and performing an arithmetic operation between the predetermined reference voltage and the taken-out between-terminal voltage of the coil, so as to generate an A.C. output signal having a predetermined cyclic amplitude function as an amplitude coefficient. If the predetermined reference voltage is represented by Po sin ωt, subtracting the reference voltage Po sin ωt from the between-terminal voltage of the coil A(θ)sin ωt gives $$A(\theta)\sin \omega t-Po \sin \omega t=(Po+Po \sin \theta)\sin \omega t-Po \sin \omega t=Po \sin \theta \sin \omega t$$

By performing arithmetic operations between the output signal from the single coil and the reference voltage, there can be generated an A.C. output signal having an amplitude coefficient component of a real sine function sine (or real cosine function) swinging in the positive and negative directions. Such inventive arrangements can greatly simplify the necessary coil structure. Further, the present invention can provide an improved rotary-type position detector device which is event more compact in size and even simpler in structure, because it requires only a primary coil with no need for a secondary coil.

In one embodiment of the inventive rotary-type position detector device, the coil section includes two coils positioned to be apart from each other by a predetermined angle along a direction of variation of relative rotational positions between the coils and the magnetism-responsive member, and the reference-voltage generation circuit generates a reference voltage (e.g., Po sin ωt) corresponding to a center point of variation in a voltage between terminals of each of the two coils. The arithmetic operation circuit subtracts the reference voltage from the voltage between the terminals of a first one of the two coils to cancel out a voltage offset corresponding to the reference voltage and thereby generates a first A.C. output signal (e.g., sin θ sin ωt) having, as an amplitude coefficient, a first cyclic amplitude function swinging about the center point of variation in positive and negative directions. The arithmetic operation circuit also subtracts the reference voltage from the voltage between the terminals of a second one of the two coils to cancel out a voltage offset corresponding to the reference voltage and thereby generates a second A.C. output signal (e.g., cos θ sin ωt) having, as an amplitude coefficient, a second cyclic amplitude function swinging about the center point of variation in the positive and negative directions. In this case, by providing only two coils, there can be generated a sine-phase output signal (sin θ sin ωt) and a cosine-phase output signal (cos θ sin ωt) similar to those produced by the known resolvers.

In another embodiment of the inventive rotary-type position detector device, the arithmetic operation circuit performs predetermined first and second arithmetic operations using the voltage between the terminals of one of the coils and the reference voltage, to thereby generate a first A.C. output signal having a first amplitude function as its amplitude coefficient and a second A.C. output signal having a second amplitude function as its amplitude coefficient. In this case, respecting a rotational displacement of the object within a predetermined limited range of mechanical rotational angles, position detecting data can be obtained on a predetermined limited phase detecting scale (i.e., a 90° range) rather than a full 360° phase detecting scale, as will be later described more fully. Despite the predetermined limited phase detecting scale, there can be generated a sine-phase output signal (sin θ sin ωt) and cosine-phase output signal (cos θ sin ωt) similar to those produced by the known resolvers, using only one coil.

In another implementation of the inventive rotary-type position detector device, the coil section may be provided in a predetermined limited angular range less than one full rotation range of the object to be detected so that the detector device can be suitably used to detect a rotational position within the predetermined limited angular range. Such a coil section extending only over a limited or biased angular range will be useful particularly in a situation where the rotary-type position detector device of the present invention is to be installed in a previously installed machine or apparatus. Namely, where some large obstacle is already present within the predetermined rotating angle range of an rotation shaft, which is the object to be detected, and it is impossible to install the stator coil section over a range corresponding to the full rotation of the rotation shaft, the coil section extending only over the limited angular range in the embodiment can be readily installed in an obstacle-free angular range, and thus can be very useful.

A rotary-type position detector device according to another aspect of the present invention comprises: a coil section including at least two pairs of coils to be excited by an A.C. signal, the coils in each of the pairs being positioned to be apart from each other by a distance corresponding to a predetermined rotational angle; a magnetism-responsive member rotationally movable relative to said coil section, wherein relative rotational positions between said magnetism-responsive member and said coil section vary in response to rotational displacement of an object to be detected and impedance of each of said coils is caused to vary in response to a variation in the relative rotational positions in such a manner that a voltage produced in each of said coils is caused to vary in response to a variation in the impedance of said coil during the variation in the relative rotational positions within a predetermined rotational angle range, the voltages produced in the respective coils in each of the pairs presenting differential characteristics; and a circuit coupled to said coil section, said circuit adapted to generate, for each of said two pairs of coils, an A.C. output signal having a predetermined cyclic amplitude function as an amplitude coefficient, by taking out a difference in the voltages produced in said respective coils, the cyclic amplitude functions of the A.C. output signals generated for said two pairs of coils being different in their cyclic characteristics by a predetermined phase.

If one of the coil pairs in the thus-constructed rotary-type position detector device is be of a sine phase and if one of the coils in the pair presents a characteristic of (Po+Po sin θ)sin ωt, then the other coil in the pair presents a characteristic of (Po−Po sin θ)sin ωt, because the incremental/decremental variations in the produced voltages, i.e., between-terminal voltages, of the coils in that pair present differential characteristics. Thus, taking out a difference between the two characteristics gives $(Po+P \sin θ)\sin ωt - \{(Po-P \sin θ))\sin ωt\} = 2P \sin θ \sin ωt$ Further, If the other coil pair in this inventive rotary-type position detector device is be of a cosine phase, the incremental/decremental variations in the between-terminal voltages of the coils in that pair present differential characteristics as follows. Namely, taking out a difference between the two characteristics gives $(Po+P \cos θ)\sin ωt - \{(Po-P \cos θ)\sin ωt\} = 2P \cos θ \sin ωt$ Such a different ial synthesis principle employed in the present invention is generally similar to the one already known in the field of the resolvers, except that the conventional-known resolvers would require both primary and secondary coils. Namely, in contrast to the conventional-known resolvers, the present invention requires only primary coils with no need for any secondary coil and thus can simplify the necessary coil structure, with the result that there can be provided an improved rotary-type position detector device significantly simplified in structure.

A position detector device according to still another aspect of the present invention comprises: a coil section including a plurality of coil segments to be excited by a predetermined A.C. signal, the coil segments being placed in series along a direction of displacement of an object to be detected; a magnetism-responsive member movable relative to said coil section, wherein relative positions between said magnetism-responsive member and said coil section vary in response to displacement of the object to be detected and impedance of each of said coil segments is caused to vary in response to a variation in the relative positions in such a manner that a voltage produced in each of said coil segments is caused to progressively increase or decrease during a movement of said magnetism-responsive member from one end to another of each of said coil segments; and an analog arithmetic operation circuit coupled to said coil section, said analog arithmetic operation circuit adapted to generate a plurality of A.C. output signals presenting amplitudes based on predetermined cyclic function characteristics corresponding to a position of the object to be detected, by taking out voltages of said coil segments and performing addition and/or subtraction on the taken-out voltages, the cyclic function characteristics defining the amplitudes of the plurality of A.C. output signals comprising cyclic functions of a same character that are different from each other by a predetermined phase.

Typically, the magnetism-responsive member includes at least one of a magnetic substance and an electrically-conductive substance. In the case where the magnetism-responsive member is made of a magnetic substance, as the magnetism-responsive member moves closer to any one of the coil segments, i.e., as the degree of proximity of the magnetism-responsive member to the coil segments increases, the self-inductance of the coil segment increases and the voltage produced in the coil segment (i.e., a between-terminal voltage of the coil segment) progressively increases during a movement of the tip of the magnetism-responsive member from one end to the other of the coil segment. By the sequential placement of the plurality of coil segments along the direction of displacement of the object to be detected, a progressive increase (or progressive decrease) occurs sequentially in the between-terminal voltages of the coil segments as the magnetism-responsive member moves relative to these coil segments in response to the displacement of the object to be detected. Thus, by combining and using the progressive increases (or progressive decreases) in the between-terminal voltages of the individual coil segments while regarding them as variations in partial phase ranges of predetermined cyclic functions, the present invention can generate a plurality of A.C. output signals presenting amplitudes based on predetermined cyclic function characteristics corresponding to a current position of the object to be detected. Namely, the plurality of A.C. output signals presenting amplitudes based on predetermined cyclic function characteristics, corresponding to a position of the object to be detected, can be generated by taking out the between-terminal voltages of the coil segments and performing addition and/or subtraction on the taken-out voltages.

Typically, a progressively-increasing variation curve of the between-terminal voltage of any one of the coil segments, which takes place during the movement of the magnetism-responsive member from the coil's one end to the other, can be likened, for example, to a functional value variation over a 0°–90° range of a sine function. Further, this progressively-increasing variation curve can be converted into a variation curve progressively decreasing from a predetermined level, by inverting the amplitudes of the voltages and performing a voltage shift operation to add a predetermined offset level to the inverted amplitudes. Such a progressively-decreasing variation curve of the between-terminal voltage can be likened, for example, to a functional value variation over a 90°–180° range of a sine function. Thus, the progressively-increasing variations of the between-terminal voltage, sequentially occurring, for example, in a series of four coil segments, can be likened to function value variations in the 0°–90° range, 90°–180° range, 180°–270° range and 270°–360° range, respectively. Sloping direction and voltage-shifting offset level in each of these ranges can be controlled as appropriate through suitable analog arithmetic operations. Thus, the present invention can generate a first A.C. output signals presenting amplitudes based on the sine function characteristic corresponding to a position of the object to be detected, as well as a second A.C. output signals presenting amplitudes based on the same-character cyclic function, i.e., the cosine function characteristic, which is shifted in phase from the sine function by 90°.

Thus, as a preferred embodiment of the present invention, there can be generated two A.C. output signals presenting amplitudes based on the sine and cosine function characteristics corresponding to a current position of the object to be detected. Generally, the A.C. output signals having amplitudes based on the sine function characteristic can be represented by sinesinωt, while the A.C. output signals having amplitudes based on the cosine function characteristic can be represented by cos θ sin ωt. These output signals are just similar in form to the outputs from the known position detector devices commonly called "resolvers", which are therefore extremely useful in various applications. In some application, the inventive position detector device may further comprise an amplitude-to-phase converter section that receives two A.C. output signals generated via the above-mentioned analog arithmetic operation circuit, then detects, from a correlation between the amplitude values of the A.C. output signals, a specific phase value in the sine and cosine functions defining the amplitude values, and then generates position detecting data indicative of a current position of the object to be detected.

Thus, according to the present invention, there can be provided an improved position detector device which is very compact in size and very simple in structure, because it requires only a primary coil with no need for any secondary coil. In addition, with the arrangement that a plurality of coil segments are placed in series along the direction of displacement of the object to be detected so that a progressive increase (or progressive decrease) occurs sequentially in the between-terminal voltages of the coil segments as the magnetism-responsive member moves from one end to the other of any one of the coil segments, the present invention can readily produce a plurality of A.C. output signals presenting amplitudes of predetermined cyclic function characteristics (e.g., two A.C. output signals presenting amplitudes of sine and cosine function characteristics), in response to a current linear position of the object to be detected, by taking out the between-terminal voltages of the coil segments and combining the taken-out voltages after performing addition and/or subtraction thereon. Further, the present invention can provide a wider available phase angle range; for example, the invention is also cable of detecting positions over a full phase angle range of 0°–360°. Because the plurality of A.C. output signals presenting amplitudes of predetermined cyclic function characteristics are generated by combining the output voltages from the plurality of coil segments presenting the same temperature characteristics after addition or subtraction having been performed thereon, the present invention can automatically compensate the temperature characteristics in an appropriate manner, thereby readily providing for high-accuracy position detection without influences of a temperature change. In addition, even for very minute or microscopic displacement of the object to be detected, a current position of the object can be detected with a high resolution, by detecting, from a correlation between the amplitude values of these A.C. output signals, a phase value in the predetermined cyclic functions (e.g., sine and cosine functions) defining the amplitude values.

Note that in the case where the magnetism-responsive member is made of a non-magnetic substance of good electrical conductivity, such as copper, there occurs an eddy-current loss that causes the self-inductance of the coil to decrease and the between-terminal voltage of the coil progressively decreases as the magnetism-responsive member moves closer to the coil. In this case too, the position detector device may be constructed in the same manner as mentioned above. Also, it is important to note that the magnetism-responsive member may be of a hybrid type comprising a combination of a magnetic substance and an electrically-conductive substance. As another example, the magnetism-responsive member may include a permanent magnet and the coil section may include a magnetic core. In this case, as the permanent magnet approaches, a corresponding portion of the magnetic core in the coil section is magnetically saturated or super-saturated, so that the between-terminal voltage of the coil progressively decreases in response to the movement of the magnetism-responsive member closer to the coil. Further, dummy impedance means, namely, the reference-voltage generation circuit, may comprise a resistor or inductance means such as a coil, as noted previously; however, the dummy coil has to be positioned in such a manner that its self-inductance is not influenced by the movement of the magnetism-responsive member.

BRIEF DESCRIPTION OF THE DRAWINGS

For better understanding of the object and other features of the present invention, its preferred embodiments will be described in greater detail hereinbelow with reference to the accompanying drawings, in which:

FIG. 1A is a schematic axial sectional view showing a principal part of a position detector device in accordance with an embodiment of the present invention, which is taken along an axis of a coil section;

FIG. 1B is a schematic plan view of the part of the position detector device shown in FIG. 1A;

FIG. 1C is a block diagram showing electric circuitry associated with the coil section of FIG. 1A;

FIGS. 2A and 2B are graphs explanatory of position detecting operation of the embodiment shown in FIG. 1A;

FIG. 3A is a schematic axial sectional view showing a principal part of a modification of the position detector device shown FIGS. 1A and 1B;

FIG. 3B is a schematic plan view of the part of the position detector device shown in FIG. 3A;

FIG. 4 is a schematic axial sectional view showing a principal part of another modification of the position detector device shown FIGS. 1A and 1B;

FIG. 5 is a schematic axial sectional view showing a principal part of still another modification of the position detector device shown FIGS. 1A and 1B;

FIG. 6 is a schematic axial sectional view showing a principal part of still another modification of the position detector device shown FIGS. 1A and 1B;

FIG. 7A is a schematic axial sectional view showing a principal part of a position detector device in accordance with another embodiment of the present invention;

FIG. 7B is a block diagram showing electric circuitry associated with a coil section of FIG. 7A;

FIGS. 8A and 8B are graphs explanatory of position detecting operation of the embodiment shown in FIG. 7A;

FIGS. 9A–9C show a rotary-type position detector device in accordance with an embodiment of the present invention, of which FIG. 9A is a schematic front view of a principal part of the position detector device showing an example of a physical positional relationship between individual detecting coils of a stator section and a magnetic-responsive member of a rotor section in the position detector device, FIG. 9B is a schematic sectional side view of the part of the position detector device, and FIG. 9C is a block diagram showing an example of electric circuitry associated with the detecting coils of the stator section;

FIGS. 10A and 10B are graphs explanatory of position detecting operation of the embodiment shown in FIGS. 9A to 9C, of which FIG. 10A shows ideal curves of impedance variations of the individual detecting coils responding to a variation in a rotational angle θ, FIG. 10B shows amplitude variation characteristics corresponding to a rotational angle θ in output signals produced by arithmetically operating output voltages from the detecting coils with a reference voltage;

FIGS. 14A–14C show an embodiment of the rotary-type position detector device in accordance with the present invention where only one detecting coil is employed, of which FIG. 14A is a schematic front view of a principal part of the position detector device showing an example of a physical positional relationship between the detecting coil of a stator section and a magnetic-responsive member of a rotor section in the position detector device, FIG. 14B is a schematic sectional side view of the part of the position detector device, and FIG. 14C is a block diagram showing an example of electric circuitry associated with the detecting coil of the stator section;

FIGS. 16A–16C show another embodiment of the rotary-type position detector device in accordance with the present invention where no reference voltage is used, of which FIG. 16A is a schematic front view of a principal part of the position detector device showing an example of a physical positional relationship between individual detecting coils of a stator section and a magnetic-responsive member of a rotor section in the position detector device, FIG. 16B is a sectional side view of the part of the position detector device shown in FIG. 16A, and FIG. 16C is a block diagram showing an example of electric and electronic circuitry associated with the detecting coils of the stator section FIGS. 17A to 17C show a position detector device in accordance with still another embodiment of the present invention, of which FIG. 17A is a schematic perspective view of a principal part of the position detector device, FIG. 17B is a sectional side view of the part of the position detector device taken along an axis of a coil section, and FIG. 17C is a block diagram showing an example of electric circuitry associated with the coil section;

FIGS. 21A to 21C show still another modification of the position detector device of FIGS. 17A to 17C, of which FIG. 21A is an electric circuit diagram pertaining to the coil section, FIG. 21B is a graph showing exemplary outputs from individual coils of the coil section, and FIG. 21C is a diagram explanatory of an exemplary manner in which the outputs from the individual coils are synthesized through arithmetic operations;

FIGS. 22A to 22C show still another modification of the position detector device of FIGS. 17A to 17C, of which FIG. 22A is an electric circuit diagram pertaining to the coil section, FIG. 22B is a graph showing exemplary outputs from individual coils of the coil section, and FIG. 22C is a diagram explanatory of an exemplary manner in which a position is detected on the basis of the outputs from the individual coils;

FIGS. 23A to 23E show still another modification of the position detector device of FIGS. 17A to 17C, of which FIG. 23A is an electric circuit diagram pertaining to the coil section, FIG. 23B is a graph showing exemplary outputs from individual coils of the coil section, FIG. 23C is a diagram explanatory of an exemplary manner in which the outputs from the individual coils are synthesized through arithmetic operations, FIG. 23D is a diagram explanatory of an exemplary manner in which a position is detected on the basis of the outputs from the individual coils, and FIG. 23E is an electric circuit diagram showing modified connection between the coils;

FIGS. 33A to 33C are diagram explanatory of principles on which the position detector device of FIG. 32 detects a position, of which FIG. 33A is a schematic perspective view of a principal part of the detector device showing a relationship between the coil section and the magnetism-responsive member of FIG. 32, FIG. 33B is a schematic sectional view taken along the axis of the coil section, and FIG. 33C is a block diagram showing electric circuitry associated with the coil section;

FIGS. 38A to 38C are schematic views of a position detector device in accordance with still another embodiment of the present invention, of which FIG. 38A is a schematic perspective view of a principal part of the position detector device, FIG. 38B is a partly-sectional side view thereof, and FIG. 38C is a view showing, in an unfolded condition, an example of a pattern of a magnetism-responsive member formed on a surface of a rod-shaped base member and an arrangement of coils corresponding thereof;

FIGS. 39A to 39E are schematic views of a position detector device in accordance with still another embodiment of the present invention, of which FIG. 39A is a cross-sectional view showing a rod-shaped base member and a coil section, FIG. 39B is a view showing the rod-shaped base member and coil section in an unfolded condition, FIG. 39C is a block diagram of electric circuitry associated with individual coils, and FIGS. 39D end 39E are diagrams explanatory of position detecting operation of the embodiment; and FIGS. 40A to 40D are schematic views of a position detector device in accordance with still another embodiment of the present invention, of which FIG. 40A is a diagram showing, in an unfolded condition, four different patterns that are formed on a base member by a magnetism-responsive member, FIGS. 40B and 40C are diagrams explanatory of position detecting operation of the embodiment, and FIG. 40D is a block diagram of electric circuitry associated with individual coils.

DETAILED DESCRIPTION OF THE PREFERRED EMBODIMENTS

Figure 9A:
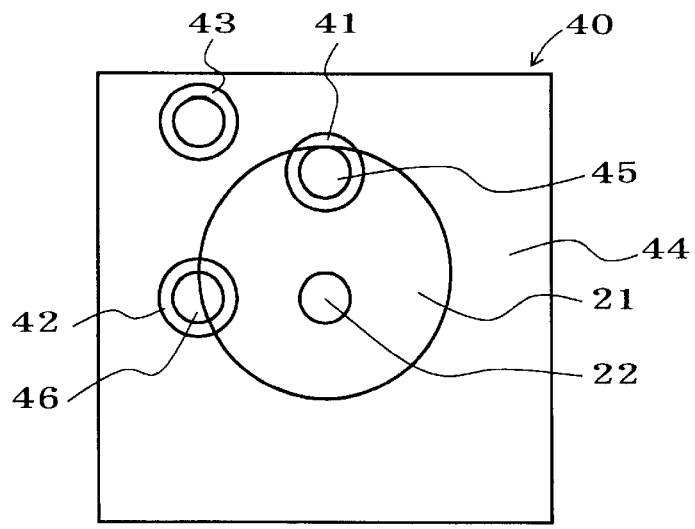

FIG. 1A is a sectional view of principal part of a position detector device in accordance with an embodiment of the present invention, showing an example of a physical positional relationship between a coil section 50 and a magnetism-responsive member 60 in the position detector device, which is taken along the axis of the coil section 50. FIG. 1B is a schematic plan view of the coil section 50 and magnetism-responsive member 60, and FIG. 1C is a diagram showing an example of electric circuitry associated with the coil section 50. The position detector device of FIG. 1 is constructed to detect a linear position of an object to be detected (object of detection), in which the coil section 50 is fixed in position and the magnetism-responsive member 60 is linearly movable relative to the coil section 50 in response to displacement of the object to be detected. However, it should be obvious that the magnetism-responsive member 60 may be fixed in position and the coil section 50 may be arranged to linearly move relative to the magnetism-responsive member 60 in response to displacement of the object to be detected.

The coil section 50 includes a single coil L1 to be excited by a predetermined A.C. signal, and a magnetic core 51 is provided in the coil L1. The magnetism-responsive member 60 has a flat surface opposed to an end of the magnetic core 51 with an air gap interposed therebetween, and this flat surface of the magnetism-responsive member 60 is movable in a direction of arrow "x" or in an opposite direction thereto in response to a variation in the position of the object to be detected, to thereby cause a dimensional variation in the interposing air gap. Such a variation in the interposing air gap, in turn, causes a variation in an amount of magnetic flux passing through the magnetic core 51 and coil L1, so that a self-inductance of the coil L1 varies. The variation in the self-inductance of the coil L1 also involves an impedance variation of the coil L1, which can be measured as a voltage between two terminals ("between-terminal voltage") of the coil L1. For the purpose of describing the principles of the present invention, let's assume that the magnetism-responsive member 60 is made of a magnetic substance such as iron. The position detector device thus constructed is suitable for use in detecting a minute or microscopic displacement of, for example, a film such as a diaphragm. If the diaphragm, which is the object to be detected, is made of a magnetic (or electrically-conductive) material, then the diaphragm itself can be caused to function as the magnetism-responsive member 60. In an alternative, the magnetism-responsive member 60 in the form of a film or surface may be pasted or coated on the diaphragm or the like to be detected.

In FIG. 1A, a maximum movable range of the magnetism-responsive member 60 is illustrated by points "a" and "b". The "a" point represents a position where the member 60 is located farthest from the coil L1, while the "b" point represents a position where the member 60 is located closest to the coil L1. FIG. 2A is a graph illustrating a variation curve of the impedance of the coil L1 (vertical axis z) relative to the position of the object to be detected (horizontal axis x). The impedance of the coil L1 when the magnetism-responsive member 60 is at the "a" point is denoted by "Za", and the impedance of the coil L1 when the magnetism-responsive member 60 is at the "b" point is denoted by "Zb". Further, the voltage between the terminals of the coil L1, i.e., output voltage from the coil L1, presents a minimum level (minimum amplitude coefficient) when the coil L1 has the impedance Za, but presents a maximum level (maximum amplitude coefficient) when the coil L1 has the impedance Zb.

As the relative position of the magnetism-responsive member 60 changes from the "a" point to the "b" point, the voltage between the terminals (i.e., between-terminal voltage) of the coil L1 varies progressively from a minimum value corresponding to the impedance Za to a maximum value corresponding to the impedance Zb. Thus, first and second reference voltages Va and Vb are set, as appropriate, within a range of values which the between-terminal voltage of the coil L1 may take. Namely, of the maximum movable range from the "a" point to the "b" point, an appropriate detection section R is selected. If an amplitude coefficient level (i.e., impedance) of the between-terminal voltage of the coil L1 occurring in correspondence with the start point of the detection section R is represented by "Pa", the between-terminal voltage of the coil L1, i.e., output voltage Vx, from the coil L1, corresponding to the start point of the detection section R can be represented by "Pa sin ωt", which is set as the first reference voltage Va; namely, $$Va = Pa \sin \omega t$$

Further, If an amplitude coefficient level (i.e., impedance) of the between-terminal voltage of the coil L1 occurring in correspondence with the end point of the detection section R is represented by "Pb", the between-terminal voltage of the coil L1, i.e., output voltage Vx, from the coil L1 corresponding to the end point of the detection section R can be represented by "Pb sin ωt", which is set as the second reference voltage Vb; namely, $$Vb = Pb \sin \omega t$$

As shown in FIG. 1C, the detecting coil L1 is excited, at a constant voltage or current, by a predetermined single-phase A.C. signal (provisionally denoted by "sin ωt") generated by an A.C. power supply 30. Because the inductance of the detecting coil L1 is variable in response to a changing position of the object to be detected as noted above, it is illustrated in the figure equivalently as a variable inductance. There are provided other coils Lr1 and Lr2 as circuits for generating the first and second reference voltages Va and Vb, which are also driven by the A.C. signal generated by the A.C. power supply 30. Once these elements are set in order to determine the desired detection section R, they are fixed at these settings for subsequent use.

Arithmetic operation circuit 31A subtracts the first reference voltage Va from the output voltage Vx from the detecting coil L1. If the amplitude coefficient of the output voltage Vx from the detecting coil L1 is represented by a function A(x), then the arithmetic operation circuit 31A performs the following arithmetic operations similar to Expression (1) above:

$$Vx - Va = A(x) \sin \omega t - Pa \sin \omega t = \{A(x) - Pa\} \sin \omega t$$

Because A(x) equals Pa at the start point of the detection section R, the amplitude coefficient "A(x)−Pa", which is the result of these arithmetic operations, becomes "0". On the other hand, at the end point of the detection section R, A(x) equals Pb, so that the amplitude coefficient "A(x)−Pa", which is the result of these arithmetic operations, equals "Pb−Pa". Thus, the "A(x)−Pa", the result of these arithmetic operations, presents a function characteristic increasing progressively from "0" to "Pb−Pa". If the maximum value "Pb−Pa" is regarded equivalently as "1", then the amplitude coefficient "A(x)−Pa" of the A.C. signal based on the above expression varies from "0" to "1" within the detection section R, and the function characteristic of the amplitude coefficient, as shown in FIG. 2B, can be likened to a characteristic of a first quadrant (i.e., a 0°–90° region) in the sine function. Therefore, the amplitude coefficient "A(x)−Pa" of the A.C. signal based on the above expression can be expressed equivalently using sine (approximately, $0° \leq \theta \leq 90°$). Although FIG. 2B shows only an amplitude coefficient curve sin θ of the sine function characteristic relative to a position x, an actual output from the arithmetic operation circuit 31A is an A.C. signal "sin θ sin ωt" having an amplitude level that corresponds to the amplitude coefficient sin θ.

Arithmetic operation circuit 31B computes a difference between the output voltage Vx from the detecting coil L1 and the second reference voltage Vb and performs the following arithmetic operations similar to Expression (2) above:

$$Vb - Vx = Pb \sin \omega t - A(x) \sin \omega t = \{Pb - A(x)\} \sin \omega t$$

Because A(x) equals Pa at the start point of the detection section R, the amplitude coefficient "Pb−A(x)", which is the result of these arithmetic operations, equals "Pb−Pa". On the other hand, at the end point of the detection section R, A(x) equals Pb, so that the amplitude coefficient "Pb−A(x)", which is the result of these arithmetic operations, becomes "0". Thus, the "Pb−A(x)", the result of these arithmetic operations, presents a function characteristic decreasing progressively from "Pb−Pa" to "0". If the maximum value "Pb−Pa" is considered equivalently to be "1", then the amplitude coefficient "Pb−A(x)" of the A.C. signal based on the above expression varies from "1" to "0" within the detection section R, and the function characteristic of the amplitude coefficient, as shown in FIG. 2B, can be likened to a characteristic of a first quadrant (i.e., a 0°–90° region) in the cosine function. Therefore, the amplitude coefficient "Pb−A(x)" of the A.C. signal based on the above expression can be expressed equivalently using cos θ (approximately, 0°≦θ≦90°). Although FIG. 2B shows only an amplitude coefficient curve cos θ of the cosine function characteristic relative to the position x, an actual output from the arithmetic operation circuit 31A is an A.C. signal "cos θ sin ωt" having an amplitude level that corresponds to the amplitude coefficient cos θ. The subtraction by the circuit 31B may be "Vx−Vb" rather than "Vb−Vx".

In this way, there can be generated two A.C. output signals that present respective amplitude levels of sine and cosine function characteristics (sin θ sin ωt and cos θ sin ωt) in response to a current position x of the object to be detected. These A.C. output signals are similar in form to output signals from the conventional position detectors commonly known as "resolvers" and can be utilized effectively in various applications. For example, the two resolver-type A.C. output signals generated by the arithmetic operation circuits 31A and 31B are sent to a phase detection circuit (or amplitude-to-phase converter) 32, which can detect the position of the object to be detected in absolute representation by measuring phase values θ of the sine and cosine functions sin θ and cos θ, defining the amplitude values, from a correlation between the amplitude values of the two A.C. output signals. The phase detection circuit 32 may be implemented such as by a technique disclosed by the inventors of the present invention in Japanese Patent Laid-open Publication No. HEI-9-126809 (corresponding to U.S. Pat. No. 5,710,509). For example, an A.C. signal sin θ cos ωt is generated by electrically shifting the first A.C. output signal sin θ sin ωt by 90°, two A.C. signals sin(ωt+θ) and sin(ωt−θ) phase-shifted in a phase-advancing or phase-delaying direction in accordance with θ (i.e., signals having their phase component θ converted into A.C. phase shifts) are generated by additively and subtractively synthesizing this signal sin θ cos ωt and the second A.C. output signal cos θ sin ωt, in such a manner that data indicative of a detected stroke position (stroke position detecting data) can be obtained by measuring the phase θ. This phase detection circuit 32 may be implemented either by a dedicated circuit in the form of an LSI or by software processing using a CPU, processor, computer or the like. In an alternative, a conventionally-known R-D converter normally used for processing a resolver output may be used in the phase detection circuit 32. Detection of the phase component θ in the phase detection circuit 32 may be performed by an analog process using an integration circuit and the like, rather than by a digital process. Alternatively, digital detecting data indicative of a rotational position θ may be generated by a digital phase detection process and then analog detecting data indicative of the rotational position e may be obtained by converting the digital detecting data into analog representation. Of course, the A.C. output signals sin θ sin ωt and cos θ sin ωt from the arithmetic operation circuits 31A and 31B may be output directly without being processed by the phase detection circuit 32, in which case the detection circuit 32 may be omitted.

If there is a linear correspondence between the phase angle θ and the position x of the object to be detected, the amplitudes in the A.C. output signals sin θ sin ωt and cos θ sin ωt of the sine and cosine function characteristics will not present real sine and cosine function characteristics. However, the phase detection circuit 32 carries out the phase detection process on these A.C. output signals sin θ sin ωt and cos θ sin ωt as apparently having real sine and cosine function characteristics. As a result of this phase detection process, the detected phase angle θ will not present linearity with respect to the position x of the object to be detected. In detecting the position, however, the non-linearity between the detection output data (detected phase angle θ) and the actual position of the object to be detected does not matter very much. Namely, it is only necessary to be able to perform the position detection with predetermined repetitive reproducibility. Further, if necessary, the output data from the phase detection circuit 32 may be converted into other data form by use of an appropriate data conversion table so that accurate linearity can be readily provided between the detection output data and the actual position of the object to be detected. Accordingly, the "amplitude characteristics of the sine and cosine functions" referred to in connection with the present invention need not necessarily present real sine and cosine function characteristics; in effect, they may be something like those of a triangular waveform, as illustratively shown in FIG. 2B, as long as they present such tendencies. In other words, it is only necessary that the sine and cosine functions in the present invention be similar to trigonometric functions such as a sine function. In the illustrated example of FIG. 2B, if the horizontal axis represents the phase angle θ and has given non-linear calibrations, even a function, apparently appearing as a triangular waveform when the horizontal axis calibrations are assumed to represent the positions x, can be said to be a sine or cosine function with respect to the phase angle θ.

The following paragraphs describe compensation of temperature drift characteristics. Even when the impedance of the detecting coil L1 varies in response to a change in temperature, the subtractive arithmetic operations in the arithmetic operation circuits 31A and 31B can cancel out a temperature drift, provided that the first and second reference voltages Va and Vb have temperature drift characteristics similar to those of the detecting coil L1. For this purpose, it is preferable that the coils Lr1 and Lr2, similar in characteristics to the detecting coil L1, be used for generation of the reference voltages and placed in an temperature environment similar to that of the detecting coil L1 (i.e., relatively close to the detecting coil L1). However, the reference-voltage-generating coils Lr1 and Lr2 need not necessarily be similar in characteristics to the detecting coil L1 although preferable, and they may be constructed to have temperature drift characteristics substantially similar to those of the detecting coil L1, e.g., by adjustment of additional resistors or the like. Further, to construct the reference-voltage generation circuits, resistors or other suitable constant-voltage-generating circuit may be used in place of the above-mentioned coils Lr1 and Lr2.

As previously mentioned, variably setting the levels of the reference voltages Va and Vb, i.e., the impedances Pa and Pb, would result in variably setting the detectable position range, i.e., the detection section R, used in the embodiment. Because every position within the detection section R can always be detected as a phase angle θ within a range of about 90° irrespective of the length of the detectable position range, i.e., the detection section R, the resolution of the position detection can be variably set by variably setting the levels of the reference voltages Va and Vb. This means that the position detection can be made with a super-high resolution even where very minute or microscopic displacement of the object is to be detected. For example, in a situation where the phase detection circuit 32 has a capability of using a 12-bit binary counter to detect a phase angle within the full 360° rotational range with a resolution of $2^{12}$ (=4096), the detecting resolution of a phase angle within the 90° range is "1024", which permits minute or microscopic position detection with a super-high resolution of about 5 micron if the detectable position range, i.e., the detection section R, is set to a length of 5 millimeters.

FIG. 3 shows a modification of the position detector device of FIG. 1, in which a moving direction x of a magnetism-responsive member 61 differs from that of FIG. 1 and the magnetic the coil section 50 may be constructed in the same manner as in FIG. 1. Specifically, FIG. 3A is a schematic sectional view of a principal part of the modified position detector device, and FIG. 3B is a schematic plan view of the part. Electric circuitry of the coil section 50 may be the same as in FIG. 1C and thus illustration of the electric circuitry is omitted here to avoid unnecessary duplication. In FIG. 3A, a maximum movable range of the magnetism-responsive member 61 is illustrated by points "a" and "b". The "a" point represents a position where the member 61 does not cover an end of the coil L1 so that the coil L1 produces a minimum output level. The magnetism-responsive member 61 is linearly movable from the "a" point in the direction of arrow x transversely to the end of the coil L1. Once the magnetism-responsive member 61, moving in the x direction, arrives at the "b" point as denoted by a dot-and-dash line 61', it completely covers the end of the coil L1 so that the coil L1 produces a maximum output level. Generally, the position detector device of FIG. 3 operates similarly to the embodiment of FIG. 1 so as to detect a position of the object to be detected.

FIG. 4 is a partly-sectional side view showing still another modification of the position detector device of FIG. 1. In this modification, the detecting coil L1 of the coil section 50 includes no magnetic core 51, and a rod-shaped magnetism-responsive member 62 is movable relative to the coil section 50 in a direction of arrow x to enter an interior space defined by the coil L1 in response to displacement of the object to be detected. In this case too, a maximum movable range of the magnetism-responsive member 62 is illustrated by points "a" and "b"; however, the maximum movable range in this modification corresponds substantially to the length of the coil L1. The modified position detector device of FIG. 4 also operates similarly to the embodiment of FIG. 1 so as to detect a position of the object to be detected.

FIG. 5 is a partly-sectional side view showing still another modification of the position detector device of FIG. 1. In this modification, the detecting coil L1 of the coil section 50 includes a magnetic core 51, and a magnetism-responsive member 63 in the shape of a cylindrical sleeve is movable relative to the coil section 50 in a direction of arrow x to cause the coil L1 to enter an interior space defined by the member 63 in response to displacement of the object to be detected. In this case too, a maximum movable range of the magnetism-responsive member 63 is illustrated by points "a" and "b", and the maximum movable range in this modification corresponds substantially to the length of the coil L1. However, the magnetism-responsive member 63 of FIG. 5 is made of a non-magnetic substance of good electrical conductivity, such as copper, so that as the magnetism-responsive member 63 moves closer to the coil L1 (the coil L1 enters deeper into the interior space of the magnetism-responsive member 63), there occurs a greater eddy-current loss that causes the self-inductance of the coil L1 to decrease. Therefore, the positions of the "a" and "b" points in this figure are reversed from those in the example of FIG. 4. The modified position detector device of FIG. 5 also operates similarly to the embodiment of FIG. 1 so as to detect a position of the object to be detected.

Further, FIG. 6 is a partly-sectional side view showing still another modification of the position detector device of FIG. 1. In this modification, the detecting coil L1 of the coil section 50 includes a magnetic core 51, and a magnetism-responsive member 64 in the form of a permanent magnet shaped into a cylindrical sleeve is movable relative to the coil section 50 in a direction of arrow x to cause the coil L1 to enter an interior space defined by the member 64 in response to displacement of the object to be detected. When the permanent magnet 64 gets sufficiently close the coil L1, a portion of the magnetic core 51 near the coil is magnetically saturated or supersaturated, so that the between-terminal voltage of the coil L1 drops. The permanent magnet 64 has a length at least equal to the length of the coil L1 in such a manner that the between-terminal voltage decreases progressively during a movement of the permanent magnet 64 from one end to the other of the coil L1. Namely, even in the case where a permanent magnet is used as the magnetism-responsive member 64, a progressively decreasing variation can be caused in the between-terminal voltage of the coil L1 during a movement of the permanent magnet 64 from one end to the other of the coil L1. The permanent magnet 64 may have any other shape than a ring as illustrated, such as a rod, in which case the magnetism-responsive member 64 comprising the permanent magnet may be arranged to pass the neighborhood of the coil L1 parallel to the axis of the coil L1. It is preferable that the magnetic core 51 of the coil L1 in this modification be formed into a relatively thin shape so that magnetic saturation takes place easily.

FIG. 7 shows still another embodiment of the position detector device of the present invention, in which the coil section 50 includes two coils L1 and L2 and only one reference voltage Va is used. More specifically, FIG. 7A is a sectional view schematically showing an example of a physical positional relationship between the coil section 50 and the magnetism-responsive member 60 in the position detector device, and FIG. 7B is a diagram showing an example of electric circuitry associated with the coil section 50. In the coil section 50 of FIG. 7, a magnetic core 51 is inserted in one of the coils L1 as in the example of FIG. 1, and similarly, another magnetic core 51 is inserted in the other coil L2. These two coils L1 an d L2 are provided coaxially in opposed relation so that ends of their respective magnetic cores 51 and 52 are opposed to each other, and the magnetism-responsive member 60 in the shape of a flat plate is interposed between the coils L1 and L2.

As in the forgoing cases, a maximum movable range of the magnetism-responsive member 60 is illustrated by points "a" and "b", and the "a" point represents a position where the member 60 is located farthest from the coil L1, while the "b" point represents a position where the member 60 is located closest to the coil L1. Conversely, for the other coil L2, the "a" point represents a position where the member 60 is located closest to the coil L2, while the "b" point represents a position where the member 60 is located farthest from the coil L2. Therefore, positions of the coils L1 and L2 relative to the magnetism-responsive member 60 change with opposite characteristics in response to displacement of the object to be detected, in response to which the impedance of the coils L1 and L2 also varies with opposite characteristics. FIG. 8A is a graph illustrating variation curves of the impedance of the coils L1 and L2 (vertical axis z) relative to the position of the object to be detected (horizontal axis x). If the impedance of the coil L1 when the magnetism-responsive member 60 is at the "a" point is denoted by "Za" and the impedance of the coil L1 when the magnetism-responsive member 60 is at the "b" point is denoted by "Zb", the impedance of the other coil L2 when the magnetism-responsive member 60 is at the "a" point becomes "Zb" and the impedance of the other coil L2 when the magnetism-responsive member 60 is at the "b" point becomes "Zb", due to the opposite characteristics.

As the relative position of the magnetism-responsive member 60 changes from the "a" point to the "b" point, the voltage between the terminals (i.e., between-terminal voltage) of the coil L1 varies progressively from a minimum value corresponding to the impedance Za to a maximum value corresponding to the impedance Zb. On the other hand, as the relative position of the magnetism-responsive member 60 changes from the "a" point to the "b" point, the between-terminal voltage of the other coil L2 varies progressively from a maximum value corresponding to the impedance Zb to a minimum value corresponding to the impedance Za. In this case, a single reference voltage Va is established in correspondence with an amplitude coefficient level (i.e., impedance) Pa of the between-terminal voltage of the coil L1 occurring in correspondence with the start point of a suitable detection section R selected out of the maximum movable range from the "a" point to the "b" point. Namely, the reference voltage Va is set in the same manner as noted above, namely, as follows $$Va=Pa \sin \omega t$$

As shown in FIG. 7B, the detecting coils L1 and L2 are excited, at a constant voltage or current, by a predetermined single-phase A.C. signal (provisionally denoted by "sin ωt") generated by an A.C. power supply 30. Because the inductance of the detecting coils L1 and L2 is variable in response to a position of the object to be detected as noted above, it is illustrated in the figure equivalently as a variable inductance. There are provided another coils Lr1 as a circuit for generating the reference voltage Va, which is also driven by the A.C. signal generated by the A.C. power supply 30.

Arithmetic operation circuit 31C subtracts the reference voltage Va from the output voltage Vx from the detecting coil L1, similarly to the arithmetic operation circuit 31A of FIG. 1. Namely, the arithmetic operation circuit 31C performs the following arithmetic operations similar to Expression (1) above:

$$Vx-Va=A(x)\sin \omega t-Pa \sin \omega t=\{A(x)-Pa\}\sin \omega t$$

Thus, as in the above-described case, the function characteristic of the amplitude coefficient in the A.C. output signal from the arithmetic operation circuit 31C, as shown in FIG. 8B, can be likened to a characteristic of a first quadrant (i.e., a 0°–90° range) in the sine function.

Arithmetic operation circuit 31D computes a difference between the output voltage Vy from the other detecting coil L2 and the reference voltage Va and performs the following arithmetic operations similar to Expression (3) above:

$$Vy-Va=A(y)\sin \omega t-Pa \sin \omega t=\{A(y)-Pa\}\sin \omega t$$

As seen from FIG. 8A, the voltage between terminals (between-terminal voltage) Vy of the coil L2 presents a progressively-decreasing variation curve of a characteristic opposite to that of the between-terminal voltage Vx of the coil L1, and the output voltage Vy produced from the coil L2 in correspondence with the start point of the detection section R is provisionally represented by Pa' sin ωt that is representative of a maximum value. Because A(y) equals Pa' at the start point of the detection section R, the amplitude coefficient "A(y)–Pa" of the A.C. output signal from the arithmetic operation circuit 31D equals "Pa'–Pa" representing "maximum value–minimum value", which therefore becomes a maximum value that can be regarded equivalently as "1". At the end point of the detection section R, on the other hand, A(y) equals Pa, so that the amplitude coefficient "A(y)–Pa" of the A.C. output signal based on the above arithmetic operations becomes "0". Thus, the amplitude coefficient "A(y)–Pa" of the A.C. output signal from the arithmetic operation circuit 31D presents a function characteristic progressively decreasing from the "Pa'–Pa" (namely, "1") to "0" within the range of the detection section R. This function characteristic of the amplitude coefficient can be likened to a characteristic of a first quadrant (i.e., a 0°–90° range) in the cosine function. Therefore, the amplitude coefficient "A(y)–Pa" of the A.C. output signal from the arithmetic operation circuit 31D can be expressed equivalently using cos θ (approximately, 0°≦θ≦90°) as shown in FIG. 8B.

Thus, also in the case where two detecting coils L1 and L2 and a single reference voltage Va are used, there can be generated two A.C. output signals that present respective amplitude levels of sine and cosine function characteristics (sin θ sin ωt and cos θ sin ωt) in response to a current position of the object to be detected. Further, in this case too, the sine and cosine functions present characteristics within the range of about one quadrant (90°), so that any position within the detectable position range, i.e., the detection section R, can be detected as a phase angle θ within the range of about 90°. In addition, the detectable position range, i.e., the detection section R, can be variably set by variably setting the level of the reference voltage Va, which allows the detecting resolution to be adjusted. Furthermore, similarly to the embodiment of FIG. 1, the modified embodiment of FIG. 7 permits effective compensation of temperature drift characteristics.

It is also important to note that the modifications of FIGS. 3 to 6 applicable to the embodiment of FIG. 1 are also applicable to the embodiment of FIG. 7 in the same manner as described above. Details of how to modify the embodiment of FIG. 7 should be obvious from FIGS. 3 to 6 and are not specifically illustrated to avoid unnecessary duplication.

Note that in each of the above-described embodiments, the magnetism-responsive member 60, 61 or 62 may be made of a non-magnetic substance of good electrical conductivity, such as copper. In such a case, the inductance of each of the detecting coils decreases due to an eddy-current loss, and the between-terminal voltage decreases as the magnetism-responsive member 60, 61 or 62 moves closer to the coil. In this case too, the position detecting operations can be performed in the manner as described above. Also note that the magnetism-responsive member may be of a hybrid type comprising a combination of a magnetic substance and an electrically conductive substance.

Further, although the A.C. output signals are provided in sine and cosine phases (i.e., as resolver-type output signals), the present invention is not so limited; for example, the A.C. output signals may be provided in three phases (the amplitude functions of the individual phases may be, for example, sin θ, sin(θ+120) and sin(θ+240)).

Now, a description will be made about several examples of rotational or rotary-type position detector devices as other preferred embodiments of the present invention.

Figure 9B:
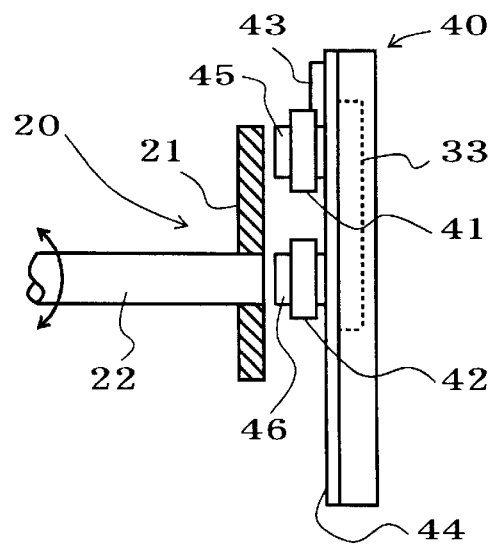
Figure 9C:
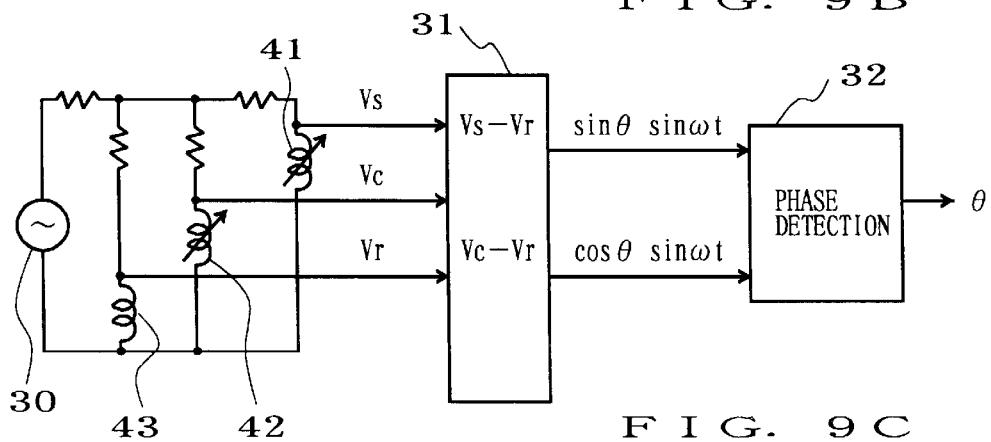

FIGS. 9A–9C show an embodiment of a rotary-type position detector device arranged in such a way that amplitude variations throughout a full electric angle range of 0° to 360° can be obtained in two A.C. output signals having amplitudes that present sine and cosine function characteristics. More specifically, FIG. 9A is a schematic front view of a principal part of the rotary-type position detector device, which shows an example of a physical positional relationship between detecting coils 41, 42 of a stator section 40 and a magnetic-responsive member 21 of a rotor section 20 in the position detector device. FIG. 9B is a sectional side view of the part of the rotary-type position detector device shown in FIG. 9A, and FIG. 9C is a block diagram showing an example of electric and electronic circuitry associated with the detecting coils 41 and 42. The magnetic-responsive member 21 of a predetermined shape, such as an eccentric disk shape, is mounted on a rotation shaft 22 which is an object to be detected here, to thereby constitute the rotor section 20. The following description is made in relation to a case where the magnetic-responsive member 21 is made of a magnetic substance such as iron. The stator section 40 is opposed to the rotor section 20 in a thrust direction of the rotation shaft 22.

The stator section 40 includes the two coils 41 and 42 as detecting coils, which are disposed on a stator base 44 and spaced apart from each other at a predetermined interval in a circumferential direction of the magnetic-responsive member 21. The predetermined interval in the circumferential direction is such an interval that forms an angle of 90° relative to the rotation shaft 22. The detecting coils 41 and 42 are wound on iron cores (magnetic cores) 45 and 46, respectively, and a magnetic flux passing through the coils 41 and 42 is oriented in the axial direction of the rotation shaft 22. Air gap is formed between end surfaces of the coil iron cores 45 and 46 of the coils 41 and 42 and a surface of the magnetic-responsive member 21 of the rotor section 20, so that the rotor section 20 rotates relative to the stator section 40 in a non-contact fashion. The relative positions between the rotor section 20 and the stator section 40 are established via a not-shown mechanism in such a manner that the distance between the rotor section 20 and the stator section 40 defined by the air gap is kept constant. Due to the predetermined shape, such as an eccentric disk shape, of the magnetic-responsive member 21 of the rotor section 20, the areas of the end surfaces of the coil iron cores 45 and 46 that are opposed to the magnetic-responsive member 21 with the air gap interposed therebetween will vary in accordance with a varying rotational position of the magnetic-responsive member 21. Such variations in the areas of the end surfaces of the coil iron cores 45 and 46 opposed to the magnetic-responsive member 21 vary the amount of the magnetic flux passing through the iron cores 45 and 46 and then through the coils 41 and 42, which results in variations in the self-inductance of the coils 41 and 42 and hence variations in the impedance of the coils 41 and 42.

The predetermined shape of the magnetic-responsive member 21 of the rotor section 20 in this embodiment is chosen such that an ideal sine function curve can be provided. For example, in order to provide one cycle of a sine function curve per rotation of the rotation shaft 22, the magnetic-responsive member 21 may generally be formed into a substantially eccentric disk shape as mentioned above; precisely speaking, however, it is known that the magnetic-responsive member 21 can be formed into an appropriately distorted shape or a heart-like shape depending on various design specifications such as the shapes of the coils and iron cores. Because choosing the shape of the magnetic-responsive member 21 and hence the rotor 20 is not an essential part of the present invention and the rotor may have any one of the shapes employed in known or unknown variable-reluctance-type rotation detectors, no further reference will be made to the rotor shape. What the predetermined shape of the magnetic-responsive member 21 of the rotor section 20 is like is not important here; briefly speaking, it is only necessary that variations in the inductance, i.e., impedance, of the coils 41 and 42 responding to a varying rotational position of the rotor section 20 be designed as appropriately as possible to be similar to the ideal sine function curve.

Figure 10A:
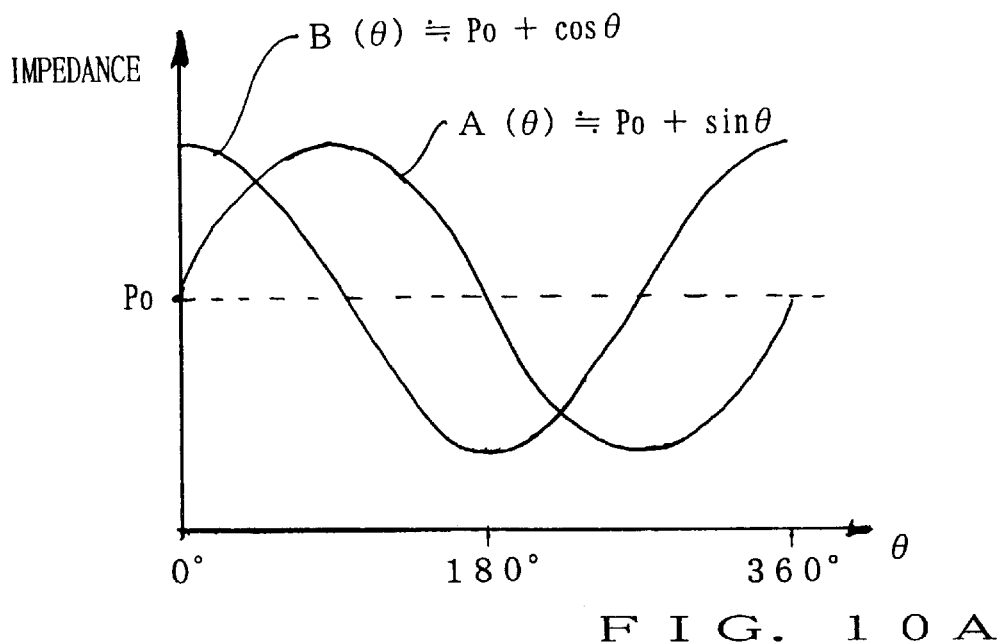

FIG. 10A is a graph showing, by $A(\theta)$, an ideal sine function curve of the impedance of one of the coils 41 responding to a variation in a rotational angle θ and also showing, by $B(\theta)$, an ideal sine function curve of the impedance of the other coil 42 responding to the variation in the rotational angle θ. As apparent, because the other coil 42 is shifted from the coil 41 by 90°, the curve $B(\theta)$ represents a cosine function. Thus, if a center point of increasing and decreasing variations (upward and downward swings) in each of the curves $A(\theta)$ and $B(\theta)$ is represented by Po and an amplitude of the swing is represented by P, $A(\theta)=Po+P \sin \theta$ $B(\theta)=Po+P \cos \theta$ Note that no significant inconvenience will arise in description of the present invention even if the amplitude P is regarded as "1" and ignored, the amplitude P is not considered in the following description.

As shown in FIG. 9C, the detecting coils 41 and 42 are excited, at a constant voltage or current, by a predetermined single-phase, high-frequency A.C. signal (provisionally denoted by "sin ωt") generated by an A.C. power supply 30. If between-terminal voltages of the coils 41 and 42 are represented by "Vs" and "Vc", respectively, they can be expressed by the following expressions with the rotational angle θ to be detected used as a variable:

$Vs=A(\theta)\sin \omega t=(Po+\sin \theta)\sin \omega t$ $Vc=B(\theta)\sin \omega t=(Po+\cos \theta)\sin \omega t$ Coil (dummy coil) 43 functions to generate a reference voltage Vr and it has a predetermined impedance corresponding to, for example, the center point Po. This coil 43 is mounted on the stator base 44, as shown in FIGS. 9A and 9B, at such a position where it always remains unaffected by a movement of the magnetic-responsive member 21 of the rotor section 20 and is placed under same temperature drift conditions as the detecting coils 41 and 42. This arrangement serves the purpose of compensating for temperature drifts of the detecting coils 41 and 42. This coil (dummy coil) 43 is also excited by the A.C. signal, and its between-terminal voltage, i.e., the reference voltage Vr, can be expressed as $$Vr = Po \sin \omega t$$

Note that if the dummy coil 43 is masked with a magnetic material to provide a magnetic shield against the influence of the magnetic-responsive member 21, then the dummy coil 43 may be positioned near the magnetic-responsive member 21.

The output voltages Vs, Vc and Vr from the above-mentioned coils 41, 42 and 43 are given to an analog arithmetic operation circuit 31 for arithmetic operations based on the following mathematic expressions. Thus, there are generated, from the analog arithmetic operation circuit 31, two A.C. output signals of respective amplitudes that present sine and cosine function characteristics (i.e., two A.C. output signals having amplitude function characteristics phase-shifted from each other by 90°) corresponding to a current position θ of the object to be detected. Namely, the analog arithmetic operation circuit 31 subtracts the reference voltage Vr from the output voltages Vs and Vc from the detecting coils 41 and 42 as follows:

$$Vs - Vr = (Po + \sin \theta) \sin \omega t - Po \sin \omega t = \sin \theta \sin \omega t$$

$$Vc - Vr = (Po + \cos \theta) \sin \omega t - Po \sin \omega t = \cos \theta \sin \omega t$$

Figure 10B:
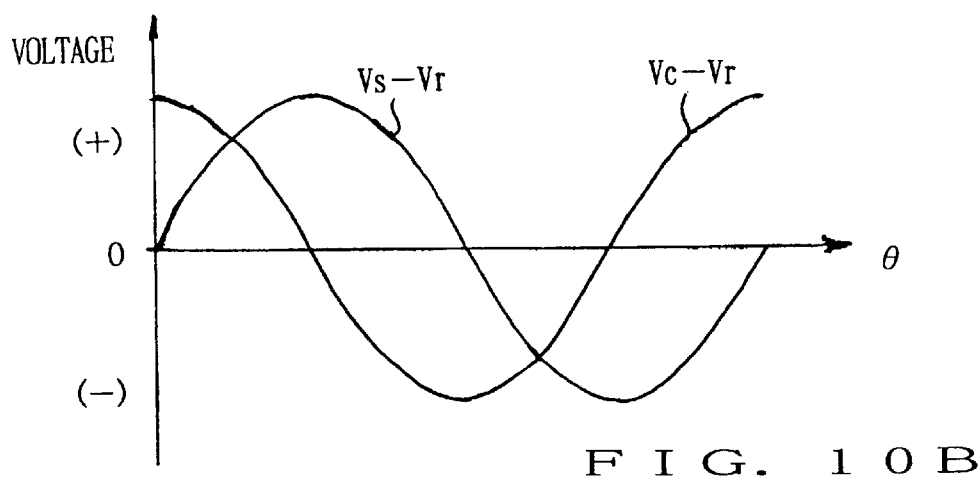

By performing arithmetic operations on the between-terminal voltages Vs and Vc of the detecting coils 41 and 42 and the reference voltage Vr in the above-mentioned manner, there can be generated two A.C. output signals (sin θ sin ωt and cos θ sin ωt) having, as amplitude coefficients, two cyclic amplitude functions (sin θ and cos θ) swinging in the positive and negative directions about the variation center point with an offset corresponding to the reference voltage Vr being eliminated. FIG. 10B schematically shows these conditions only for the e component (with no component of time t shown). In this way, the provision of the two detecting coils 41 and 42 alone can give the sine-phase output signal sin θ sin ωt and cosine-phase output signal cos θ sin ωt similar to the outputs from the conventionally-known resolvers.

Rotational position θ of the object to be detected can be detected in an absolute value by a phase detection circuit (or amplitude-to-phase converter) 32 measuring the phase component θ of the amplitude functions sin θ and cos θ in the A.C. output signals sin θ sin ωt and cos θ sin ωt of the sine and cosine function characteristics produced from the analog arithmetic operation circuit 31. The phase detection circuit 32 used here may be the same as the above-mentioned. Note that the signals sin θ sin ωt and cos θ sin ωt from the analog arithmetic operation circuit 31 may be output directly without being processed by the phase detection circuit 32, such as in a situation where three-phase signals, similar to those provided by a conventionally-known "synchro", have been produced by the analog arithmetic operation circuit 31. Also note that a block 33 provided on the reverse side of the stator base 14 shown in FIG. 9B indicates that necessary circuitry may be mounted on this portion. For example, only the arithmetic operation circuit 31, or all the circuits of FIG. 9C including not only the arithmetic operation circuit 31 but also the A.C. power supply 30 and phase detection circuit 32 may be mounted on the block 33. If the A.C. power supply 30 and phase detection circuit 32 are implemented by digital circuits, these circuits can be incorporated into an LSI chip of a much smaller size so that the circuits can be attached together to the reverse side of the stator base 44 as an integral or one-piece unit.

Now explaining compensation of temperature drift characteristics, the impedance of the individual coils 41, 42 and 43 varies in response to a temperature change, so that their respective output voltages Vs, Vc and Vr also vary. For example, each of the output voltages increases or decreases in one direction, as shown in FIG. 10A by a dotted line in contradistinction to a solid-line curve. However, because the above-mentioned arithmetic operations of "Vs–Vr" and "Vc–Vr" have completely compensated for temperature drifts in the A.C. output signals sin θ sin ωt and cos θ sin ωt of the sine and cosine function characteristics which are the results of arithmetically synthesizing the coil output voltages Vs, Vc and Vr, the output voltages have no significant influence of the temperature drifts. Therefore, in the application where the dummy coil 13 is employed as a circuit for generating the reference voltage Vr, the reference voltage Vr would also vary in value in response to a change in ambient temperature (i.e., drift with temperature), so that the subtractive arithmetic operations can automatically compensate for the temperature drifts, thereby providing for high-accuracy position detection. It should be obvious that the circuit for generating the reference voltage Vr may be implemented by any other suitable circuit than the coil, such as a combination of a coil and resistor or a resistor alone. For example, maximum and minimum values of the above-mentioned curves A(θ) and B(θ) may be detected, prior to the position detecting operations, to obtain an average value thereof, then evaluate a voltage level corresponding to the center point Po of the increasing and decreasing variations in the values of the curves A(θ) and B(θ) and generate the evaluated voltage as the reference voltage Vr.

Figure 11A:
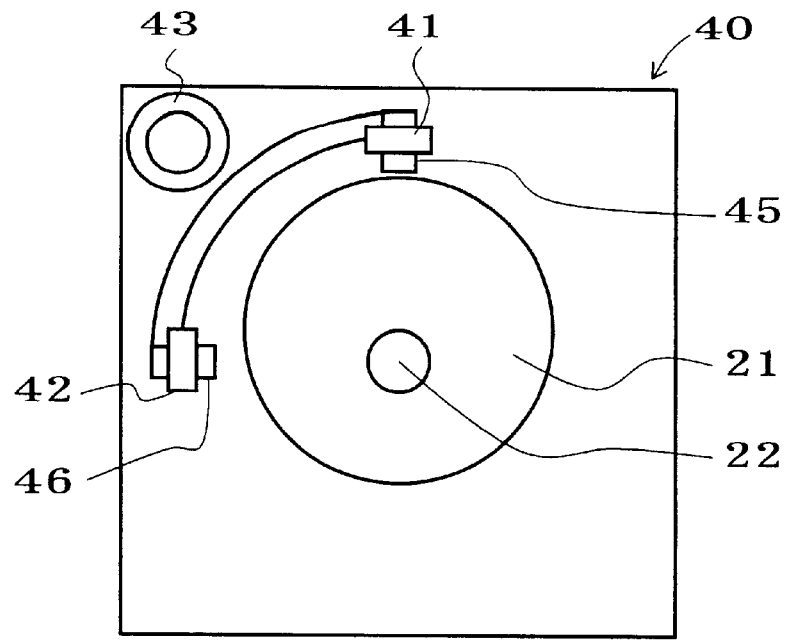
FIG. 11A is a schematic front view showing a principal part of a rotary-type position detector device in accordance with another embodiment of the present invention.
Figure 11B:
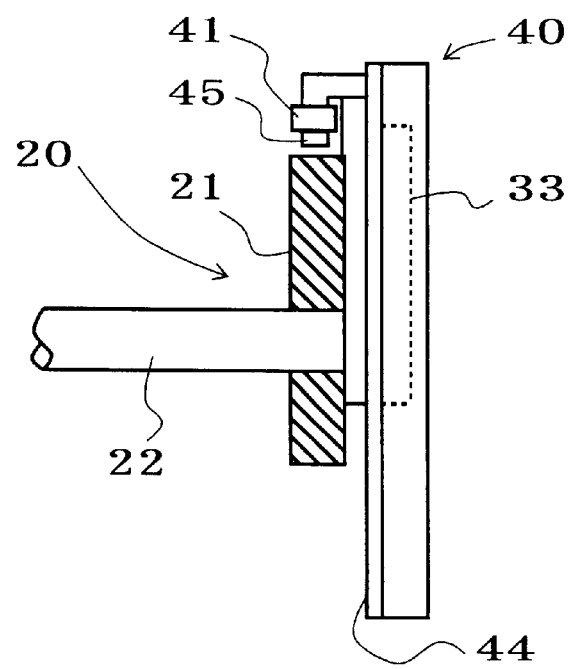
FIG. 11B is a schematic sectional side view of the principal part of the rotary-type position detector device.

Whereas, in the embodiment of FIGS. 9A and 9B, the ends of the iron cores (magnetic cores) 45 and 46 in the detecting coils 41 and 42 are shown and described as oriented in the thrust direction of the rotation shaft 22, the present invention is not so limited; of course, the ends of the iron cores 45 and 46 may be oriented in the radial direction of the rotation shaft 22. FIGS. 11A and 11B are a schematic front view and a sectional view, respectively, showing an example where the iron cores (magnetic cores) 45 and 46 in the detecting coils 41 and 42 are oriented in the radial direction of the rotation shaft 22. In these FIGS. 11A and 11B, the same reference characters as in FIGS. 9A and 9B represent elements of the same functions as in FIGS. 9A and 9B and thus will not be described here to avoid unnecessary duplication. In FIGS. 11A and 11B, the ends of the iron cores 45 and 46 in the detecting coils 41 and 42 are oriented inwardly in the radial direction of the rotation shaft 22 and are each opposed to the outer surface of the magnetism-responsive member 21 of the rotor section 20 with an air gap interposed therebetween. Due to the predetermined shape, such as an eccentric disk shape, heart-like shape or other appropriately designed shape, of the magnetic-responsive member 21 of the rotor section 20, a radial distance between each of the ends of the coil iron cores 41 and 42 and the outer surface of the magnetism-responsive member 21, which is defined by the interposing air gap, is caused to vary in response to rotation of the magnetic-responsive member 21. Such variations in the distance between the ends of the coil iron cores 41 and 42 and the outer surface of the magnetism-responsive member 21 vary the amount of the magnetic flux passing through the iron cores 45 and 46 and then through the coils 41 and 42, which results in variations in the self-inductance of the coils 41 and 42 and hence variations in the impedance of the coils 41 and 42. Thus, the arrangement of FIGS. 11A and 11B operates similarly to the arrangement of FIGS. 9A and 9B so as to detect a rotational position of the object to be detected. However, in the example of FIGS. 11A and 11B, the outer surface of the magnetic-responsive member 21 of the rotor section 20 has a slightly greater axial length, so that even when the rotation shaft 22, which is the object to be detected, mechanically shakes more or less in the thrust direction, the increased axial length of the magnetic-responsive member 21 can prevent variations in the radial distance defined by the air gap between the ends of the coil iron cores 41 and 42 and the outer surface of the magnetism-responsive member 21, thereby preventing a undesired reduction in the detection accuracy of the device. For this reason, the arrangement of providing the radial air gap as shown in FIGS. 11A and 11B advantageously allows detection of a rotational position to be made without being influenced by mechanical shakes in the thrust direction in the case where the present invention is applied to an environment or machine in which the rotation shaft 22 is apt to shape in the thrust direction. It will be obvious that a modification similar to the one of FIGS. 11A and 11B is also possible in other embodiments shown in and after FIGS. 12A and 12B.

Figure 12A:
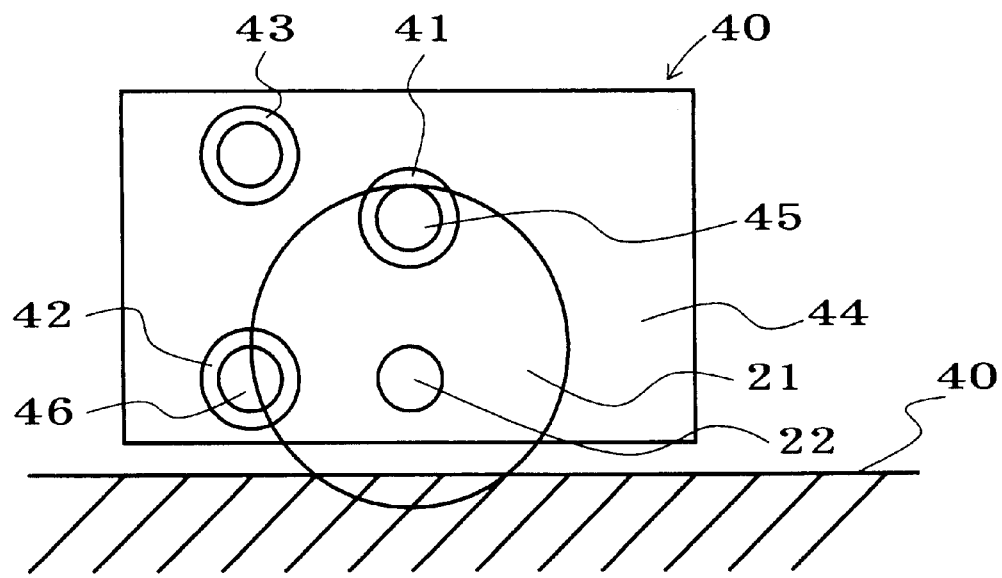
FIG. 12A is a schematic front view showing a principal part of a rotary-type position detector device in accordance with still another embodiment of the present invention.
Figure 12B:
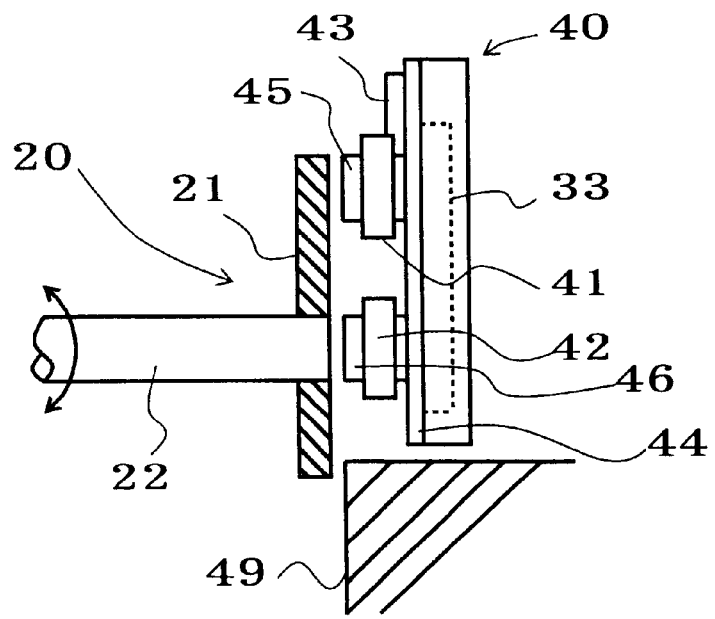
FIG. 12B is a schematic sectional side view of the principal part of the rotary-type position detector device.

In each of the embodiments of FIGS. 9A and 9B and FIGS. 11A and 11B, the detecting coils 41 and 42 are positioned in a predetermined limited angular range (somewhat greater range than 90°) within one full rotation. Thus, the stator base 44 need not have a great size, such as shown in FIGS. 9A and 9B and FIGS. 11A and 11B, which corresponds to the full rotation of the rotor section 20; the stator base 44 may be formed into a size corresponding only to a limited range of, say, a half rotation, as shown in FIGS. 12A and 12B. Thus sizing the stator base 44 allows the detector device to be installed while properly avoiding an obstacle 49, even where there is such an obstacle 49 at a place as shown in FIGS. 12A and 12B. Such a limited or biased placement of the coils 41 and 42 in the stator section 40 will prove very useful in a situation where the rotary-type position detector device of the present invention is to be installed in a previously-installed machine. Namely, in the case where an obstacle 49 is already present within the predetermined rotating angle range of the rotation shaft 22 and it is impossible to install the stator section 40 of a great size corresponding to the full rotating range of the rotation shaft 22, the above-mentioned stator section 40, with the coils 41 and 42 positioned at limited places within a limited angular range where the obstacle 49 is not present, can provide a good solution and thus is very useful. Of course, in each of the embodiments, the rotation shaft 22, i.e., the object to be detected, itself may be designed to be able to rotate continuously through more than one full rotation or through only a limited angular range less than one full rotation (namely, reciprocatively swing within the limited angular range). Further, the inventive position detector device of the type where the air gap is formed with respect to the radial direction of the rotation shaft 22 as shown in FIGS. 11A and 11B is particularly useful because it can be readily installed when applied to a situation where an obstacle must be properly avoided in the installation of the device and during operation of the device as shown in FIGS. 12A and 12B.

Figure 13:
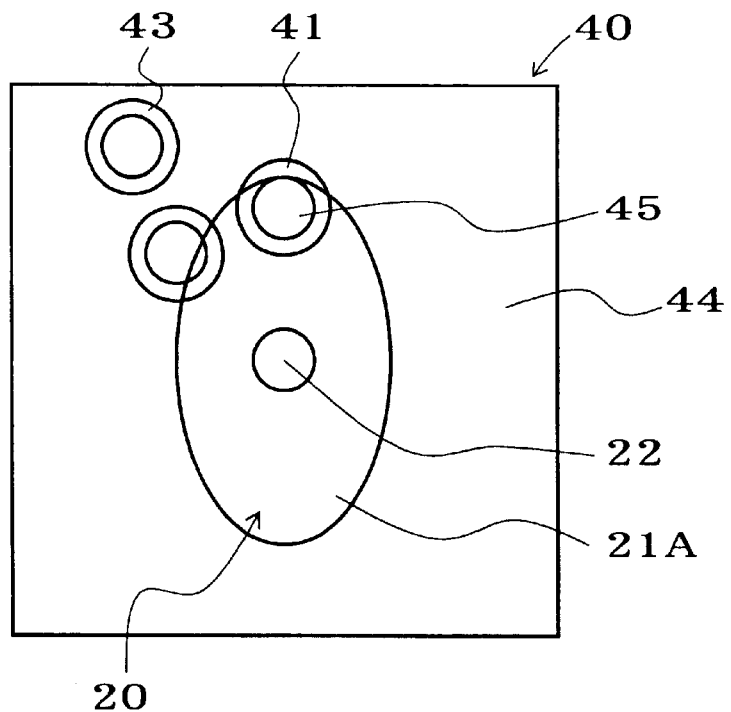
FIG. 13 is a schematic front view showing a principal part of a rotary-type position detector device in accordance with still another embodiment of the present invention.

In the examples of FIGS. 9A to 12B, the phase component θ in the amplitude functions of the A.C. output signals sin θ sin ωt and cos θ sin ωt, provided on the basis of the outputs from the coils 41 and 42, corresponds to a mechanical rotational angle θ of the rotation shaft 22 on a one-to-one basis. However, the present invention is not so limited, and the phase component θ in the amplitude functions may be set to correspond to n or 1/n times of the mechanical rotational angle θ of the rotation shaft 22. One example where the phase component θ in the amplitude functions is set to correspond to two times of the mechanical rotational angle is shown in FIG. 13, which is a schematic front view similar to FIG. 9A. Namely, in the example of FIG. 13, two coils 41 and 42 are positioned, in spaced apart relation to each other, form an angle of about 45° with respect the rotation shaft 22, and a magnetism-responsive member 21A of the rotor section 20 is designed into a specific shape, such as an oval or near-oval shape, that can bring about progressively increasing/decreasing variations of a two-cycle sine function in the impedance of the coils 41 and 42 per mechanical rotation of the rotation shaft 22. With this arrangement, the phase component θ in the amplitude functions of the A.C. output signals sin θ sin ωt and cos θ sin ωt, provided on the basis of the outputs from the coils 41 and 42, will present a value twice as great as the mechanical rotational angle θ' of the rotation shaft 22; that is, θ=2θ'. Various other modifications than the one of FIG. 13 are also possible according to the basic principles of the present invention.

Figure 14A:
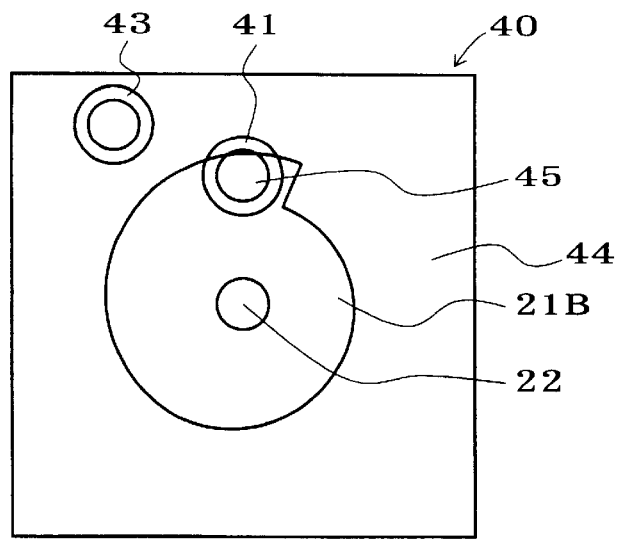
Figure 14B:
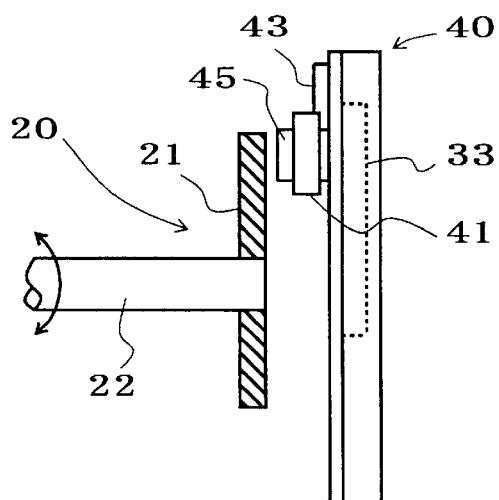
Figure 14C:
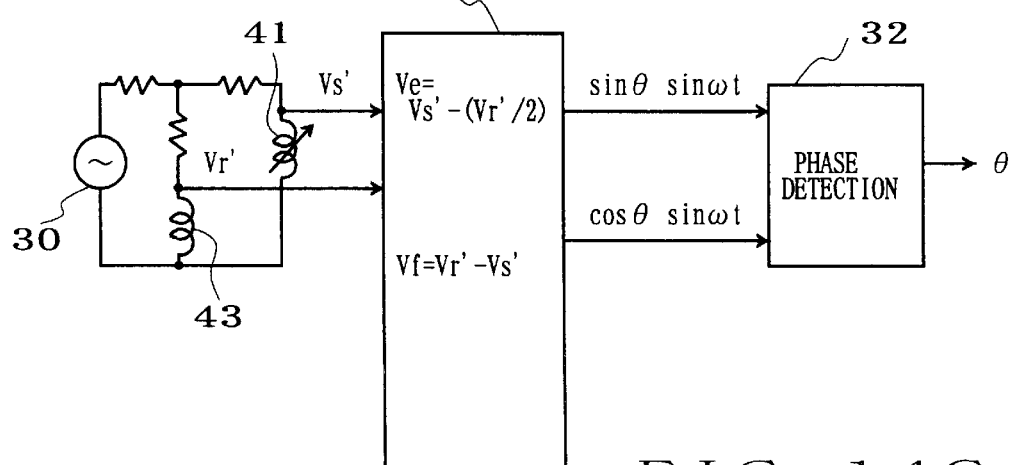

FIGS. 14A to 14C show a position detector device in accordance with another embodiment of the present invention, where the stator section 40 includes only one detecting coil 41 and signals equivalent to two A.C. output signals sin θ sin ωt and cos θ sin ωt are generated on the basis of the output from the only coil 41 and reference voltage Vr. More specifically, FIG. 14A is a schematic front view of a principal part of the position detector device, which shows an example of a physical positional relationship between the detecting coil 41 of the stator section 40 and a magnetic-responsive member 21B of the rotor section 20 in the position detector device. FIG. 14B is a sectional side view of the part of the rotary-type position detector device shown in FIG. 14A, and FIG. 14C is a block diagram showing an example of electric and electronic circuitry associated with the detecting coil 41 of the stator section 40. In this embodiment, the magnetic-responsive member 21B of the rotor section 20 is generally in the shape of a swirl cam, which is designed such that the phase component θ in the amplitude functions of the A.C. output signals presents a variation within a range of about 90° relative to a mechanical rotational angle range of the rotation shaft 22. Due to the swirl-cam shape of the rotor section 20, the embodiment of FIGS. 14A to 14C is somewhat unsuitable for position detection over the full rotating range of the rotation shaft 22, but it is quite suitable for detection of a rotational position within a predetermined limited mechanical rotational angle range less than one complete rotation, i.e., excepting a stepped portion of the swirl-cam shape of the magnetic-responsive member 21B.

Figure 15:
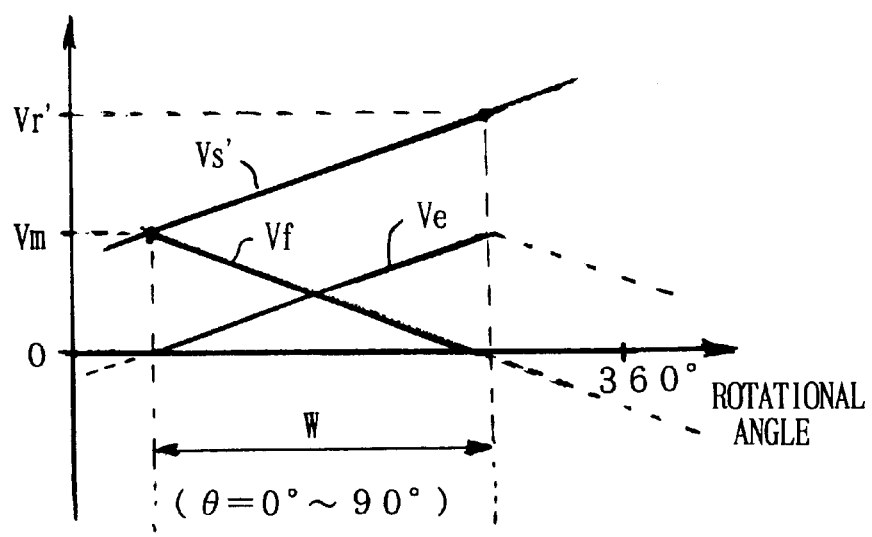
FIG. 15 is a graph explanatory of position detecting operation of the embodiment shown in FIGS. 14A to 14C.

In the embodiment of FIGS. 14A to 14C, a between-terminal voltage Vs' of the coil 41 presents a characteristic increasing (or decreasing) linearly in one direction within a predetermined mechanical rotational angle range less than one complete rotation of the rotation shaft 22, as typically illustrated in FIG. 15. Of the thus-varying between-terminal voltage Vs' of the coil 41, a value twice as great as a minimum or near-minimum value Vm is set as a reference voltage Vr' and produced by means of the dummy coil 43. As shown in FIG. 14C, the output voltages from the coils 41 and 43 are fed to the arithmetic operation circuit 31. In turn, the arithmetic operation circuit 31 of FIG. 14C subtracts a half of the reference voltage Vr' (namely, Vm) from the between-terminal voltage Vs' of the coil 41 to thereby generate a first A.C. output signal having an amplitude characteristic increasing virtually from the zero level as denoted by Ve in FIG. 15, and also subtracts the between-terminal voltage Vs' of the coil 41 from the reference voltage Vr' (namely, 2Vm) to thereby generate a second A.C. output signal having an amplitude characteristic decreasing virtually from the level Vm as denoted by Vf in FIG. 15.

$$Ve=Vs'-(Vr'/2)$$

$$Vf=Vr'-Vs'$$

The amplitude function characteristics of these A.C. output signals within a range W shown in FIG. 15 can be associated equivalently with a single quadrant (90° range) of sine and cosine functions. For instance, the first A.C. output signal can be associated with the sine function and treated equivalently as $\sin\theta \sin\omega t$, and the second A.C. output signal can be associated with the cosine function and treated equivalently as $\cos\theta \sin\omega t$. However, the range of the phase component $\theta$ with respect to the predetermined mechanical rotational angle range W of the rotation shaft 22 is 90°. Thus, the phase angle $\theta$ detected via the phase detection circuit 32 of FIG. 14C will take a value in the range of 0° to 90°, which will indicate, in absolute representation, a rotational position within the predetermined mechanical rotational angle range W of the rotation shaft 22.

If the first and second A.C. output signals Va and Vb presenting substantially linear amplitude variation characteristics are associated with the sine and cosine functions $\sin\theta \sin\omega t$ and $\cos\theta \sin\omega t$, then their respective amplitude characteristics $\sin\theta$ and $\cos\theta$ will present slight non-linearity relative to the predetermined mechanical rotational angle range W of the rotation shaft 22, namely, they will not present real sine and cosine function characteristics. However, the phase detection circuit 32 of FIG. 14C performs its phase detection process while apparently treating the A.C. output signals Va and Vb as signals $\sin\theta \sin\omega t$ and $\cos\theta \sin\omega t$ having sine and cosine functional amplitude characteristics. As a consequence, the detected phase angle $\theta$ does not show linearity relative to the rotational angle of the rotation shaft 22 that is the object to be detected here. However, in detection of the rotational position, non-linearity between detection output data (indicative of the detected phase angle $\theta$) and actual position to be detected does not matter so much in many cases; namely, it is only necessary that the position detection be performed with predetermined repetitive reproducibility. Further, if necessary, the output data from the phase detection circuit 32 may be converted using an appropriate data conversion table so that accurate linearity can be readily produced between the detection output data and the actual position to be detected. Therefore, the A.C. output signals $\sin\theta \sin\omega t$ and $\cos\theta \sin\omega t$ having sine and cosine functional amplitude characteristics as referred to in connection with the present invention need not necessarily present real sine and cosine function characteristics and may, in effect, have characteristics of a triangular waveform or the like (having a linear slope). In short, it is only necessary for the A.C. output signals $\sin\theta \sin\omega t$ and $\cos\theta \sin\omega t$ to have such tendencies. Note that in the example of FIGS. 14A to 14C, two reference voltages Va and Vb may be used as in the example of FIGS. 1A to 1C.

Figure 16A:
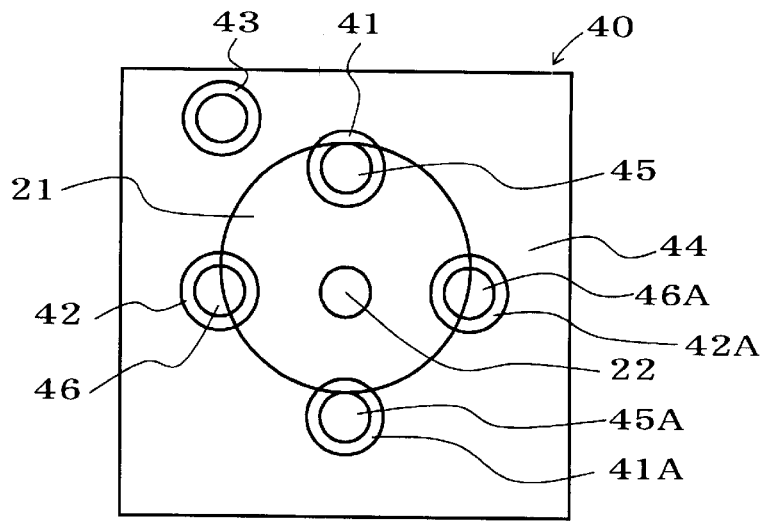
Figure 16B:
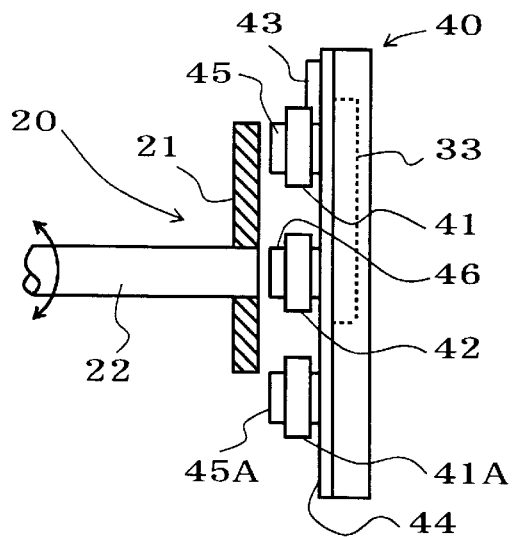
Figure 16C:
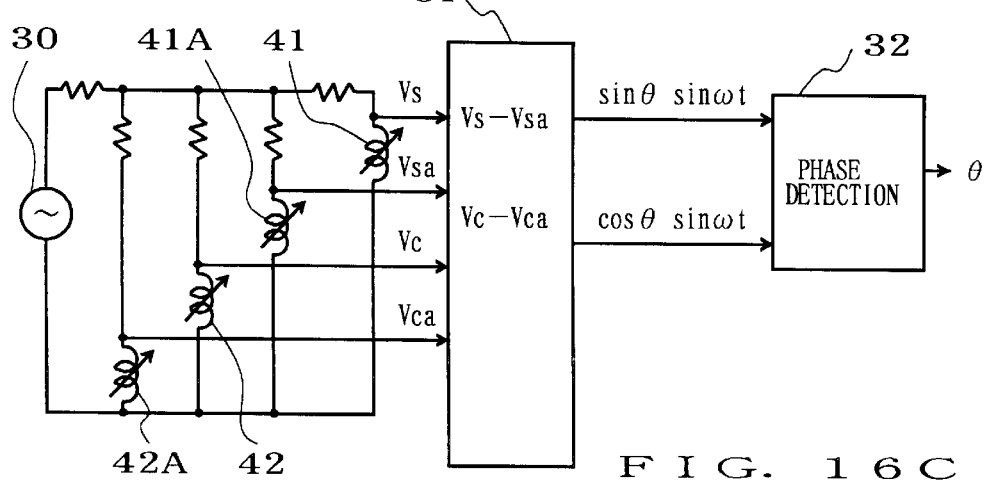

FIGS. 16A–16C show a position detector device in accordance with another embodiment of the present invention where the reference-voltage generation circuit is omitted and replaced by coils pairs varying in a differential manner. More specifically, FIG. 16A is a schematic front view of a principal part of the position detector device, which shows an example of a physical positional relationship between the individual detecting coils of the stator section 40 and the magnetic-responsive member 21 of the rotor section 20 in the position detector device. FIG. 16B is a sectional side view of the part of the position detector device shown in FIG. 16A, and FIG. 16C is a block diagram showing an example of electric and electronic circuitry associated with the detecting coil 41 of the stator section 40. In this embodiment, the coil 41A is wound on an iron core 45A at an angular position spaced 180° from the sine-output coil 41, and the coil 42A is wound on an iron core 46A at an angular position spaced 180° from the cosine-output coil 42; not that no reference-voltage-generating coil 43 is provided here. The magnetic-responsive member 21 of the rotor section 20 may be shaped in a similar manner to the example shown in FIGS. 9A and 9B. With such arrangements, the impedance of the individual coils in each coil pair varies in a differential manner, so that increasing/decreasing variations in the between-terminal voltages of the individual coils present differential characteristics. That is, if the impedance variation, i.e., output amplitude variation, of the coil 41 in the pair of the sine-phase coils 41 and 41A presents a function characteristic of "Po+P sin $\theta$" in response to a rotational angle $\theta$ of the rotation shaft 22, then the impedance variation, i.e., output amplitude variation, of the other coil 41A in the pair presents a function characteristic of "Po–P sin $\theta$" in response to the rotational angle $\theta$ of the rotation shaft 22. Similarly, if the impedance variation, i.e., output amplitude variation, of the coil 42 in the pair of the cosine-phase coils 42 and 42A presents a function characteristic of "Po+P cos $\theta$" in response to a rotational angle $\theta$ of the rotation shaft 22, then the impedance variation, i.e., output amplitude variation, of the other coil 42A in the pair presents a function characteristic of "Po–P cos $\theta$" in response to the rotational angle $\theta$ of the rotation shaft 22. Here, the amplitude P is regarded as "1" and ignored just for convenience of description, as in the above-described cases.

As shown in FIG. 16C, the coils 41, 41A, 42 and 42A are each excited by a predetermined A.C. signal, and the between-terminal voltages Vs, Vsa, Vc and Vca of these coils 41, 41A, 42 and 42A present respective levels corresponding to the rotational angle $\theta$ of the rotation shaft 22 as follows:

$$Vs=(Po+\sin\theta)\sin\omega t$$

$$Vsa=(Po-\sin\theta)\sin\omega t$$

$$Vc=(Po+\cos\theta)\sin\omega t$$

$$Vca=(Po-\cos\theta)\sin\omega t$$

For each of the coil pairs, the arithmetic operation circuit 31 computes a difference in the between-terminal voltages of the coils and thereby generates an A.C. output signal having a predetermined cyclic amplitude function as its amplitude coefficient in the following manner:

$$Vs-Vsa=(Po+\sin\theta)\sin\omega t-(Po-\sin\theta)\sin\omega t=2\sin\theta\sin\omega t$$

$$Vc-Vca=(Po+\cos\theta)\sin\omega t-(Po-\cos\theta)\sin\omega t=2\cos\theta\sin\omega t$$

Thus, there can be generated two A.C. output signals ($\sin\theta \sin\omega t$ and $\cos\theta \sin\omega t$) having, as amplitude coefficients, two cyclic amplitude functions ($\sin\theta$ and $\cos\theta$) corresponding to the rotational angle $\theta$ of the rotation shaft 22 that is the object to be detected, in a similar manner to outputs from the conventional resolvers. As opposed to the conventional resolvers, the present invention requires only a primary coil and can eliminate a need for a secondary coil to produce an induced output, so that the present invention can significantly simplify the necessary coil structure and hence can provide a rotary-type position detector device of a greatly simplified structure. Note that the circuitry for producing the difference in the between-terminal voltages of the coils in each of the coil pairs may be simplified by differentially connecting the coils 41 and 41A and differentially connecting the coils 42 and 42A to provide the respective differences "Vs−Vsa" and "Vc−Vca" without using the specific arithmetic operation circuit 31.

Note that in the case where the magnetism-responsive member 21 is made of a substance of good electrical conductivity, such as copper, the inductance of each of the coils decreases due to an eddy-current loss, and the between-terminal voltage of the coil decreases as the magnetism-responsive member 21 moves closer to the coil. In this case too, the position detecting operations can be performed in the manner as described above. Also note that the magnetism-responsive member 21 may be of a hybrid type comprising a combination of a magnetic substance and an electrically conductive substance. Further, the magnetism-responsive member 21 may comprise a permanent magnet as in the case noted above.

It should also be noted that in relation to the type of position detector device which is designed to detect a rotational position of an object swinging within a limited rotating range less than one full rotation, each of the above-described embodiments may be constructed such that the magnetism-responsive member 21 is fixed while the detecting coils 41 and 42 are provided for movement relative to the magnetism-responsive member 21 in response to displacement of the object to be detected.

Further, although the A.C. output signals are provided in two phases, sine and cosine phases (i.e., as resolver-type output signals) in each of the above-described embodiments, the present invention is not so limited; for example, the A.C. output signals may be provided in three phases (the amplitude functions of the individual phases may be, for example, $\sin \theta$, $\sin(\theta+120)$ and $\sin(\theta+240)$).

Also note that for excitation of the coils by the A.C. signal, there may be employed the conventionally-known two-phase excitation scheme that separately excites at least two coils by $\sin \omega t$ and $\cos \omega t$, respectively. However, the single-phase excitation as described above in relation to the embodiments is more advantageous in many respects, such as structural simplification and temperature-drift compensating characteristics.

Next, a description will be made about still another embodiment of the present invention which is designed to performed arithmetic operations on combinations of output voltages from a plurality of detecting coils.

Figure 17A:
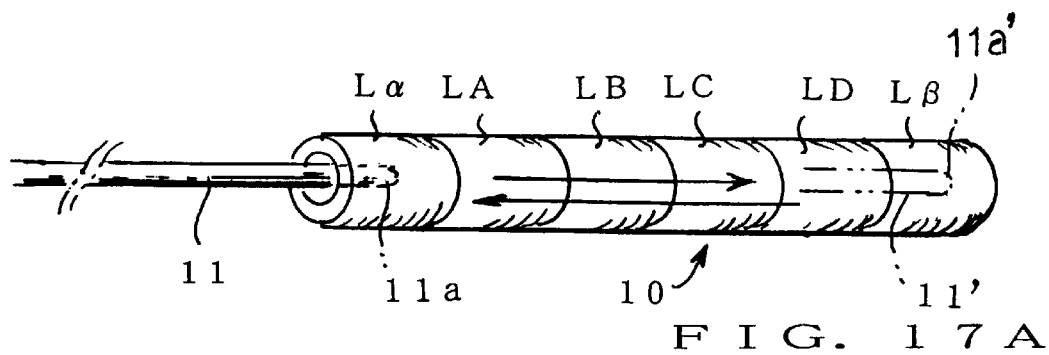
Figure 17B:
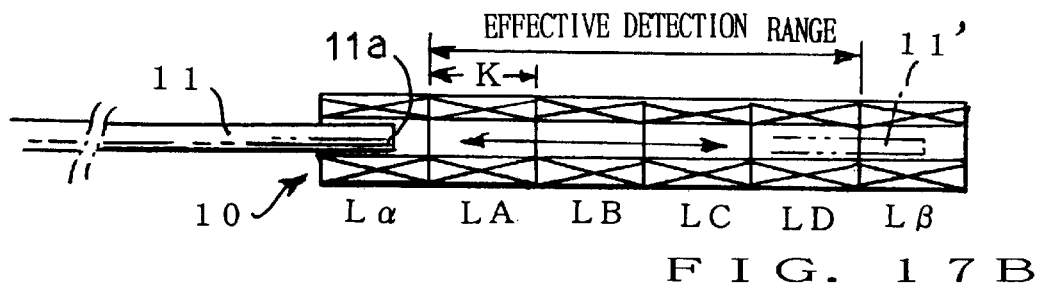
Figure 17C:
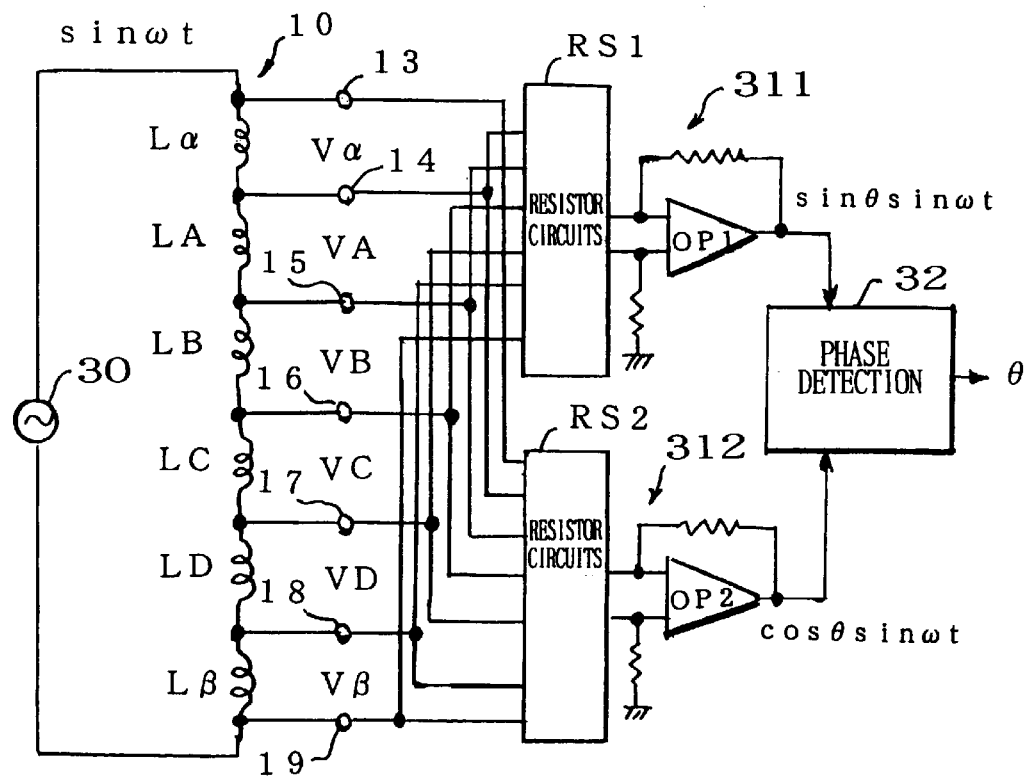

FIGS. 17A to 17C show a position detector device in accordance with the other embodiment of the present invention which is designed such that amplitude variations can be produced over a full electric angle range of 0° to 360° in two A.C. output signals of amplitudes presenting sine and cosine function characteristics. More specifically, FIG. 17A is a schematic perspective view of a principal part of the position detector device, which shows an example of a physical positional relationship between a coil section 10 and a magnetism-responsive member 11 in the position detector device. FIG. 17B is a sectional side view of the part of the position detector device taken along the axis of the coil section 10, and FIG. 17C is a block diagram showing an example of electric circuitry associated with the coil section 10. In the position detector device shown in FIGS. 17A to 17C that is directed to detecting a linear position of an object to be detected, the coil section 10 is fixed while the magnetism-responsive member 11 is arranged to move linearly relative to the coil section 10 in response to displacement of the object to be detected. Conversely, the magnetism-responsive member 11 may be fixed while the coil section 10 is arranged to move linearly relative to the magnetism-responsive member 11 in response to displacement of the object to be detected. The coil section 10 includes a plurality of coil segments (in the illustrated example, six coil segments Lα, LA, LB, LC, LD and Lβ) disposed in series along a direction in which the object to be detected is displaced, and these coil segments of the coil section 10 are excited by a predetermined single-phase A.C. signal. For convenience of description, let it be assumed here that these coil segments Lα, LA, LB, LC, LD and Lβ are equal to each other in the number of coil turns, coil length, etc. The magnetism-responsive member 11 is formed of a magnetic substance, such as iron, into a shape of a rod or the like, and movable into a space defined by the coil segments of the coil section 10. For example, as the magnetism-responsive member 11 moves rightward in FIG. 17A, the tip 11a of the magnetism-responsive member 11 first enters the leading or first coil segments Lα, then enters the other coil segments LA, LB, LC and LD sequentially in the order mentioned, and finally then enters the last or sixth coil segment Lβ. Two-dots-and-dash line 11' in FIG. 17B depicts the magnetism-responsive member 11 having completely entered as far as the last coil segment Lβ.

Axial range corresponding to the four intermediate coil segments LA, LB, LC and LD constitutes an effective detecting range of the position detector device. If the axial length of each one of the intermediate coil segments LA, LB, LC and LD is represented by "K", then an axial length four time as great as the length K equals the effective detecting range. The coil segments Lα and Lβ located immediately before and after the effective detecting range 4K are auxiliary coil segments that are provided in order to more reliably achieve cosine function characteristics; these auxiliary coil segments Lα and Lβ may be dispensed with or omitted in a situation where very high detecting accuracy is not required.

As shown in FIG. 17C, the individual coil segments Lα, LA, LB, LC, LD and Lβ are excited, at a constant voltage or current, by a predetermined single-phase A.C. signal ("sin ωt") generated by an A.C. power supply 30. Voltages between the respective opposite ends (between-terminal voltages) of these coil segments Lα, LA, LB, LC, LD and Lβ are denoted here by "Vα", "VA", "VB", "VC", "VD" and "Vβ", respectively, and taps 13–19 are provided to take out these voltages Vα, VA, VB, VC, VD and Vβ. As may be readily understood, the coil segments Lα, LA, LB, LC, LD and Lβ need not necessarily be physically-separated coils, and they may be implemented by just a single continuous coil divided into six coil lengths or portions by the intermediate taps 13–19; that is, the coil portion between the taps 13 and 14 functions as the coil segment Lα, the coil portion between the taps 14 and 15 functions as the coil segment LA, the coil portion between the taps 15 and 16 functions as the coil segment LB, the coil portion between the taps 16 and 17 functions as the coil segment LC, the coil portion between the taps 17 and 18 functions as the coil segment LD, and the coil portion between the taps 18 and 19 functions as the coil segment Lβ. The output voltages Vα, VA, VB, VC, VD and Vβ from the individual coil segments are delivered, in predetermined combinations, to analog arithmetic operation circuits 311 and 312, in which they are subjected to an addition and/or subtraction based on predetermined mathematical expressions. Thus, these analog arithmetic operation circuits 311 and 312 produce two A.C. output signals of amplitudes that present sine and cosine function characteristics (i.e., two A.C. output signals having amplitude function characteristics phase-shifted from each other by 90°) corresponding to a current position of the object to be detected. For illustration purposes, the output signal from the analog arithmetic operation circuit 311 is denoted by sin θ sin ωt while the output signal from the other analog arithmetic operation circuit 312 is denoted by and cos θ sin ωt. The analog arithmetic operation circuits 311 and 312 comprise operational amplifiers OP1, OP2 and resistor circuits RS1, RS2.

It should be obvious that the present invention is not limited to the foregoing arrangements and the coil segments Lα, LA, LB, LC, LD and Lβ may be implemented by separate coils connected in series; in such a case, the separate coils may be excited together by a predetermined single-phase A.C. signal or may be excited parallel via separate exciting circuits in a same phase by a predetermined single-phase A.C. signal. However, the above-described embodiment where a single continuous coil is divided into a plurality of coil segments and the output voltages from these divided coil segments are taken out by intermediate taps is most preferable because it can be simplest in structure. Also note that the coil segments Lα, LA–LD and Lβ will hereinafter be referred to simply as "coils".

With the above-described arrangements, as the magnetism-responsive member 11 moves closer to or further or deeper into any one of the coils, the self-inductance, i.e., impedance, of the coil increases, and thus the voltage between the opposite ends of the coil increases progressively during displacement of the tip 11a of the magnetism-responsive member 11 from one end to the other of that coil. Here, because the coils Lα, LA, LB, LC, LD and Lβ are arranged in series along the displacement direction of the object to be detected, progressively increasing (progressive incremental) variations in the respective voltages Vα, VA, VB, VC, VD and Vβ of the coils Lα, LA, LB, LC, LD and Lβ will occur sequentially, as illustratively shown in part (A) of FIG. 18, as the magnetism-responsive member 11 moves relative to the coils in response to the displacement of the object to be detected. In part (A) of FIG. 18, a slope in each of the curves, indicative of the output voltage from any one of the coils, represents a region where the tip 11a of the magnetism-responsive member 11 is moving from one end toward the other of the coil in question. Typically, the progressively-increasing variation curve of the voltage between the opposite ends of the coil, which takes place during the movement of the magnetism-responsive member 11 from the coil's one end to the other, can be likened to a functional value variation within a 90° range of the sine or cosine function. Thus, by appropriately combining the output voltages Vα, VA, VB, VC, VD and Vβ from the coils Lα, LA, LB, LC, LD and Lβ and performing an addition and/or subtraction between the combinations, it is possible to produce two A.C. output signals sin θ sin ωt and cos θ sin ωt of amplitudes that present sine and cosine function characteristics corresponding to a current position of the object to be detected.

More specifically, the analog arithmetic operation circuit 311 can provide an A.C. output signal presenting an amplitude curve of the sine function characteristic as shown in part (B) of FIG. 18, by performing arithmetic operations on the output voltages VA, VB, VC and VD from the coils LA, LB, LC and LD in accordance with Expression (4) below; the A.C. output signal can be represented equivalently by "sin θ sin ωt".

$$(VA-VB)+(VD-VC) \qquad \text{Expression (4)}$$

Further, the other analog arithmetic operation circuit 312 can provide an A.C. output signal presenting an amplitude curve of the cosine function characteristic as shown in part (B) of FIG. 18, by performing arithmetic operations on the output voltages Vα, VA, VB, VC, VD and Vβ from the coils Lα, LA, LB, LC, LD and Lβ in accordance with Expression (5) below. Although the amplitude curve of the cosine function characteristic as shown in part (B) of FIG. 18 actually presents a minus cosine function characteristic, i.e., "–cos θ sin ωt", the amplitude curve corresponds to the cosine function characteristic since it presents a 90° shift relative to the sine function characteristic. Therefore, this can be said to be an A.C. output signal of the cosine function characteristic, which can be represented equivalently by "cos θ sin ωt".

$$(VA-Vα)+(VB-VC)+(Vβ-VD) \qquad \text{Expression (5)}$$

Note that the following mathematical expression may be used instead of Expression (5) above:

$$(VA-Vα)+(VB-VC)-VD \qquad \text{Expression (5')}$$

The A.C. output signal "–cos θ sin ωt" of the minus cosine function characteristic evaluated by Expression (5) may be electrically phase-inverted by 180° to thereby actually generate a signal of "cos θ sin ωt" for use as the A.C. output signal of the cosine function characteristic. However, in a situation where the A.C. output signal of the cosine function characteristic is used by a phase detection circuit 32 at a succeeding stage for a subtractive arithmetic operation in the form of "–cos θ sin ωt", the A.C. output signal "–cos θ sin ωt" of the minus cosine function characteristic can of course be used just as it is. Also note that the A.C. output signal "cos θ sin ωt" of the actual cosine function characteristic can be generated by performing the following mathematical expression instead of Expression (5):

$$(VA-Vα)+(VC-VB)+(VD-Vβ) \qquad \text{Expression (5")}$$

The phase angle θ in the sine and cosine functions, which are amplitude components of the individual A.C. output signals, corresponds to a current position of the object to be detected, and the phase angle θ within a 90° range corresponds to the length K of one of the coils. Thus, the effective detecting range of the 4K length corresponds to phase angles θ ranging from 0° to 360°. Therefore, every position within the effective detecting range of the 4K length can be detected in an absolute value by detecting such a phase angle θ.

Now, an explanation is given below about compensation of the temperature characteristics in the embodiment. The impedance of the individual coils varies with a temperature change, and such an impedance variation results in variations in the output voltages Vα, VA, VB, VC, VD and Vβ. For example, as illustrated in part (A) of FIG. 18, each of the output voltages would vary to increase or decrease in one direction as depicted by dotted line in contradistinction to a solid-line curve. However, in the A.C. output signals sin θ sin ωt and cos θ sin ωt of the sine and cosine function characteristics, obtained by the additive and subtractive syntheses of the output voltages, the variations would appear as positive and negative amplitude variations as shown by dotted lines in contradistinction with solid-line curves in part (B) of FIG. 18. If an amplitude coefficient A is used, the A.C. output signals can be represented as A sin θ sin ωt and A cos θ sin ωt, respectively, and it is this amplitude coefficient A that varies in response to a change in ambient temperature.

As may be clear from this, the amplitude coefficient A indicative of the temperature characteristics does not influence the phase angle θ in the sine and cosine functions. Thus, in the present embodiment, temperature characteristics can be duly compensated in an automatic fashion, to thereby achieve high-accuracy position detection.

Every position of the object to be detected can be detected as an absolute value by the phase detection circuit (or amplitude-to-phase converting means) 32 measuring the phase angle θ of the amplitude functions sin θ and cos θ in the A.C. output signals sin θ sin ωt and cos θ sin ωt of the sine and cosine functions. The phase detection circuit 32 may be designed in the same manner as noted above.

In this case too, if there is a linear correspondence between the phase angle θ and the position x of the object to be detected, the amplitudes in the A.C. output signals sin θ sin ωt and cos θ sin ωt of the sine and cosine function characteristics will not present real sine and cosine function characteristics. However, the phase detection circuit 32 carries out the phase detection process while regarding these A.C. output signals sin θ sin ωt and cos θ sin ωt as apparently having real sine and cosine function characteristics. As a result of this, the detected phase angle θ will not present linearity with respect to the position x of the object to be detected. In detecting a position, however, non-linearity between the detection output data (detected phase angle θ) and the actual position of the object to be detected does not matter very much and can be adjusted whenever necessary, as noted earlier.

Variation range of the phase angle θ of the amplitude functions sin θ and cos θ in the A.C. output signals sin θ sin ωt and cos θ sin ωt of the sine and cosine functions may be set to be a limited angular range narrower than the full rotational range of 0° to 360° as employed in the above-mentioned embodiment. In such a case, the structure of the coils can be simplified to a significant degree. The detectable phase range may be set to be less than the full 360° range particularly where minute or microscopic displacement of the object to be detected is to be detected because the effective detecting range may be narrowed. Further, in various other cases, the detectable phase range may also be set to be less than the full 360° range, depending on a purpose of the position detection. Thus, the following paragraphs describe such modifications of the detectable phase range.

Figure 19:
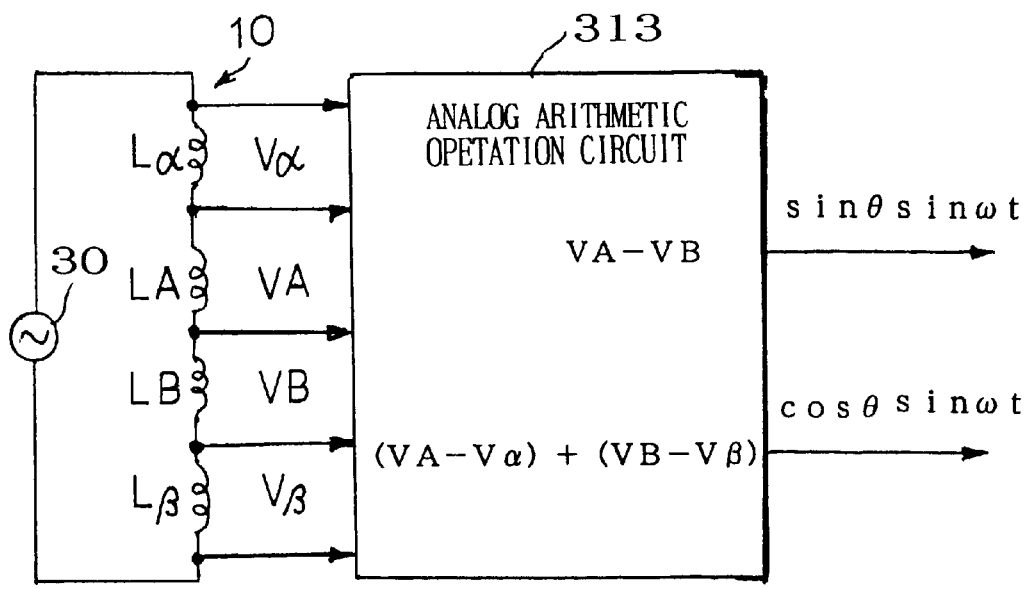
FIG. 19 is an electric circuit diagram showing a modification of the position detector device of FIGS. 17A to 17C in relation to the coil section.

FIG. 19 is a block diagram showing an embodiment of the position detector device, in which phase variations can be produced over a range of 0° to 180°. In this position detector device of FIG. 19, the coil section 10 includes two coils LA and LB corresponding to an effective detecting range of the device and two auxiliary coils Lα and Lβ located immediately before and after the coils LA and LB. Analog arithmetic operation circuit 313 receives respective between-terminal voltages Vα, VA, VB and Vβ output from the coils, so that the operation circuit 313 performs an arithmetic operation as represented by Expression (6) below to thereby generate an A.C. output signal sin θ sin ωt presenting an amplitude curve of a sine function characteristic and also performs an arithmetic operation as represented by Expression (7) below to thereby generate an A.C. output signal cos θ sin ωt presenting an amplitude curve of a cosine function characteristic.

$$VA-VB \quad \text{Expression (6)}$$

$$(VA-V\alpha)+(VB-V\beta) \quad \text{Expression (7)}$$

Figure 18:
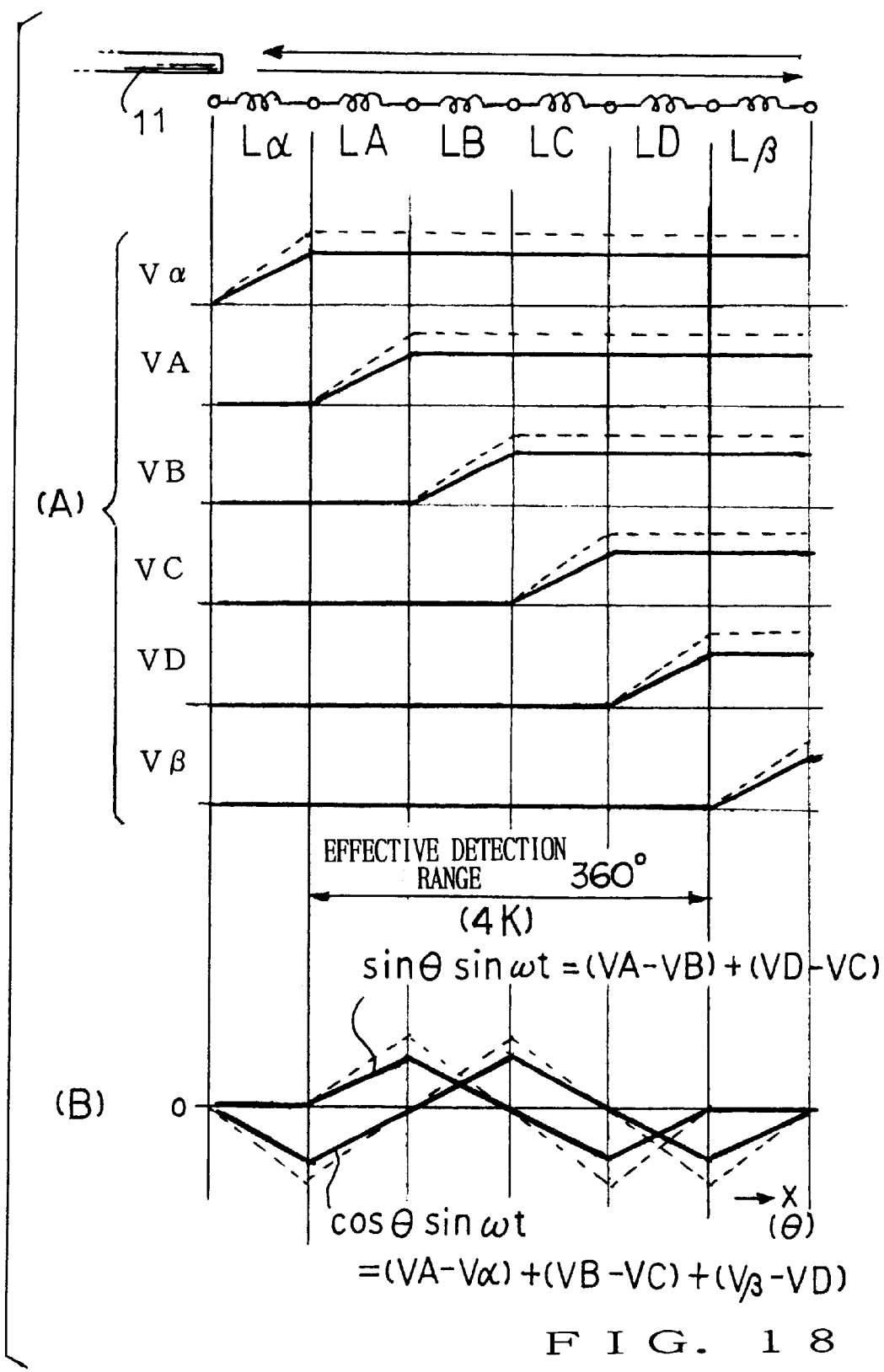
FIG. 18 is a graph explanatory of position detecting operation of the position detector device shown in FIGS. 17A to 17C.

As may be readily understood with reference to a combined reference to FIGS. 19 and 18, the arithmetic operation represented by Expression (6) can generate an A.C. output signal sin θ sin ωt presenting an amplitude curve of a sine function characteristic for the 0°–180° range, and the arithmetic operation represented by Expression (7) can generate an A.C. output signal cos θ sin ωt presenting an amplitude curve of a cosine function characteristic for a range of –90° to 270° (i.e., from minus 90°, through 0°, plus 90° and 180°, to 270°. Similarly to the above-described embodiments, the auxiliary coil Lβ can be omitted as in the above-described cases. Every position within the effective detecting range of the 2K length of the two coils LA and LB can be detected in an absolute value by detecting the phase angle θ in the amplitude functions. It should be obvious that the mathematical expressions employed here may be modified as desired rather than being limited to the above-mentioned alone. Namely, the mathematical expressions can be modified by changing the angular range over which the 180°-wide phase variation should arise. For example, in a situation where an effective phase variation is to take place for an angular range of 180° to 360°, a mathematical expression of "(Vα–VA)+(Vβ–VB)" may be used to generate an A.C. output signal sin θ sin ωt of a sine function characteristic, and a mathematical expression of "(VB–VA)" may be used to generate an A.C. output signal cos θ sin ωt of a cosine function characteristic.

Figure 20:
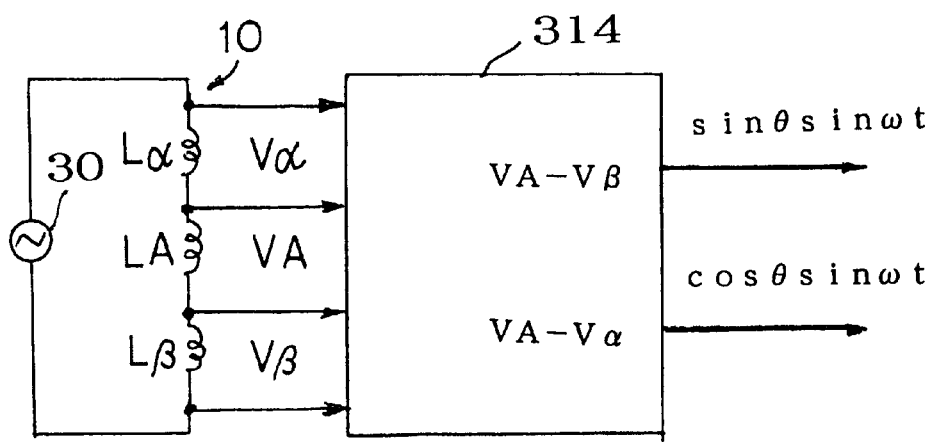
FIG. 20 is an electric circuit diagram showing another modification of the position detector device of FIGS. 17A to 17C in relation to the coil section.

Further, FIG. 20 is a block diagram showing another embodiment of the position detector device, in which phase variations can be produced over a range of 0° to 90°. In this position detector device of FIG. 20, the coil section 10 includes a single coil LA corresponding to an effective detecting range of the device and two auxiliary coils Lα and Lβ located immediately before and after the coil LA. Analog arithmetic operation circuit 314 receives respective between-terminal voltages Vα, VA and Vβ output from the coils, so that the operation circuit 314 performs an arithmetic operation as represented by Expression (8) below to thereby generate an A.C. output signal sin θ sin ωt presenting an amplitude curve of a sine function characteristic and also performs an arithmetic operation as represented by Expression (9) below to thereby generate an A.C. output signal cos θ sin ωt presenting an amplitude curve of a cosine function characteristic.

$$VA-V\beta \quad \text{Expression (8)}$$

$$VA-V\alpha \quad \text{Expression (9)}$$

As may be readily understood with reference to a combined reference to FIGS. 20 and 18, the arithmetic operation represented by Expression (8) can generate an A.C. output signal sin θ sin ωt presenting an amplitude curve of a sine function characteristic for a range of 0°–180° (from 0° through 90° to 180°), and the arithmetic operation represented by Expression (9) can generate an A.C. output signal cos θ sin ωt presenting an amplitude curve of a cosine function characteristic for a range of –90° to 90° (i.e., from minus 90°, through 0° to plus 90°. Therefore, the 0°–90° angular range can be allocated as the effective detecting range of the position detector device. In this case too, the mathematical expressions employed may be modified as desired rather than being limited to the above-mentioned. Namely, the mathematical expressions can be modified by changing the angular range over which the 90°-wide phase variation should arise.

Figure 21A:
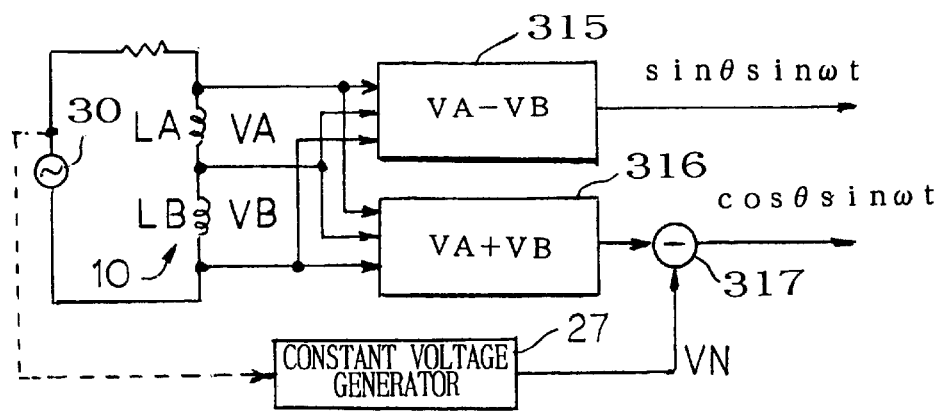
Figure 21B:
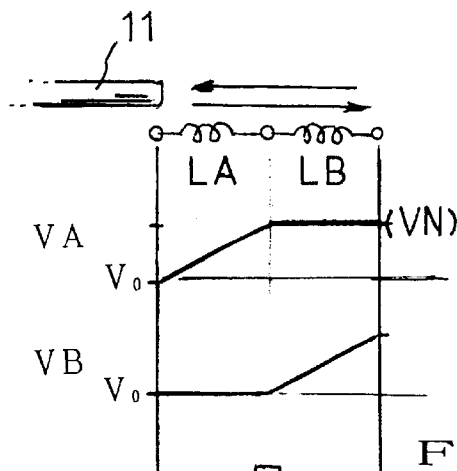
Figure 21C:
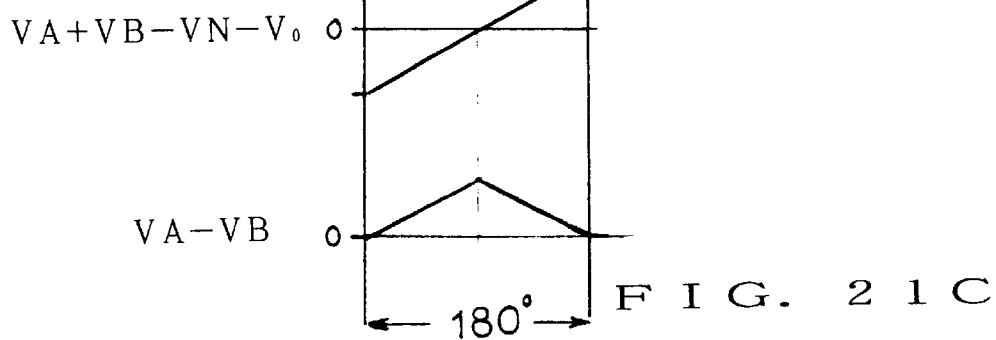

Whereas the embodiments have been described as including the auxiliary coils Lα and Lβ located immediately before and after the effective detecting range, these auxiliary coils Lα and Lβ may be omitted. FIGS. 21A to 21C shows such a modified embodiment which can produce phase variations within a range of 0° to 180°. In this embodiment, the coil section 10 includes two coils LA and LB corresponding to the effective detecting range of the position detector device. These coils LA and LB are disposed in series along the displacement direction of the object to be detected, so that as the magnetism-responsive member 11 moves relative to the coils LA and LB in response to displacement of the object to be detected, the between-terminal voltages VA and VB of the coils LA and LB vary to increase progressively in sequence as illustrated in FIG. 21B. Here, the voltage produced when the magnetism-responsive member 11 has not at all entered the coil is represented by "Vo" and the voltage produced when the magnetism-responsive member 11 has fully entered any one of the coils is represented by "VN". If constant voltages Vo and VN are generated from a suitable constant voltage generator circuit and a sum (VN+Vo) of the constant voltages Vo and VN is subtracted from a sum of the between-terminal voltages VA and VB, then the voltage obtained as the subtracted result "VA+VB−VN−Vo" presents a cosine function characteristic (or minus cosine function characteristic) over the 0°–180° range as shown in FIG. 21C. On the other hand, a voltage (VA−VB) obtained by subtracting the voltage VB from the voltage VA presents a sine function characteristic over the 0°–180° range as also shown in FIG. 21C.

Namely, by a subtracter circuit 315 performing a subtractive arithmetic operation ("VA−VB") between the between-terminal voltage VA of the coil LA and the between-terminal voltage VB of the coil LB in the example of FIG. 21A, there can be generated an A.C. output signal sin θ sin ωt presenting a sine function characteristic. Also, by an adder circuit 316 adding together the between-terminal voltages VA and VB of the coils LA and LB and a subtracter circuit 317 performing an operation ("VA+VB−VN−Vo") subtracting the sum of the constant voltages VN and Vo, generated by a constant voltage generator circuit 27, from the sum of the between-terminal voltages VA and VB, there can be generated an A.C. output signal cos θ sin ωt presenting a cosine function characteristic. Let it be assumed here that the constant voltages VN and Vo generated by the constant voltage generator circuit 27 are caused to vary with temperature characteristics similar to those of the coils LA and LB; for that purpose, it is only necessary that the constant voltage generator circuit 27 be in the form of a dummy coil that has characteristics equal to those of the coil LA or LB and is excited by the same exciting A.C. signal. If a magnetic core similar in characteristics to the magnetism-responsive member 11 is always inserted in such a dummy coil, the same constant voltage as the maximum voltage produced VN produced when the magnetism-responsive member 11 has fully entered any one of the coils can be obtained constantly with temperature characteristics. If no such magnetic core is inserted in the dummy coil, then the same constant voltage as the minimum voltage value Vo can be obtained.

The above-mentioned constant voltage generator circuit 27 is applicable not only to the case where the number of the coils is two but also to other cases where a smaller or greater number of the coils are employed. For example, in a situation where three coils LA, LB and LC are used to cause phase variations over a 0°–270° range, the A.C. output signal sin θ sin ωt presenting a sine function characteristic can be generated through an arithmetic operation of "VA−VB−VC+Vo" using the output voltages VA, VB and VC and constant voltages VN and Vo from the constant voltage generator circuit 27, and the A.C. output signal cos θ sin ωt presenting a cosine function characteristic can be generated through an arithmetic operation of "VA+VB−VC−VN".

As another example, only one coil may be provided in correspondence with the effective detecting range of the position detector device. In this case, a phase variation width within the effective detecting range corresponding to the length K of the only coil is less than 90°. FIGS. 22A to 22C show such an example, where, as shown in FIG. 22A, the only coil LA is connected in series with a resistor R1. With this arrangement, as the amplitude component in the between-terminal voltage VA of the coil LA progressively increases, as shown in FIG. 22B, in response to a movement of the magnetism-responsive member 11, the amplitude component in the between-terminal voltage drop VR of the resistor Ri decreases progressively. If the between-terminal voltage VR of the resistor R1 is regarded as an A.C. output signal sin θ sin ωt of a sine function characteristic and the between-terminal voltage VA of the coil LA is regarded as an A.C. output signal cosθsincot of a cosine function characteristic, they can be associated with characteristics within a given less-than-90° angular range where the sine and cosine functions cross each other. Therefore, by supplying these A.C. output signals to the phase detection circuit 32, a phase angle θ within the less-than-90° angular range in question can be detected in an absolute value.

Figure 23A:
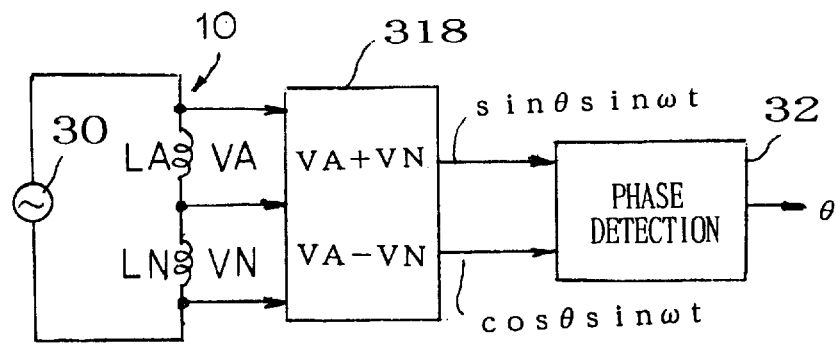
Figure 23B:
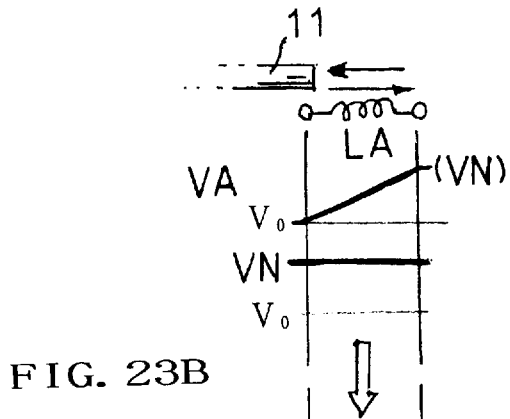
Figure 23C:
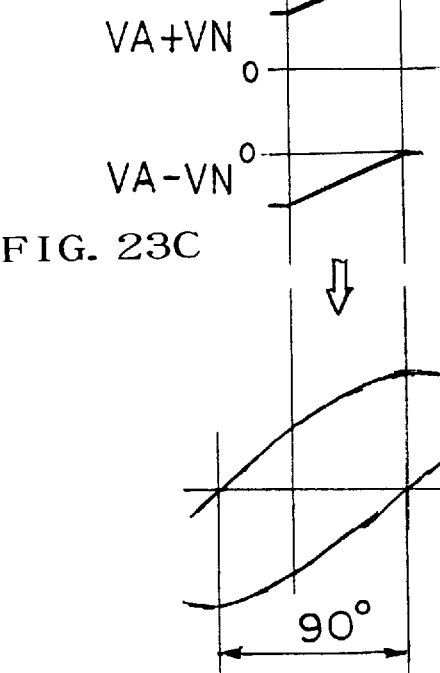
Figure 23E:
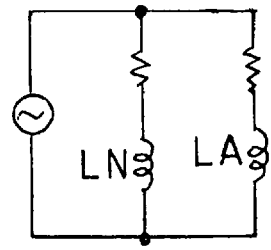
Figure 23D:
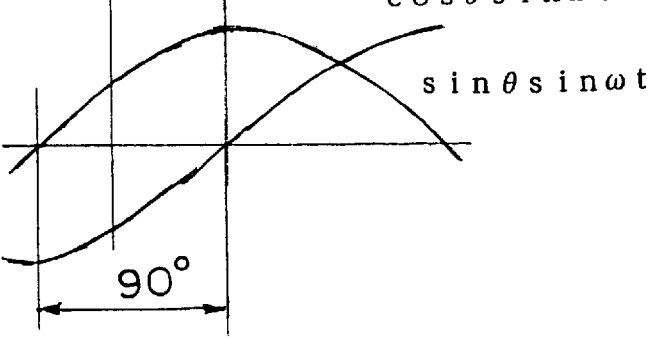

FIGS. 23A to 23E show a modification of the embodiment shown in FIGS. 22A to 22C, where a dummy coil LN is provided in place of the resistor Ri. The dummy coil LN is connected in series with the detecting coil LA that would be affected by the movement of the magnetism-responsive member 11, but is not itself affected the movement of the magnetism-responsive member 11. By the provision of the dummy coil LN, the same constant voltage as the maximum voltage produced VN produced when the magnetism-responsive member 11 has fully entered any one the coils can be obtained constantly with temperature characteristics. Thus, the between-terminal voltages VA and VN of the coil LA and dummy coil LN corresponding to the movement of the magnetism-responsive member 11 are produced in a manner as shown in FIG. 23B. Arithmetic operation circuit 318 computes these voltages VA and VN in accordance with predetermined mathematical expressions; for example, the arithmetic operation circuit 318 generates an A.C. output signal sin θ sin ωt of a sine function characteristic through an arithmetic operation of "VA+VN" and generates an A.C. output signal cos θ sin ωt of a cosine function characteristic through an arithmetic operation of "VA−VN". They can be associated with characteristics within a given less-than-90° angular range as shown in FIG. 23D. Therefore, by supplying these A.C. output signals to the phase detection circuit 32, a phase angle θ within the less-than-90° angular range in question can be detected in an absolute value. It should be understood that the above-mentioned dummy coil LN may be connected with the detecting coil LA in parallel rather than in series as shown in FIG. 23E. From a different point of view, the example of FIG. 23A can be said to be a modification of the embodiment shown in FIGS. 1A–1C. Because only one reference voltage VN is used, a narrower detectable phase angle range is provided.

Figure 24:
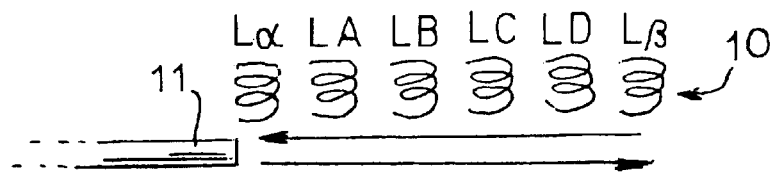
FIG. 24 is a schematic diagram showing a modified placement of the coils in each of the embodiments shown in FIGS. 17A to 23E.

Whereas, in each of the above-described embodiments, the individual coils in the coil section 10 are arranged coaxially and the magnetism-responsive member 11 is movable into the inner space defined by these coils, the present invention is not so limited and any desired positional relationship between the coil section 10 and the magnetism-responsive member 11 may be chosen. For example, as shown in FIG. 24, the coils Lα, LA–LD and Lβ in the coil section 10 may be disposed such that their axes lie side by side along and the magnetism-responsive member 11 may be arranged to pass near the respective ends of the coils. In such a case, it is preferable that the coils Lα, LA–LD and Lβ be each wound around an iron core.

Figure 25A:
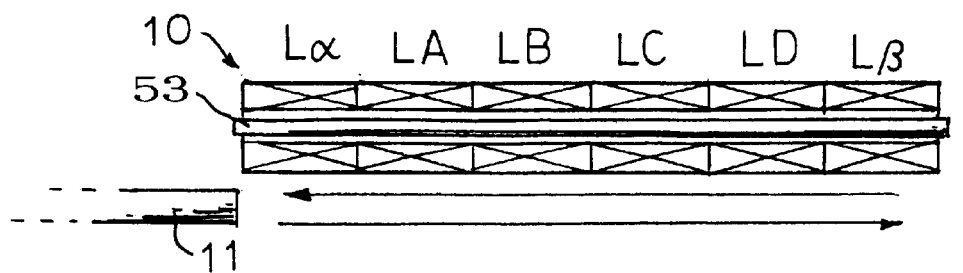
FIG. 25A is a schematic sectional view showing a modified positional relationship between a magnetism-responsive member and the coils in each of the embodiments shown in FIGS. 17A to 23E.

Further, even in the case where the individual coils in the coil section 10 are arranged coaxially as in the example of FIGS. 17A to 17C, the magnetism-responsive member 11 may be arranged to not move into the inner space defined by the coils, as shown by way of example in FIG. 25A. In FIG. 25A, the magnetism-responsive member 11 is arranged to pass near the coils in parallel to their axes. In this case, it is preferable that an iron core 53 be inserted through an axial inner space defined by the coils Lα, LA–LD and Lβ. With such arrangements, a magnetic flux can flow out to the outer periphery of the coils with increased efficiency, which achieves an enhanced sensitivity to the magnetism-responsive member 11 located close to the outer periphery of the coils and thereby enhances the detecting accuracy. FIG. 25A is a perspective view showing such a modification, where the magnetism-responsive member 11 is in the shape of a hollow cylindrical shape into which the coil section 10 is movable. In this case too, it is preferable that an iron core 53 be inserted through an axial inner space defined by the coils Lα, LA–LD and Lβ so that the magnetic flux can flow out to the outer periphery of the coils with increased efficiency.

Figure 26:
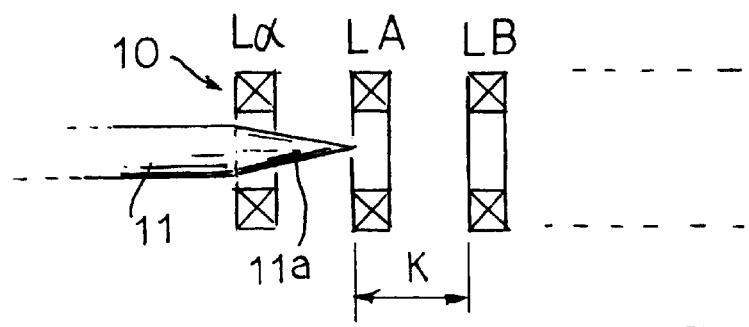
FIG. 26 is a schematic sectional view showing still another modified placement of the coils in each of the embodiments shown in FIGS. 17A to 23E.

FIG. 26 is a schematic sectional side view showing other examples of the coil section 10 and magnetism-responsive member 11. In this example, the coils Lα, LA–LD and Lβ are spaced from each other with a pitch K as in the example of FIGS. 17A and 17B, but each of the coils is smaller in length than that in the example of FIGS. 17A and 17B. Namely, every adjoining coils Lα, LA–LD and Lβ need not be so close to each other as in the example of FIGS. 17A and 17B and may be spaced from each other by any appropriate distance. The magnetism-responsive member 11 is tapered, over a length substantially equal to the coil length K, to have a pointed tip 11a. With the tapering over the length substantially equal to the coil length K, the inductance of each of the coils can increase or decrease in a smooth progressive manner in response to a movement of the tip 11a of the magnetism-responsive member 11. Of course, even where the coils Lα, LA–LD and Lβ are located close to each other as in the example of FIGS. 17A and 17B, the tip 11a of the magnetism-responsive member 11 may be tapered as appropriate.

Figure 27:
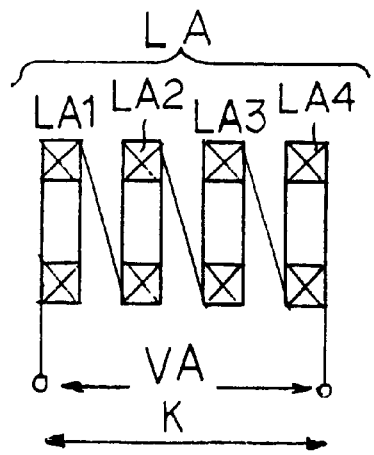
FIG. 27 is a schematic sectional view showing still another modified placement of the coils in each of the embodiments shown in FIGS. 17A to 23E.

As a further example, each of the coils in the coil section 10 may comprise a plurality of separate coil segments. FIG. 27 shows an exemplary arrangement of the separate coil segments, in which one coil LA is composed of four spaced-apart coil segments LA1, LA2, LA3 and LA4 together covering the length of K. These coil segments LA1, LA2, LA3 and LA4 are connected in series with each other to produce a between-terminal voltage VA of the coil LA. In this case, the coil segments LA1, LA2, LA3 and LA4 may be either identical to or different from each other in the number of coil turns. Further, the coil segments LA1, LA2, LA3 and LA4 may be spaced apart at uniform or non-uniform intervals as desired. By employing different numbers of coil turns and non-uniform intervals between the coil segments (non-linear arrangements), there can be produced impedance variations with characteristics closer to a sine or cosine function curve, which can improve the above-mentioned non-linearity between a detected phase angle θ and an actual distance (position) to be detected. Similarly, even where the coils Lα, LA–LD and Lβ are located close to each other as in the example of FIGS. 17A and 17B, the number of coil turns over the length K of the coil in question may be made uniform or non-uniform between the coil segments. This also can produce impedance variations with characteristics closer to a sine or cosine function curve, which can improve the above-mentioned non-linearity between a detected phase angle θ and an actual distance (position) to be detected.

Figure 28:
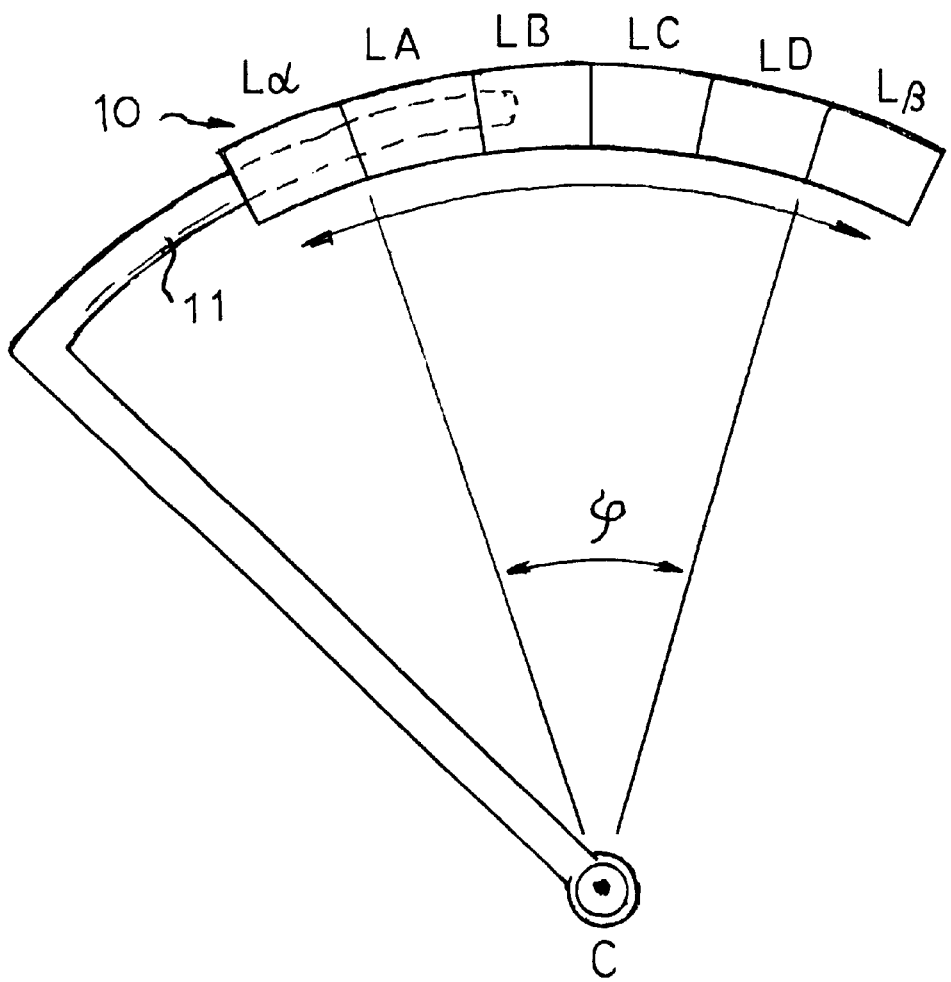
FIG. 28 is a side view schematically showing an example where the position detector device in accordance with each of the embodiments of FIGS. 17A to 27 is applied to detection of a position of an object moving along an arcuate or curved path.
Figure 29:
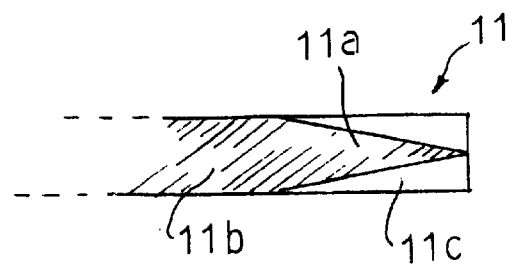
FIG. 29 is a plan view showing an example of a hybrid-type magnetism-responsive member comprising a combination of a magnetic substance and an electrically conductive substance which is applicable to each of the embodiments of the present invention.

Further, the position detector device according to the present invention is also applicable to detection of a position of an object to be detected moving along an arcuate or curved path within a predetermined range, in addition to detection of a position of an object to be detected moving along a completely linear path. FIG. 28 shows such an example where the principles of the present invention are applied to the linear position detection case. In FIG. 28, the coil section 10 includes coils LA–LD sequentially disposed arcuately over a predetermined angular range ψ, and the magnetism-responsive member 11 is arranged to swing about an axis C over the angular range ψ. Furthermore, the inventive position detector device can be constructed to detect an angle within a predetermined rotational angular range.

Note that in each of the above-described embodiments, the magnetism-responsive member 11 may be made of a non-magnetic substance of good electrical conductivity, such as copper or aluminum, rather than a magnetic substance. In such a case, an eddy-current loss will cause the between-terminal voltage of the coil to progressively decrease as the magnetism-responsive member 11 moves closer to the coil. Also note that the magnetism-responsive member 11 may be of a hybrid type comprising a combination of a magnetic substance and an electrically conductive substance, in which case the magnetism-responsive member 11 may be tapered to provide a tip 11a of a non-magnetic and electrically-conductive substance 11b and a magnetic substance 11c may be provided to compensate for a shortage of the non-magnetic and electrically-conductive substance 11b due its tapered shape.

Figure 30:
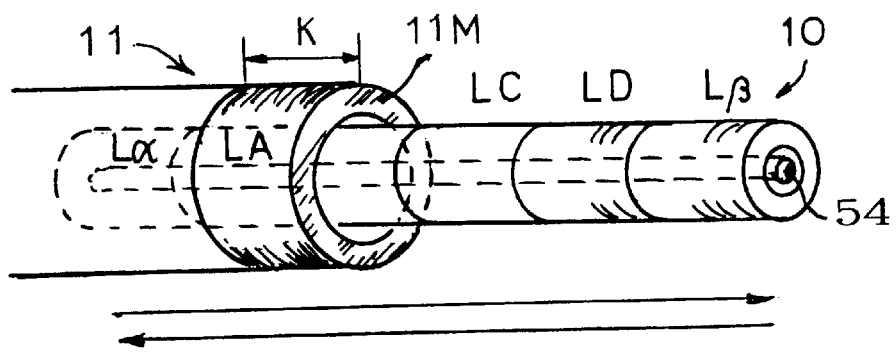
FIG. 30 is a perspective view showing an example of the magnetism-responsive member comprising a permanent magnet which is applicable to each of the embodiments of the present invention.

As still another example, the magnetism-responsive member 11 may comprise a permanent magnet and each of the coils in the coil section 10 may include an iron core, as illustratively shown in FIG. 30. In FIG. 30, the permanent magnet 11M functioning as the magnetism-responsive member 11 is in the shape of a ring into which the coil section 10 is movable, and an iron core 54 is inserted through an axial inner space defined by the individual coils Lα, LA–LD and Lβ. When the permanent magnet 11M gets close enough to any one of the coils, a portion of the magnetic core near the coil is magnetically saturated or supersaturated, so that the between-terminal voltage of the coil drops. The permanent magnet 11M has a length at least equal to one coil length K in such a manner that the between-terminal voltage of the coil decreases progressively during a movement of the permanent magnet 11M from one end to the other of the coil. Namely, even in the case where the permanent magnet 11M is used as the magnetism-responsive member 11, a progressive decrease can be caused in the between-terminal voltage of the coil during a movement of the permanent magnet 11M from one end to the other of the coil, as in the case where the non-magnetic substance of good electrical conductivity 11b is used. But, in the case of FIG. 30, non-saturated condition is restored once the permanent magnet 11M has passed a given portion of the coil; however, the inventive position detector device may be constructed to provide output amplitude level variations of desired sine and cosine function characteristics by performing appropriate analog arithmetic operations at a succeeding stage. Alternatively, the magnetically saturated or super-saturated state may be caused to persist by providing a succession of a plurality of the permanent magnets 11M as the magnetism-responsive member 11. The permanent magnet 11M may have any other shape than a ring, such as a rod, in which case the magnetism-responsive member 11 comprising the permanent magnet 11M may be arranged to pass the neighborhood of the coil section 10 in parallel to the axis of thereof. It is preferable that the magnetic core 54 in this modification be formed into a relatively thin shape so that magnetic saturation takes place easily.

Figure 25B:
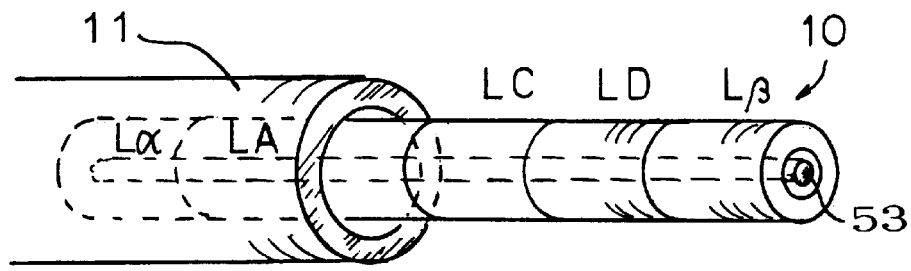
FIG. 25B is a schematic sectional view showing another modified positional relationship between the magnetism-responsive member and the coils.
Figures 31A, 31B:
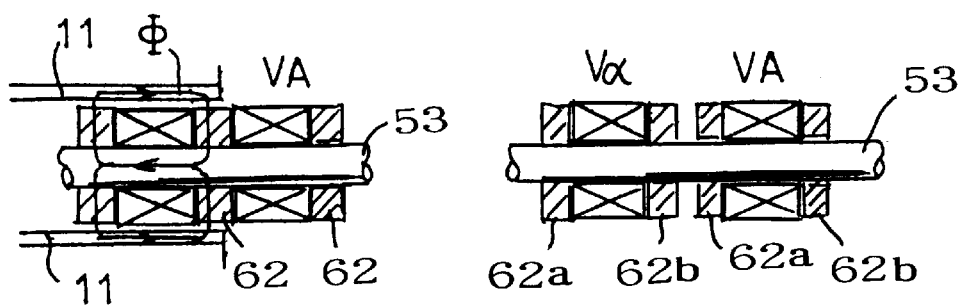
FIGS. 31A and 31B are sectional views showing modifications of the coil placement in the coil section shown in FIG. 25B.

FIGS. 31A and 31B show modifications of the placement of the coils in the coil section 10 of FIG. 25B, which is intended to prevent cross-talk between every adjoining coils and thereby enhance the detecting accuracy. In the modification of FIG. 31A, the coils Lα, LA–LD and Lβ are spaced from each other via magnetic spacers 62, so as to prevent spreading of the magnetic flux produced from the individual coils, namely, the magnetic flux from each of the coils follows a path denoted at Φ in the figure, along which it flows out from the interior of the coil, then passes a nearest end (i.e., the position of the magnetic spacer 62), outer periphery of the coil and another nearest end (i.e., the position of another magnetic spacer 62), and then returns to the interior of the coil. Such arrangements effectively prevent the undesired cross-talk between the coils, which can greatly improve responsiveness (impedance variations) of the individual coils with respect to the presence of the magnetism-responsive member 11 moving close to the outer periphery of the coils, thereby enhancing the detecting accuracy. Whereas only one magnetic spacer 62 is disposed between every adjoining coils in the example of FIG. 31A, two magnetic spacers 62, slightly spaced from each other, may be disposed between every adjoining coils as illustrated in FIG. 31B. In the example of FIG. 31B, a non-magnetic body may be used as a coil bobbin in place of the magnetic core 53. The idea of separating the coils from each other via the magnetic spacers 62a and 62b as in the modifications of FIGS. 31A and 31B is also applicable to the embodiment of FIG. 30.

Figure 32:
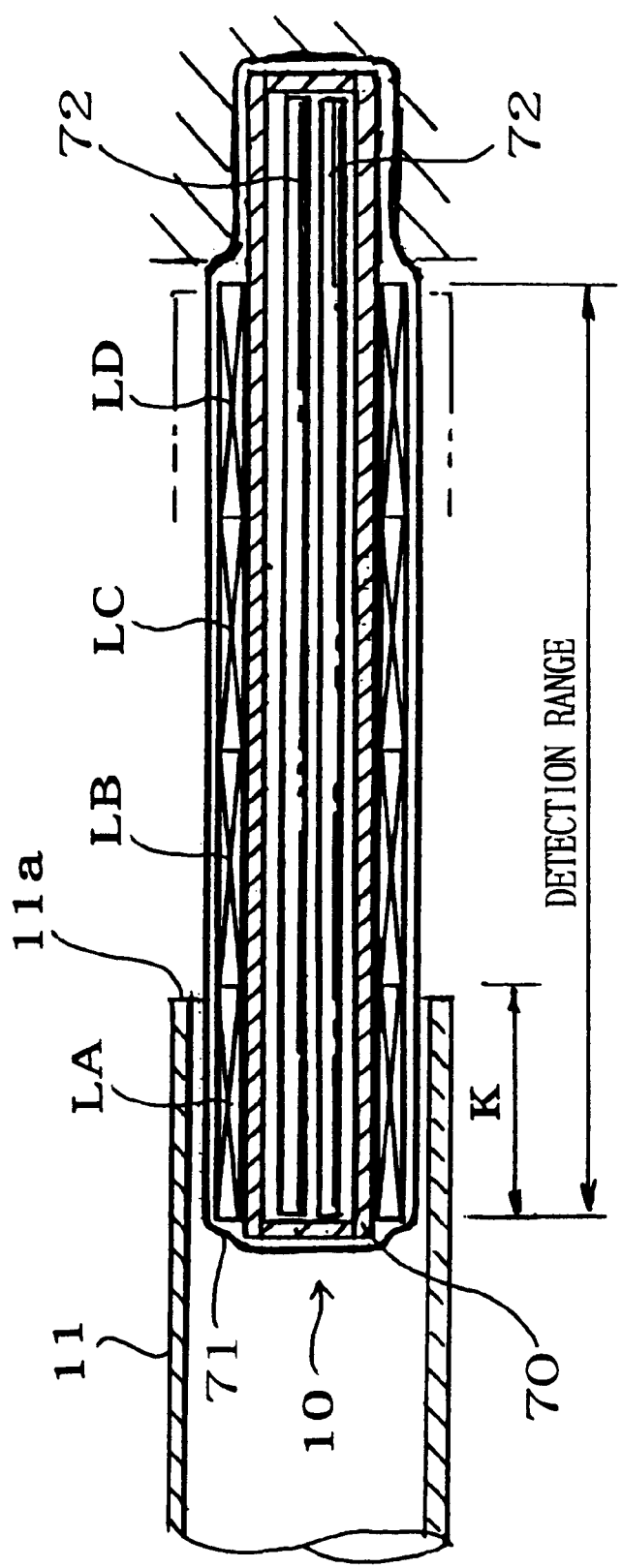
FIG. 32 is a schematic axial sectional view showing still another embodiment of the position detector device of the present invention.
Figure 33A:
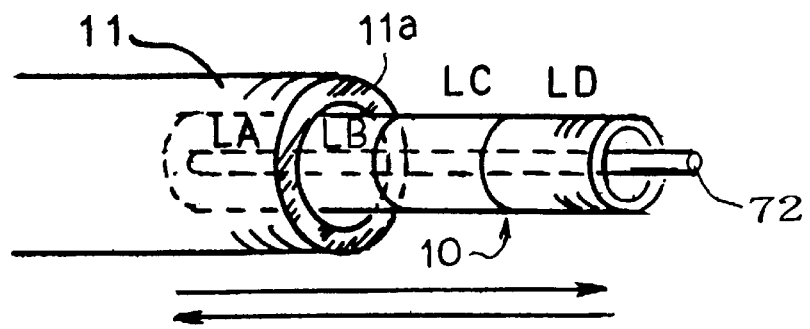
Figure 33B:
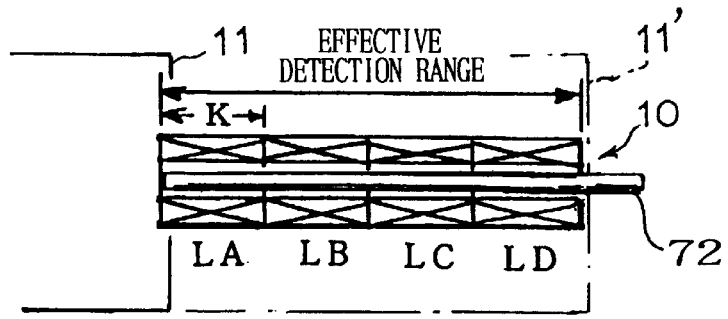
Figure 33C:
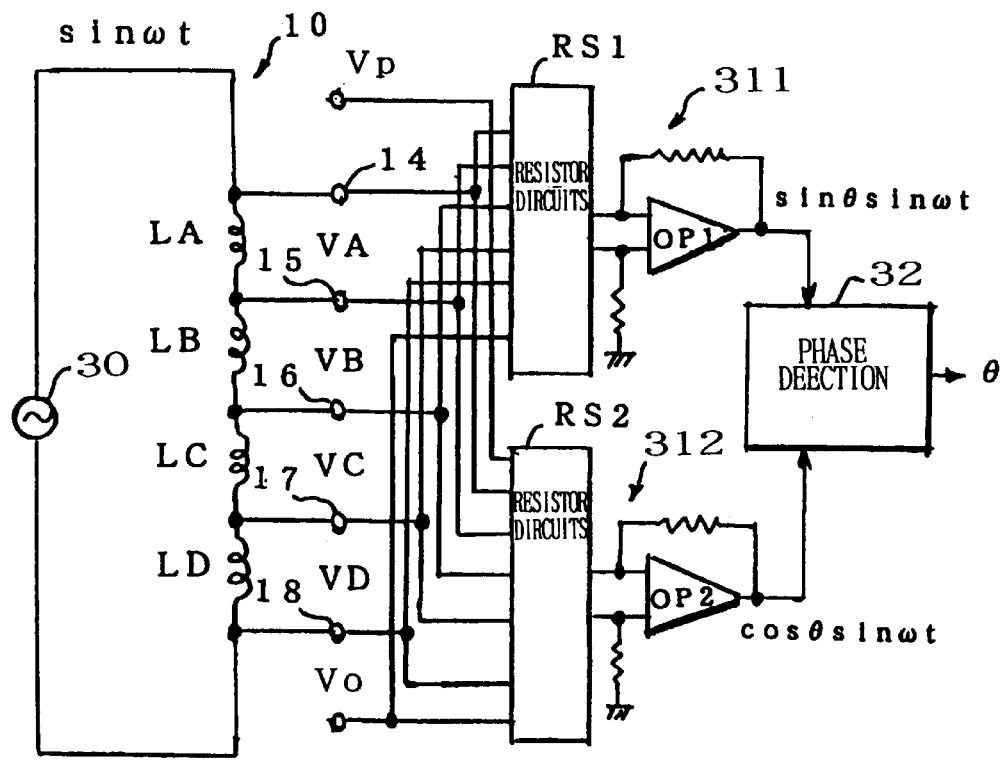

FIG. 32 is a schematic axial sectional view showing still another embodiment of the position detector device of the present invention, which is arranged such that the coil inductance in the coil section 10 progressively decreases as the magnetism-responsive member 11 moves deeper into the coil section 10. FIG. 33A is a schematic perspective view showing a principal part of the detector device, showing an exemplary positional relationship between the coil section 10 and the magnetism-responsive member 11 of FIG. 32. FIG. 33B is a schematic sectional view taken along the axis of the coil section 10, and FIG. 33C is a block diagram showing electric circuitry associated with the coil section 10. In the position detector device of FIG. 32, the magnetism-responsive member 11 is in the shape of a hollow cylindrical shape into which the coil section 10 is movable, as in the examples of FIGS. 25B and 30.

Further, in the embodiment of FIG. 32, the coil section 10 includes a plurality coils—in the illustrated example, four coils LA, LB, LC and LD—sequentially wound around a bobbin 70, and a non-magnetic and electrically-non-conductive protective tube (which may alternatively be a coating or molding) 71 enclosing and thereby covering the outer periphery of the plurality of coils. The protective tube 71 may be formed of any suitable material; however, a heat-shrinkable protective tube made of insulating resin is most preferable because of its low cost.

The bobbin 70 is in the form of a non-magnetic hollow cylinder, in which is received one or more magnetic rods 72. The rods 72 extend throughout the length of the coil section 10 and act to set an inductance value, i.e., impedance, along the entire length of the coil section 10. The setting of such an inductance value along the entire length of the coil section 10 can be changed as desired by appropriately adjusting the thickness and the number of the rods 72 received within the bobbin 70. Preferably, each of the magnetic rods 72 is plated with copper or the like to provide a conductive coating on its peripheral surface so that the conductive coating helps to compensate temperature drift characteristics. The bobbin 70 may be formed of any suitable metal or resin as long as it is non-magnetic. In cases where an apparatus employing the inventive position detector device is applied to large construction machinery or the like that is subjected to great loads, it is more preferable that the bobbin 70 be formed of metal, such as non-magnetic stainless steel, to assure a sufficient mechanical strength. In application to small-size equipment or apparatus, however, the bobbin 70 had better be formed of resin because of its lower cost and weight.

The following paragraphs describe how the position detector device of FIG. 32 operates for position detection, with reference to FIGS. 33A to 33C. Note that in FIGS. 33A to 33C, only one magnetic rod 72 is shown and the. bobbin 70 is not shown, for simplicity of illustration.

In the coil section 10 of FIGS. 33A to 33C, the coils LA, LB, LC and LD, which are equal to each other in the number of coil turns, coil length and various other characteristics, are placed in series along the direction in which the object to be detected is caused to move linearly. In this embodiment, the relative positions between the coil section 10 and the magnetism-responsive member 11 vary in response to displacement of the object to be detected in a similar manner to the embodiment of FIGS. 17A and 17B. More specifically, when the magnetism-responsive member 11 moves toward the rear end of the coil section 10, namely, rightward in the figure, in response to displacement of the object to be detected, the tip 11a of the magnetism-responsive member 11 first enters a magnetic field of the leading coil LA and then enters respective magnetic fields of the other coils LB, LC and LD sequentially in the order mentioned. A dot-and-dash line 11' in FIG. 33B depicts the magnetism-responsive member 11 having completely entered as far as the magnetic field of the last coil LD. Axial range 4K (4×K) corresponding to the four coils LA, LB, LC and LD together constitute the effective detecting range of the position detector device. However, because the detecting accuracy, in effect, tends to fall to some degree at opposite ends of the axial ranges 4K, the opposite ends of the effective detecting range are not actually used for the position detection purposes, so that the effective detecting range would become slightly shorter than a total length of the axial ranges 4K. Of course, in order to permit accurate detection along the full length of the effective detecting range, auxiliary coils Lα and Lβ may be provided immediately before and after the effective detecting range 4K in a similar manner to the above-described embodiments.

The one or more magnetic rods 72 extend axially through the individual coils LA, LB, LC and LD at their respective core regions. The one or more magnetic rods 72 present a maximum inductance value unless the magnetism-responsive member 11 is located sufficiently close to the coil section 10. As the magnetism-responsive member 11 moves closer to or further into the magnetic field of any one of the coils, the self-inductance of the coil decreases; thus, a voltage between opposite ends of the coil decreases progressively as the tip 11a of the magnetism-responsive member 11 is displaced from one end to the other of the coil in question. More specifically, in the case where the magnetism-responsive member 11 is formed of a magnetic substance, the magnetic substance covers the outer periphery of the coil which has come to be surrounded by the magnetism-responsive member 11 and thus a magnetic flux, having so far concentrated solely at the magnetic cores, namely, the rods 72, in the coil core region, leaks out to the member 11, so that the self-inductance of the coil is caused to decrease. Further, in the case where the magnetism-responsive member 11 is formed of an electrically-conductive substance, the conductive substance covers the outer periphery of the coil which has come to be surrounded by the member 11 and thus an eddy-current loss occurs due to the magnetic field, which also causes the self-inductance of the coil to decrease. That is, in the embodiment of FIG. 32, the self-inductance of each of the coils which have come to be surrounded by the member 11 is caused to decrease as the magnetism-responsive member 11 moves closer to or further into the magnetic field of the coil section 10, irrespective of whether the member 11 is formed of magnetic substance or electrically-conductive substance. However, the use of the electrically-conductive substance as the magnetism-responsive member 11 is more preferable because the rate of the inductance decrease caused by the eddy-current loss in the coil-surrounding conductive substance is greater that the rate of the inductance decrease caused by the magnetic flux leakage to the coil-surrounding magnetic substance. Because it is only necessary that the electrically-conductive substance produce a so-called "skin effect", the substance may be in the form of a just thin layer provided on the magnetism-responsive member 11. In such a case, the magnetism-responsive member 11 may be formed such as by providing an electrically-conductive substance (e.g., copper plating) on and along an inner wall surface of a suitable base member (mobile member) having a hollow cylindrical shape.

As shown in FIG. 33C, the individual coils LA, LB, LC and LD are excited, at a constant voltage or current, by a predetermined single-phase A.C. signal ("sin ωt") generated by the A.C. power supply 30. Voltages between the respective opposite ends of these coils LA, LB, LC and LD are denoted in the figure by "VA", "VB", "VC" and "VD", respectively, and taps 14–18 are provided to take out these voltages VA, VB, VC and VD. As may be readily understood, the coils LA, LB, LC and LD need not necessarily be physically-separated coils, and they may be replaced by just a single continuous coil divided into four lengths or coil portions by the intermediate taps 14–18; that is, the coil portion between the taps 14 and 15 functions as the coil LA, the coil portion between the taps 15 and 16 functions as the coil LB, the coil portion between the taps 16 and 17 functions as the coil LC and the coil portion between the taps 17 and 18 functions as the coil LD. Output voltages VA, VB, VC and VD from the individual coils are delivered, in predetermined combinations, to the analog arithmetic operation circuits 311 and 312, in which they are subjected to an addition and/or subtraction based on predetermined mathematical expressions as will be later described. Thus, these analog arithmetic operation circuits 311 and 312 produce two A.C. output signals sin θ sin ωt and cos θ sin ωt of amplitudes that present sine and cosine function characteristics corresponding to a current position of the object to be detected.

As mentioned earlier, as the magnetism-responsive member 11 moves closer to or further into the magnetic field of each of the coils, the self-inductance of the coil decreases, and thus the voltage between the opposite ends of the coil decreases progressively during displacement of the tip 11a of the member 11 from one end to the other of the coil. Here, because the coils LA, LB, LC and LD are placed in series along the displacement direction of the to-be-detected object, progressive variations in the respective voltages VA, VB, VC and VD of the coils LA, LB, LC and LD will occur sequentially, as illustratively shown in part (A) of FIG. 34, as the magnetism-responsive member 11 moves relative to the coils LA, LB, LC and LD in response to the displacement of the object to be detected. In part (A) of FIG. 34, a slope in each of the curves, indicative of the output voltages VA, VB, VC and VD from the coils LA, LB, LC and LD, represents a region where the tip 11a of the magnetism-responsive member 11 is moving from one end toward the other of the coil in question. Typically, a progressive variation curve of the voltage between the opposite ends of the coil, which takes place during the movement of the magnetism-responsive member 11 from the coil's one end to the other, can be likened to a functional value variation within a 90° range of the sine or cosine function. Thus, by appropriately combining the output voltages VA, VB, VC and VD from the individual coils LA, LB, LC and LD and performing an addition and/or subtraction between the combinations, it is possible to produce two A.C. output signals sin θ sin ωt and cos θ sin ωt of amplitudes that present sine and cosine function characteristics corresponding to a current position of the object to be detected.

Figure 34:
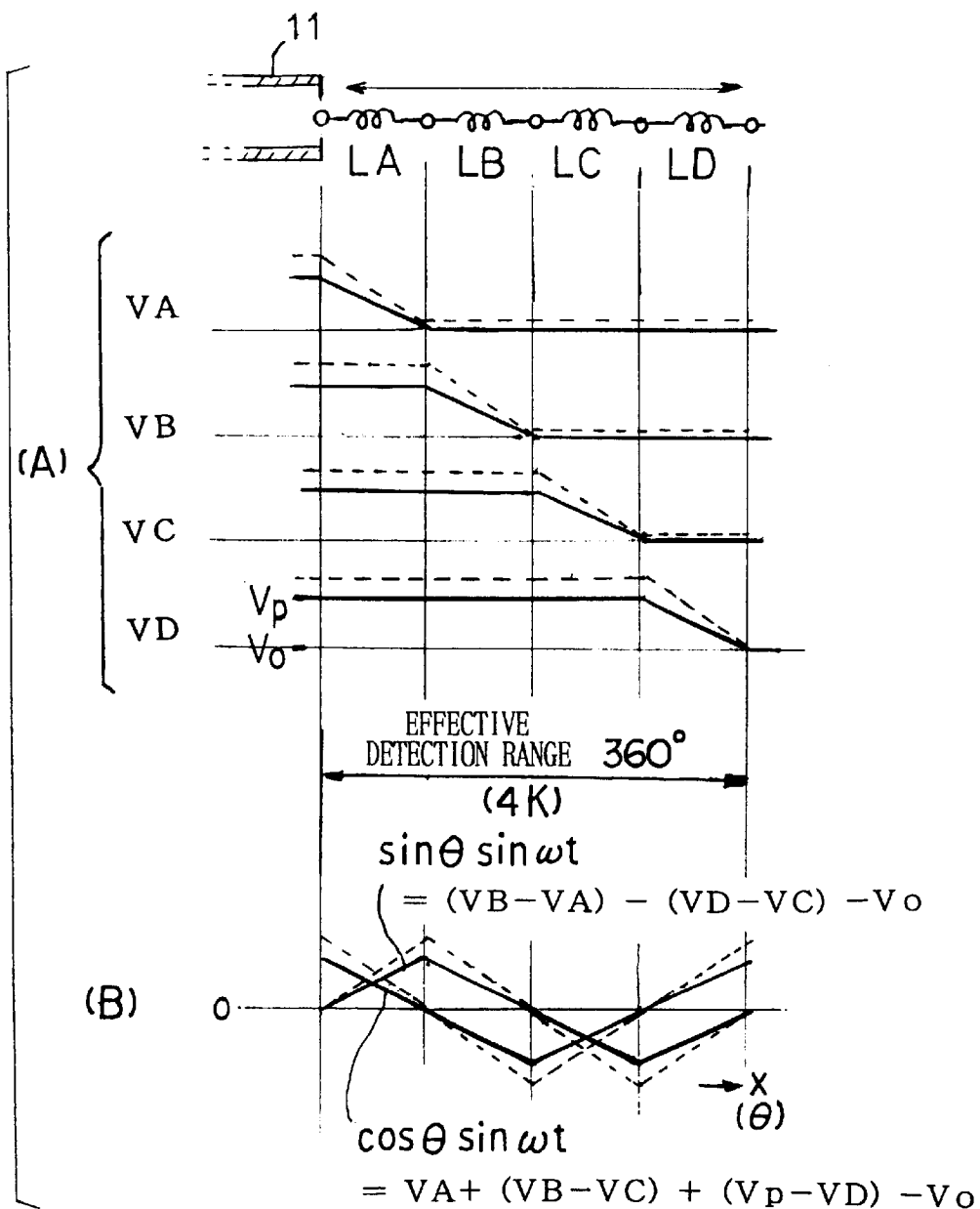
FIG. 34 is a diagram explanatory of position detecting operation of the embodiment shown in FIGS. 33A to 33C, where part (A) is a graph showing exemplary outputs from individual coils and part (B) is a diagram explanatory of an exemplary manner in which the outputs from the individual coils are synthesized through arithmetic operations.

More specifically, the analog arithmetic operation circuit 311 can provide an A.C. output signal indicative of an amplitude curve of the sine function characteristic as shown in part (B) of FIG. 34, by performing arithmetic operations on the output voltages VA, VB, VC and VD from the coils LA, LB, LC and LD in accordance with Expression (10) below; the A.C. output signal can be represented equivalently by "sin θ sin ωt".

$$(VB-VA)-(VD-VC)-Vo \qquad \text{Expression (10)}$$

Note that "Vo" represents a reference voltage corresponding to a minimum inductance value obtained when the magnetism-responsive member 11 has covered the entirety of one of the coils and this reference voltage is used here to offset the output voltage to a zero level.

Further, the other analog arithmetic operation circuit 312 can provide an A.C. output signal indicative of an amplitude curve of the cosine function characteristic as shown in part (B) of FIG. 34, by performing arithmetic operations on the output voltages VA, VB, VC and VD from the coils LA, LB, LC and LD in accordance with Expression (11) below; the A.C. output signal can be represented equivalently by "cos θ sin ωt".

$$VA+(VB-VC)+(Vp-VD)-Vo \qquad \text{Expression (11)}$$

Note that "Vp" represents a reference voltage corresponding to a maximum inductance value obtained when the magnetism-responsive member 11 is not located sufficiently close to any one of the coils and this reference voltage is used here to offset the output voltage VD. Considering temperature drifts, generation of the reference voltages Vo and Vp had better be carried out using a suitable dummy coil so that these voltages Vo and Vp may be generated with the same temperature drift characteristics as those of the coils LA, LB, LC and LD. However, any other suitable temperature compensation means may of course be employed.

Phase angle θ in the sine and cosine functions, which are amplitude components of the individual A.C. output signals, corresponds to the current position to be detected, and a phase angle θ within the 90° range corresponds to the length of one of the coils. Thus, the effective detecting range of the 4K length corresponds to phase angles e ranging from 0° to 360°. Therefore, every position within the effective detecting range of the 4K length can be detected in an absolute value by detecting such a phase angle θ. Specifically, in a similar manner to the above-mentioned, every position within the effective detecting range can be detected in an absolute value by means of the phase detection circuit (or amplitude-to-phase converting means) 32 which detects the phase component e of the amplitude functions sin θ and cos θ in the A.C. output signals sin θ sin ωt and cos θ sin ωt of the sine and cosine function characteristics.

Now, an explanation is given below about compensation of the temperature characteristics in the embodiment of FIG. 32. Impedance of the individual coils varies with a change in temperature, and such an impedance variation results in variations in the output voltages VA, VB, VC and VD from the individual coils. For example, as illustrated in part (A) of FIG. 34, each of the output voltages VA, VB, VC and VD would vary to increase or decrease in one direction, relative to a solid-line curve, as depicted by dotted line, as in the case of FIG. 18. However, in the A.C. output signals sin θ sin ωt and cos θ sin ωt of the sine and cosine function characteristics, obtained by the additive and subtractive syntheses of the output voltages, the variations would appear as positive and negative amplitude variations as shown by dotted lines in contradistinction with solid-line curves in part (B) of FIG. 34. This means that compensation of the temperature drift characteristics has been duly achieved without influencing the phase angle θ in the individual sine and cosine functions, and thus high-accuracy position detection can be provided by the position detector device. Further, the temperature drift compensation can be made by forming a conductive coating, such as copper plating, on the outer periphery of each of the magnetic rods 72 functioning as the magnetic cores of the coil section 10, as set forth above. More specifically, although the conductive coatings on the magnetic rods 72 act to reduce the inductance of the magnetic circuit due to the eddy-current loss generated therein, the eddy-current loss in the conductive coatings decreases to cause the inductance of the magnetic circuit to increase relatively as the coil impedance increases, for example, in response to a temperature increase, which thus can compensate for the temperature drifts of the coil inductance. For the same reasons, a similar temperature drift compensation effect can be provided by using a more or less conductive substance as the non-magnetic metal of the bobbin 70.

Although each of the embodiments has been described above as generating two A.C. output signals sin θ sin ωt and cos θ sin ωt having amplitude characteristics of sine and cosine functions (so to speak, resolver-type two-phase outputs), the present invention is not so limited and may be designed to generate three or more A.C. output signals having amplitude characteristics of three or more trigonometric functions phase-shifted by a predetermined amount (e.g., sin θ·sin ωt, sin(θ−120°)·sin ωt and sin(θ−240°)·sin ωt). Further, the number of the coils LA–LD may be greater than four.

Figure 35:
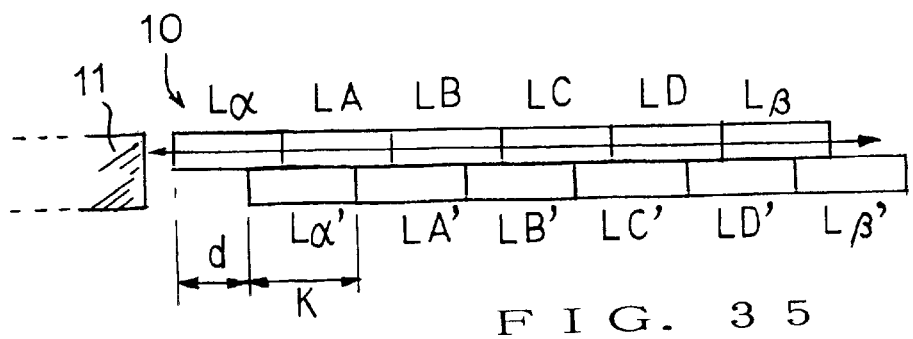
FIG. 35 is a diagram schematically showing another example of coil displacement in the present invention.

Further, as shown in FIG. 35, two groups of coils Lα, LA–LD, Lβ and Lα', LA'–LD', Lβ' (or three or more groups of coils) may be provided in parallel while positionally deviating from each other by a predetermined distance d, in which case the magnetism-responsive member 11 is formed into a size sufficient to cover all the coil groups. The coils in all these groups are excited by a same-phase A.C. signal (e.g., sin ωt). The deviation of distance b results in an appropriate phase difference less than 90°, and thus a plurality of A.C. output signals presenting amplitudes based on a plurality of trigonometric functions which have non-90° phase differences (trigonometric functions in other than the sine/cosine relationship), such as sin θ·sin ωt, sin(θ−120°)·sin ωt and sin(θ−240°)·sin ωt, can be generated by combining the output voltages of these coils after performing appropriate addition and/or subtraction operations thereon.

As a further modification of the present invention, only one of the analog arithmetic operation circuits 311 of FIG. 17C may be used to generate only one A.C. output signal sin θ·sin ωt. In such a modification, position detecting data will be obtained from the amplitude voltage level of the only A.C. output signal sin θ·sin ωt without using the phase detection circuit 32. In this case too, there can be provided a simplified position detector device equipped with no secondary coil.

It should also be noted that a position detector device based on the known phase-shift-type phase detection principles can be constructed by combining a pair of the position detector devices capable of generating only one A.C. output signal sin θ·sin ωt in the same manner as the above-described modification. Namely, in such a position detector device based on the known phase-shift-type phase detection principles, plural-phase primary coils are excited by two-phase A.C. signals (e.g., sin ωt and cos ωt), and an A.C. output signal (e.g., sin(ωt+θ)), phase-shifted by a phase angle θ corresponding to a current position of the object to be detected, can be produced as a composite of the output signals of the individual phases. The idea of the present invention may be applied to such a position detector device based on the known phase-shift-type phase detection principles. For that purpose, two coil groups may be provided in parallel and the coils in each of the groups may be excited by A.C. signals of different phases (e.g., sin ωt and cos ωt) in such a way that one of the coil groups outputs sin θ cos ωt while the other coil group outputs sin θ sin ωt and an addition or subtraction is performed on these two outputs.

It should also be obvious that the magnetism-responsive member 11 in each of the embodiments shown in FIGS. 17A to 35 may be fixed while the coil section 10 is arranged to move linearly relative to the magnetism-responsive member 11 in response to displacement of the object to be detected.

Figure 36:
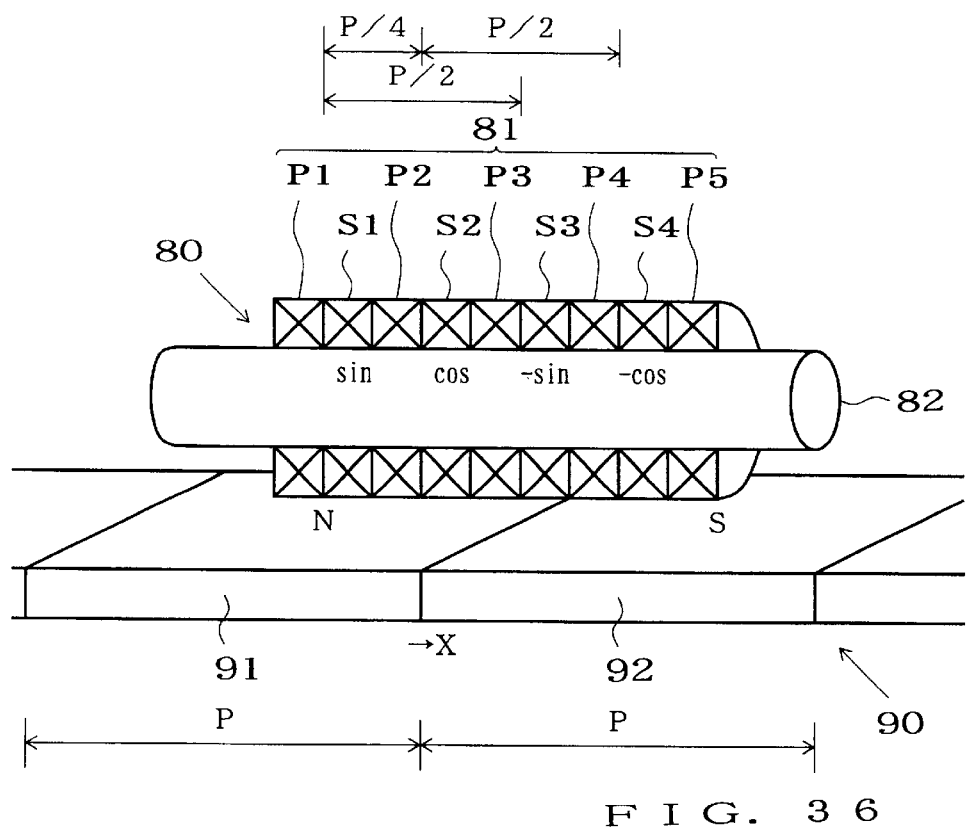
FIG. 36 is a partly-sectional schematic view of a position detector device in accordance with still another embodiment of the present invention.

The position detector device employing a permanent magnet as shown in FIGS. 6 and 30 is also applicable to an application where the coil section includes primary and secondary coils, as illustratively shown in FIG. 36. Specifically, FIG. 36 is a partly-sectional schematic view of a linear-type position detector device in accordance with another embodiment of the present invention. This linear-type position detector device 80 basically comprises an iron core 82, and a coil section 81 wound around the iron core 82 in predetermined conditions, and a permanent magnet section 90 movable relative to the coil section 81. The iron core 82 is preferably formed of silicon steel having a high magnetic permeability and low coercive force. However, the iron core 82 may be formed of any other suitable material than silicon steel, or may comprise a lamination of silicon steel plates formed into a rectangular parallelopiped. Further, the iron core 82 may be in any desired shape. The coil section 81 includes a plurality of primary coils P1–P5 to be excited by a predetermined A.C. signal, and a plurality of secondary coils S1–S4 wound to assume a predetermined positional relationship in a predetermined direction X.

Figure 37:
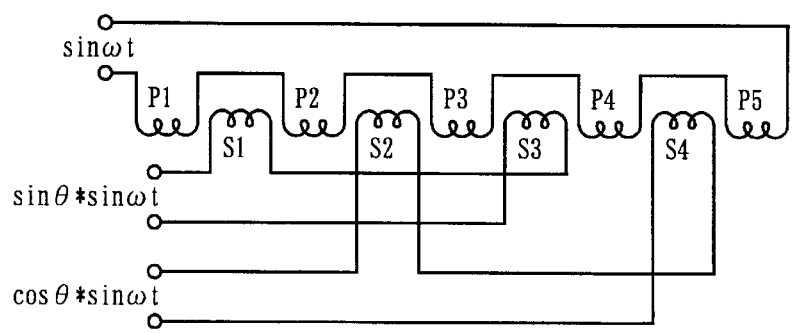
FIG. 37 is an electric circuit diagram of a coil section in the position detector device of FIG. 36.

FIG. 37 is a diagram showing connections of the primary coils P1–P5 and secondary coils S1–S4. As seen from the figure, the primary coils P1–P5 only have to be excited by a same single-phase A.C. signal (e.g., sin ωt); only one or any desired plurality of the primary coils may be provided in any desired placement. The secondary coils S1 and S3 are connected to operate in a differential manner; so are the secondary coils S2 and S4.

In a situation where a mechanical system whose position is to be detected by the position detector device 80 is a linear motor, the coil section 81 is connected with a moving member (not shown) of the linear motor so that it is movable linearly and in a reciprocative fashion in response to a changing linear position of the moving member. In this embodiment, the permanent magnet section 90 functions as a railroad for the linear motor. Namely, the linear motor is constructed in such a way that the moving member moves over a railroad, i.e., permanent magnet section 90 made up of a series of magnets 91, 92, . . . as shown in FIG. 36. Of course, the relationship between the moving member and the permanent magnet section 90 may be reversed whenever desired. Referring to the magnets 91 and 92, for example, a magnetic flux is dense in a connection between the magnets 91 and 92 while the magnetic flux is sparse in and around respective middle regions of these magnets 91 and 92. Therefore, regions of dense and sparse magnetic flux occur alternately on the railroad 90 with predetermined pitches P.

If pitches of alternate placement of N and S poles of the magnets 91, 92, . . . are denoted by P, the secondary coils S1–S4 are placed, for example, in the following positional relationship. The secondary coil S3 is spaced from the secondary coil S1 by a distance equal to an integral multiple of half the pitch P(P/2) (namely, S3=S1+(P/2+nP)), the secondary coil S2 is spaced from the secondary coil S1 by a distance equal to an integral multiple of a quarter of the pitch P(P/4) (namely, S2=S1+(P/4+nP)), and the secondary coil S4 is spaced from the secondary coil S2 by a distance equal to an integral multiple of half the pitch P(P/2) (namely, S4=S1+(P/2+nP)). With such a positional relationship, the secondary coil S1 presents a characteristic of sine function (sin), the secondary coil S3 presents a characteristic of minus sine function (−sin), the secondary coil S2 presents a characteristic of cosine function (cos), and the secondary coil S4 presents a characteristic of minus cosine function (−cos).

In response to a changing linear position of the moving member to be detected, i.e., the coil section 81, the dense and sparse magnetic flux regions of the railroad, i.e., the permanent magnet 90, alternately act on the coil section 81. More specifically, when any one of the secondary coil faces one of the dense magnetic flux regions, the magnetic flux from the magnet passes a corresponding portion of the iron core 82 densely, so that a magnetic coupling force of that secondary coil to the adjoining primary coils would be weakened. This is because the magnetic flux passing the iron core 82 becomes dense due to the magnetic flux from the magnet to thereby produce magnetic saturation in the corresponding portion of the iron core 82 and thus there occurs such magnetic coupling just as in "coreless" condition where no iron core exists. Therefore, when the secondary coil faces the connection between the magnets 91 and 92 where the magnetic flux is dense, a secondary electromotive force becomes weakest. When, on the other hand, the secondary coil faces one of the sparse magnetic flux regions, the magnetic flux from the magnet passes a corresponding portion of the iron core 82 sparsely, so that a magnetic coupling force of that secondary coil to the adjoining primary coils would not change so much.

Thus, A.C. output signals induced in the individual secondary coils are caused to vary in response to a variation in the relative linear positions between the coil section 81 and the railroad, i.e., the permanent magnet 90. Namely, inductive A.C. output signals amplitude-modulated in accordance with a relative linear position of the moving member, i.e., the object to be detected, are produced, from the individual secondary coils S1–S4, with amplitude function characteristics differing in correspondence with the respective positions of the secondary coils S1–S4. As the primary coils P1–P5 are excited by the same single-phase A.C. signal sin ωt as shown in FIG. 2, the inductive A.C. output signals produced from the individual secondary coils S1–S4 are caused to change in cycles with each of the cycles representing a variation amount that has a same electrical phase and amplitude function corresponding to the pitch P of the dense and sparse magnetic flux regions of the magnets 91 and 92.

Inductive voltage levels of the secondary coils S1–S4 present two-phase positive function characteristics sin θ and cos θ and negative or minus versions of the function characteristics −sin θ and −cos θ corresponding to a linear position of the object to be detected. Namely, the inductive output signals from the secondary coils S1–S4 are provided after having been amplitude-modulated with the two-phase positive function characteristics sin θ and cos θ and negative function characteristics −sin θ and −cos θ corresponding to a current linear position of the object to be detected. Note that "θ" is proportional to a linear position "x" so as to provide, for example, a relationship of θ=2π (X/P). For convenience of description, the number of coil turns and coefficients corresponding to other conditions are not considered and also let it be assumed that the secondary coil S1 is of the sine phase, the secondary coil S2 is of the co sine phase, the secondary coil S3 is of the minus sine phase and the secondary coil S4 is of the minus cosine phase. By differentially synthesizing the inductive outputs of the sine and minus sine phases, there can be generated a first A.C. output signal (sin θ*sin ωt) having an amplitude function of the sine function. Similarly, by differentially synthesizing the inductive outputs of the cosine and minus cosine phases, there can be generated a second A.C. output signal (cos θ*sin ωt) having an amplitude function of the cosine function.

In this way, there are provided a first A.C. output signal A (=sin θ*sin ωt) having an amplitude value of a first function value sin θ corresponding to a current linear position of the object to be detected, and a second A.C. output signal B (=cos θ*sin ωt) having an amplitude value of a second function value corresponding to the linear position of the object to be detected. With such wiring, the linear-type position detector device can provide two same-phase A.C. output signals having two-phase amplitude functions (sine and cosine outputs), in a similar manner to the conventional resolvers that are among the rotary-type position detector devices.

In summary, the described invention can provide an improved position detector device which is very compact in size and very simple in structure, because it requires only primary coils with no need for a secondary coil. Further, using a combination of one coil and two reference voltages or a combination of two coils and one reference voltage, the present invention can readily produce a plurality of A.C. output signals presenting amplitudes of predetermined cyclic function characteristics (e.g., two A.C. output signals presenting amplitudes of sine and cosine function characteristics), in response to a current linear position of an object to be detected, and also can allocate at least about one quadrant (90°) range as an available phase angle range.

Thus, even with a reduced number of coils, the described invention is capable of position detection over a relatively wide phase angle range and achieves an enhanced detecting resolution. Further, even for very minute or microscopic displacement of the object to be detected, a position of the object can be detected with a high resolution. Furthermore, if a circuit (e.g., a coil) presenting temperature characteristics similar to those of detecting coils is employed as the circuit for generating a reference voltage, subtractive arithmetic operations in arithmetic operation circuitry can automatically compensate for the temperature drifts, thereby providing for high-accuracy position detection without influences of a temperature change.

Furthermore, the described invention can provide an improved rotary-type position detector device which is very compact in size and very simple in structure, because it requires only primary coils with no need for a secondary coil. In addition, by performing arithmetic operations on an output signal from one coil and the reference voltage, there can be generated an output signal presenting amplitude coefficient characteristics of a real sine or cosine function with amplitude coefficient components swinging in the positive and negative directions, with the result that the present invention can significantly simplify the coil structure to thereby provide a more sophisticated rotary-type position detector device of an even smaller size and an even further simplified structure.

Moreover, with the arrangement that a plurality of coil segments are placed in series along a displacement direction of an object to be detected so that progressive incremental or decremental variations in the respective between-terminal voltages of the coil segments occur sequentially as the magnetism-responsive member moves relative to the coil segments in response to the displacement of the object to be detected, the present invention can produce a plurality of A.C. output signals presenting amplitudes of predetermined cyclic function characteristics (e.g., two A.C. output signals of sine and cosine function characteristics) corresponding to a current position of the object, by appropriately combining the voltages taken out from the coil segments after performing an addition and/or subtraction on the voltages. In addition, even for very minute or microscopic displacement of the object to be detected, a position of the object can be detected with a high resolution, by detecting, from a correlation between the amplitude values of these A.C. output signals, a phase value in the predetermined cyclic functions (e.g., sine and cosine functions) defining the amplitude values.

Finally, further embodiments of the present invention will be described hereinbelow.

Figure 38A:
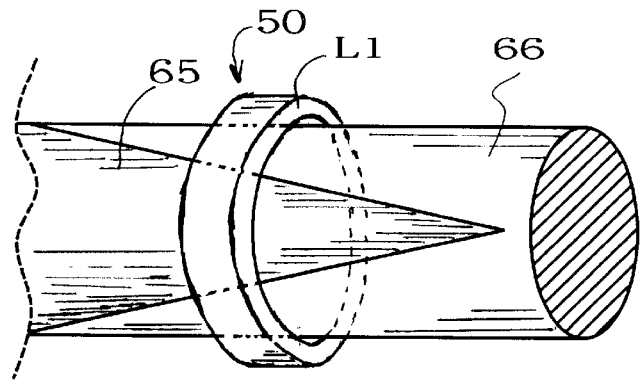
Figure 38B:
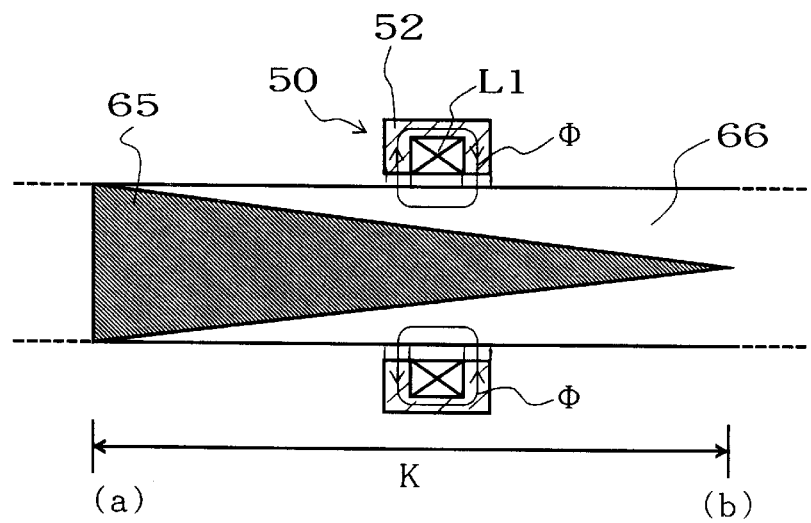
Figure 38C:
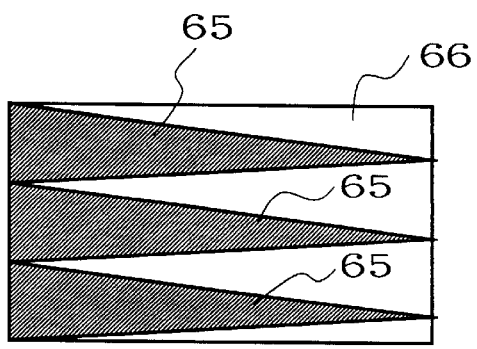

FIG. 38A is a schematic perspective view of a position detector device, where the coil section 50 includes only one coil L1 and a position detection signal using a combination of an output voltage Vx from the coil L1 and two reference voltages Va and Vb in a similar manner to the embodiment of FIG. 1. FIG. 38B is a partly-sectional side view of the position detector device shown in FIG. 38A. Magnetism-responsive member 65 is provided on a base member 66 shaped like a rod, such as a cylinder piston rod; specifically, the magnetism-responsive member 65 comprises a pattern of a predetermined progressively-increasing or progressively-decreasing shape, such as a triangle, which is formed on a surface of the rod-shaped base member 66. The magnetism-responsive member 65 and base member 66 are made of substances having different magnetic characteristics. If the base member 66 is made of a magnetic substance such as iron, the magnetism-responsive member 65 is made of a non-magnetic substance of good electrical conductivity such as copper. Or, if the magnetism-responsive member 65 is made of a magnetic substance such as iron, then the base member 66 is made of a non-magnetic substance or magnetic substance having a concave profile corresponding to the magnetism-responsive member 65 formed into a convex shape. As shown in FIG. 38B, the coil L1 is inserted in a U-shaped interior space defined by a magnetic core 52 in the form of a ring having a U-shaped section, and the rod-shaped base member 66 provided with the magnetism-responsive member 65 is inserted in a ring-shaped inner space defined by the coil L1 in such a manner that the coil LI is linearly movable in the axial direction thereof. Magnetic path $\Phi$ of the coil L1 passes the surface of the rod-shaped base member 66 in a relatively great amount. In this embodiment, the length of the coil L1 has no relation to the detection range K and may be short and simple. Range K of the progressively-increasing or progressively-decreasing pattern of the magnetism-responsive member 65, provided on the base member 66, corresponds to the detectable range K. Namely, as the rod-shaped base member 66 moves in response to displacement of the object to be detected, the position of the magnetism-responsive member 65 corresponding to the coil L1 changes, so that there is produced, in the coil L1, a self-inductance, i.e., impedance, corresponding to an area of the member 65 corresponding to (traversing) the coil L1 and an output voltage Vx corresponding to a current position of the object to be detected is produced from the coil L1. FIG. 38C shows an example of the pattern of the magnetism-responsive member 65 which is formed on the surface of the rod-shaped base member 66. This pattern may be either a single pattern or a plurality of similarly-shaped patterns placed side by side.

Electric circuitry applied to the embodiment of FIGS. 38A–38C may be of the same construction as the one shown in FIG. 1C, and essential behavior of the embodiment may be similar to the one described earlier in relation to FIGS. 2A and 2B. Further, the modification where a plurality of coils are used as shown in FIGS. 7A and 7B, the modification where a single reference voltage VN is used as shown in FIG. 23A, or the modification where a reference voltage VR variable in response to displacement x via a resistor element is used as shown in FIG. 22A is also applicable to the embodiment of FIGS. 38A–38C.

FIGS. 39A–39E and FIGS. 40A–40D are schematic views of position detector devices in accordance with still other embodiments of the present invention, where the coil section 10 includes a plurality of coils LA, LB, . . . and two-phase, sine and cosine, detection output signals (typically, sin θ sin ωt and cos θ sin ωt) corresponding to a current position of an object to be detected are generated using combinations of output voltages VA, VB, . . . from these coils, in a similar manner to other embodiments such as the embodiments of FIGS. 17A, 17B, 21A, 33A and 33B. In these embodiments, similarly to the embodiment of FIGS. 38A and 38B, magnetism-responsive members 11a, 11b, . . . are formed on the rod-shaped base member 66; specifically, each of the magnetism-responsive members 11a, 11b, . . . comprises a pattern of a predetermined progressively-increasing or progressively-decreasing shape, which is formed on a surface of the rod-shaped base member 66. These embodiments are different from the embodiment of FIGS. 38A and 38B in that the patterns of the magnetism-responsive members 11a, 11b, . . . differ from each other as appropriate and separate coils L1, L2, . . . are provided in corresponding relation to the patterns. Various combinations of the substances forming these magnetism-responsive members 11a, 11b, . . . and base member 66 may be chosen in the same manner as with the embodiment of FIGS. 38A and 38B.

Figure 39A:
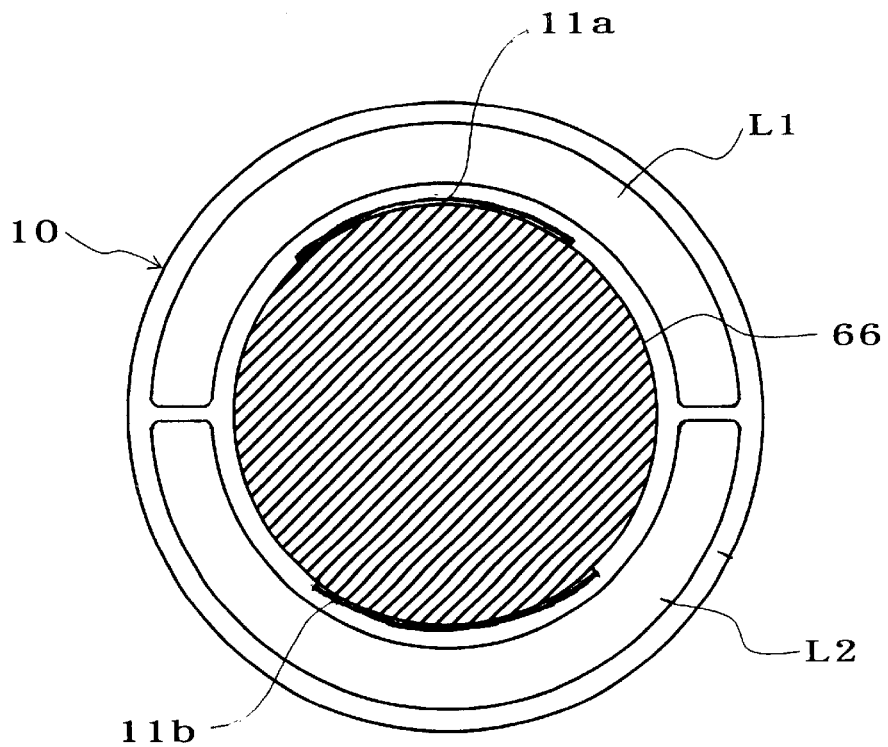
Figure 39B:
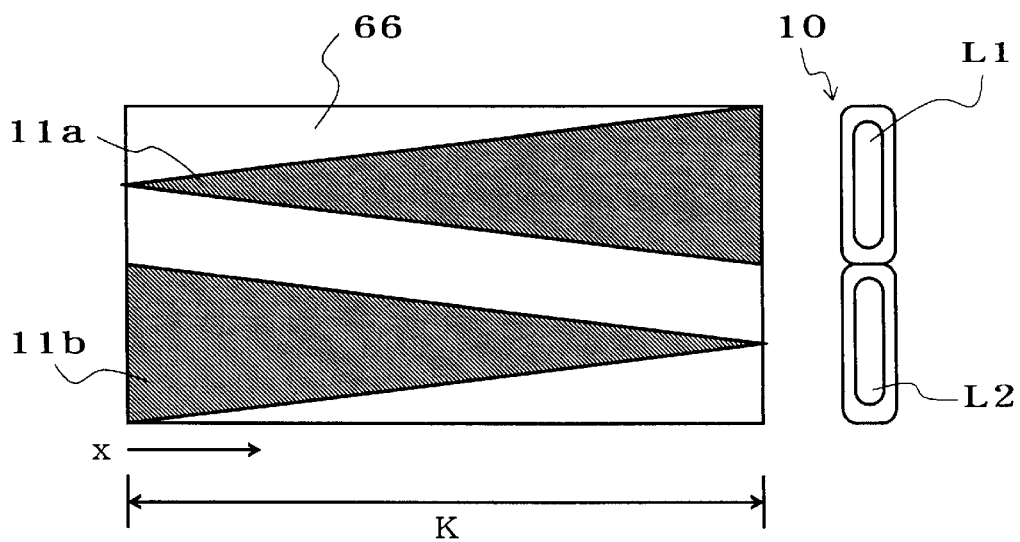

FIG. 39A is a cross-sectional view showing the rod-shaped base member 66 and coil section 10. The coil section 10 is generally in the shape of a ring, in which the rod-shaped base member 66 is inserted for linear movement in the axial direction thereof. The first coil L1 is positioned in one half portion of the coil section 10 and the second coil L2 is positioned in the other one half portion of the coil section 10. FIG. 39B is a view showing the rod-shaped base member 66 and coil section 10 in an unfolded condition, where arrow x indicates a direction of linear displacement of the object to be detected. As shown, the magnetism-responsive members 11a and 11b comprise two separate patterns; that is, the first pattern 11a is a triangle progressively increasing or widening in a left-to-right direction while the second pattern 11b is a triangle progressively decreasing or narrowing in the left-to-right direction. The first coil L1 covers the positioned area of the pattern 11a. The second coil L2 covers the positioned area of the pattern 11b.

Figure 39C:
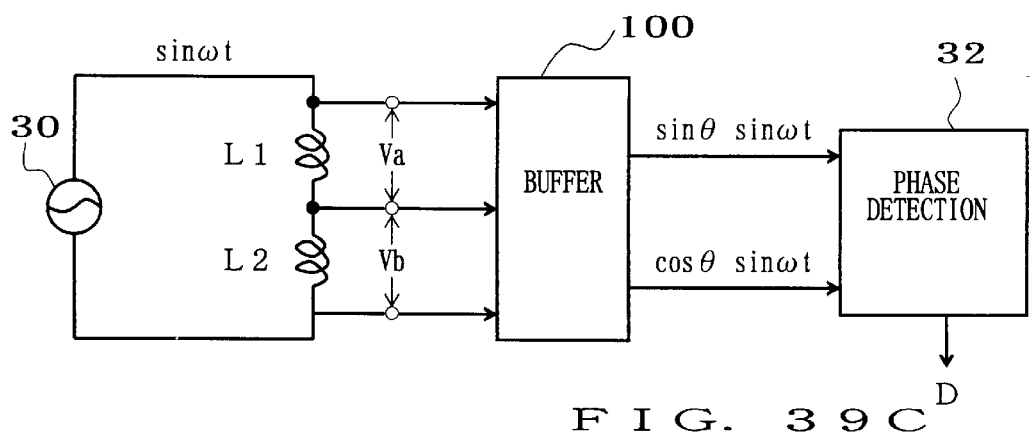
Figure 39D:
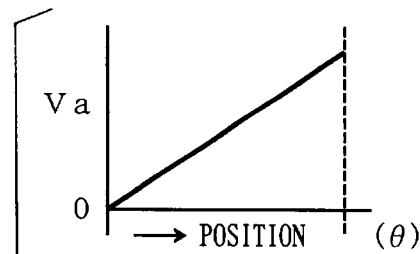
Figure 39E:
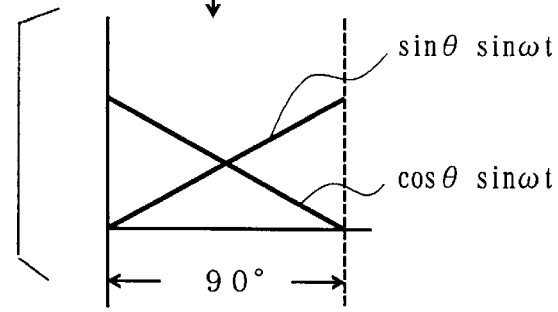

FIG. 39C is a block diagram of electric circuitry associated with the individual coils L1 and L2 of FIG. 39A, and FIGS. 39D end 39E are diagrams explanatory of position detecting operation of the embodiment. Similarly to the above-mentioned, as the rod-shaped base member 66 moves in response to displacement of the object to be detected, the positions of the magnetism-responsive members 11a and 11b corresponding to the coils L1 and L2 change, so that there is produced, in the coils L1 and L2, self-inductance, i.e., impedance, corresponding to areas of the members 11a and 11b corresponding to the coils L1 and L2 and output voltages Va and Vb corresponding to a current position of the object to be detected are produced from the coils L1 and L2. These output voltages Va and Vb present opposite characteristics as shown in FIG. 39D. Therefore, variations in these output voltages Va and Vb can each be likened to a function value variation within an appropriate less-than-90° range in a sine or cosine function. Thus, by extracting these output voltages Va and Vb by means of an appropriate analog buffer circuit 100, there can be generated two A.C. output signals (typically, sin θ sin ωt and cos θ sin ωt) having amplitudes presenting sine and cosine functional characteristics corresponding to a current position of the object to be detected.

Figure 40A:
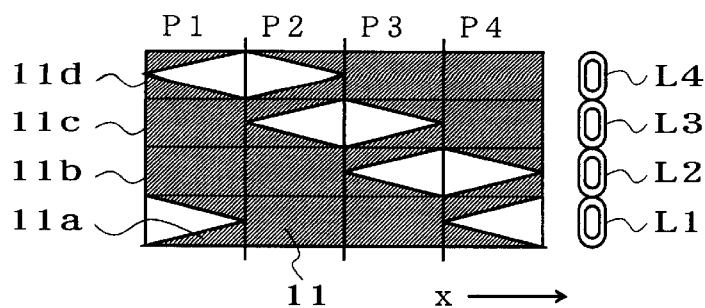

FIGS. 40A–40D show the embodiment which can realize a full phase variation from a substantially zero degree to 360 degrees. More specifically, FIG. 40A is a diagram showing, in an unfolded condition, four different patterns 11a, 11b, 11c and 11d that are formed on the base member 66 by the magnetism-responsive member 11. These patterns 11a, 11b, 11c and 11d are positioned in corresponding relation to four regions of a peripheral surface of the rod-shaped base member 66 which are divided circumferentially along the peripheral surface. For convenience of description, the rod-shaped base member 66 is shown in part (a) of the figure as being divided into four portions along the length thereof, and these divided portions are denoted by P1, P2, P3 and P4, respectively. For example, the pattern 11a is a triangle progressively increasing in area or widening in the left-to-right direction over the portion P1 but progressively decreasing or narrowing in the left-to-right direction over the portion P4. In each of the portions P2 and P3, the pattern 11a covers the whole area, i.e., wholly functions as the magnetism-responsive member 11. The other patterns differ from each other in a sequential manner as shown.

Figure 40B:
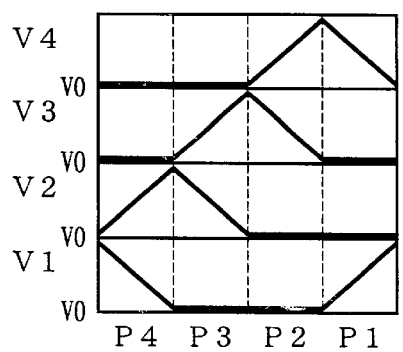
Figure 40D:
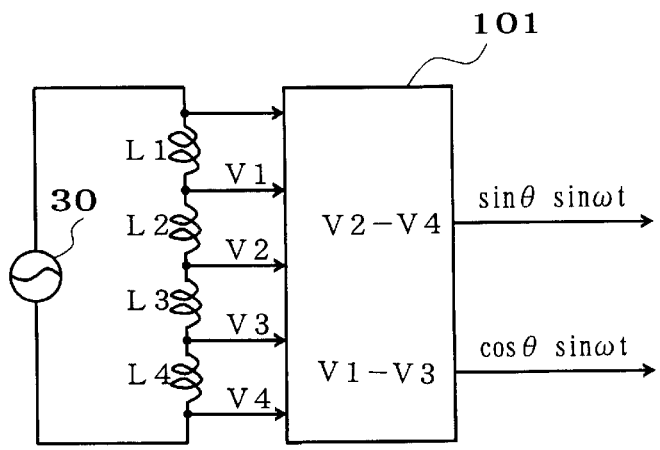
Figure 40C:
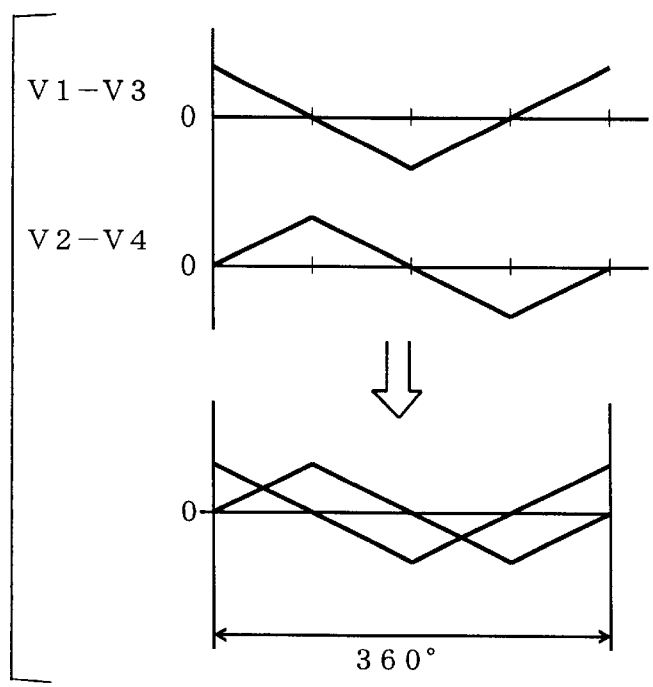

Further, FIG. 40B is a diagram showing progressively-increasing and progressively-decreasing variations in output voltages V1–V4. FIG. 40D is a block diagram of electric circuitry associated with the individual coils L1–L4, where an analog arithmetic operation circuit 101 performs arithmetic operations of "V1–V3" and "V2–V4". FIG. 40C is a graph showing an output signal provided as a result of the arithmetic operations. The voltage "V1–V3" obtained by subtracting the output voltage V3 from the voltage V1 can be likened to a sine function characteristic falling within a range from a substantially zero degree to 360 degrees. On the other hand, the voltage "V2–V4" obtained by subtracting the output voltage V4 from the voltage V2 can be likened to a cosine function characteristic falling within a range from a substantially zero degree to 360 degrees. Therefore, there can be generated signals to A.C. output signals (typically, sin θ sin ωt and cos θ sin ωt) having sine and cosine functional characteristics over the substantially 360° range.

It should be obvious that the base member 66 may be in any other suitable shape than a rod, such as a flat plate, in which case the coils L1, L2, . . . are placed in opposed relation to the magnetism-responsive members 11, 11a, 11b, . . . formed on the plate.

What is claimed is:

1. A position detector device comprising:

a coil section including at least one coil to be excited by an A.C. signal;

a magnetism-responsive member movable relative to said coil section, wherein relative positions between said magnetism-responsive member and said coil section vary in response to displacement of an object to be detected and impedance of said coil is caused to vary in response to a variation in the relative positions in such a manner that a voltage produced in said coil is caused to vary in response to a variation in the impedance of said coil during the variation in the relative positions within a predetermined range;

a reference-voltage generation circuit adapted to generate at least one predetermined reference voltage in the form of an A.C. signal; and an arithmetic operation circuit coupled to said coil and reference-voltage generation circuit, said arithmetic operation circuit adapted to perform an arithmetic operation between said voltage produced in said coil and said predetermined reference voltage, so as to generate at least two A.C. output signals having predetermined cyclic amplitude functions as amplitude coefficients, the cyclic amplitude functions of the two A.C. output signals being different, in their cyclic characteristics, from each other by a predetermined phase.

2. A position detector device as claimed in claim 1 wherein said coil section includes a single coil, said reference-voltage generation circuit generates first and second reference voltages, and said arithmetic operation circuit performs predetermined first and second arithmetic operations using a voltage produced in said single coil and said first and second reference voltages, to thereby generate a first A.C. output signal having a first amplitude function as an amplitude coefficient and a second A.C. output signal having a second amplitude function as an amplitude coefficient.

3. A position detector device as claimed in claim 2 wherein said first and second reference voltages define specific phase sections in cyclic characteristics of said first and second amplitude functions of said first and second A.C. output signals, and wherein correspondence between the specific phase sections and a variation range of the relative positions can be varied by varying said first and second reference voltages.

4. A position detector device as claimed in claim 1 wherein said reference-voltage generation circuit includes a coil of predetermined impedance which is positioned so as not to be influenced by a movement of said magnetism-responsive member.

5. A position detector device as claimed in claim 1 wherein said coil includes a magnetic core and said magnetism-responsive member has a flat surface that is opposed to said magnetic core of said coil with an air gap interposed therebetween, and wherein as the flat surface of said magnetism-responsive member moves in response to a changing position of the object to be detected, there occurs a dimensional variation in the air gap which brings about a variation in the impedance of said coil.

6. A position detector device as claimed in claim 1 wherein said coil includes a magnetic core, and the impedance of said coil is caused to vary as a distance defined by an air gap between said magnetic core and said magnetism-responsive member or an area of the air gap varies in response to a changing position of the object to be detected.

7. A position detector device as claimed in claim 2 wherein said first and second amplitude functions are sine and cosine functions, respectively.

8. A position detector device as claimed in claim 1 wherein said magnetism-responsive member includes at least one of a magnetic substance and an electrically-conductive substance.

* * * * *

UNITED STATES PATENT AND TRADEMARK OFFICE
CERTIFICATE OF CORRECTION

PATENT NO. : 6,566,862 B1
DATED : May 20, 2003
INVENTOR(S) : Atsutoshi Goto, Kazuya Sakamoto and Hiroshi Sakamoto It is certified that error appears in the above-identified patent and that said Letters Patent is hereby corrected as shown below:

Column 56,
Line 16, please add the following claims 9 and 10:
9. A position detector device as claimed in claim 1 wherein said coil section includes two coils, positions of the two coils relative to said magnetism-responsive member being caused to vary with opposite characteristics in response to the displacement of the object to be detected, in response to which respective impedance of the two coils varies with opposite characteristics,
   said reference-voltage generation circuit generates a single reference voltage, and
   said arithmetic operation circuit performs predetermined first and second arithmetic operations using respective voltages produced in said coils and the reference voltage, to thereby generate a first A.C. output signal having a first amplitude function as an amplitude coefficient and a second A.C. output signal having a second amplitude function as an amplitude coefficient.

10. A position detector device as claimed in claim 1 wherein said magnetism-responsive member includes a permanent magnet and said coil section includes a magnetic core.

Signed and Sealed this

Second Day of December, 2003

JAMES E. ROGAN
*Director of the United States Patent and Trademark Office*